United States Patent [19]

Emert et al.

[11] Patent Number: 5,663,130
[45] Date of Patent: Sep. 2, 1997

[54] POLYMERS DERIVED FROM ETHYLENE AND 1-BUTENE FOR USE IN THE PREPARATION OF LUBRICANT DISPERSANT ADDITIVES

[75] Inventors: Jacob Emert, Brooklyn, N.Y.; Albert Rossi, Warren, N.J.; Salvatore Rea, Franklin Square, N.Y.; Jeffrey William Frederick, Morris Plains; Mahn Won Kim, Califon, both of N.J.

[73] Assignee: Exxon Chemical Patents Inc, Linden, N.J.

[21] Appl. No.: 610,782

[22] Filed: Mar. 11, 1996

Related U.S. Application Data

[62] Division of Ser. No. 445,574, May 22, 1995, Pat. No. 5,498,809, which is a continuation of Ser. No. 992,192, Dec. 17, 1992, abandoned.

[51] Int. Cl.$^6$ ................................................. C10M 145/02
[52] U.S. Cl. ........................ 508/506; 508/465; 508/496; 508/513; 525/301; 525/304
[58] Field of Search ........................... 508/506, 513, 508/465, 496; 525/301, 304

[56] References Cited

U.S. PATENT DOCUMENTS

| Re. 26,433 | 8/1968 | Le Suer | 252/33.6 |
|---|---|---|---|
| 2,459,112 | 1/1949 | Oberright | 252/51.5 |
| 2,962,442 | 11/1960 | Andress | 252/51.5 |

(List continued on next page.)

FOREIGN PATENT DOCUMENTS

| 2021959 | 6/1991 | Canada. | |
|---|---|---|---|
| 0147158 | 7/1985 | European Pat. Off. | C10M 143/00 |
| 0260999 | 3/1988 | European Pat. Off. | |
| 0353935 | 2/1990 | European Pat. Off. | |
| 0389722 | 10/1990 | European Pat. Off. | |
| 0441548 | 8/1991 | European Pat. Off. | |
| 0461744 | 12/1991 | European Pat. Off. | |
| 62-119214 | 11/1985 | Japan | C08F 4/64 |
| H1-132605 | 5/1988 | Japan. | |
| 984409 | 2/1965 | United Kingdom. | |
| 1049291 | 11/1966 | United Kingdom. | |
| 1329334 | 9/1973 | United Kingdom. | |
| 1440219 | 6/1976 | United Kingdom. | |
| WO90/01503 | 2/1990 | WIPO. | |
| WO90/09371 | 8/1990 | WIPO. | |
| WO90/10022 | 9/1990 | WIPO. | |

OTHER PUBLICATIONS

Walter Kaminsky, "Polymerization and Copolymerization with a Highly Active, Soluble Ziegler–Natta Catalyst", pp. 225–244, (1983), MMI Press Symposium Series.

Encyclopedia of Polymer Science and Engineering vol. 11, John Wiley & Sons, New York, 1988, (pp. 26–27), month N/A.

"The Study of Association and Aggregration Via Light Scattering" H. G. Elias, Chapter 9, in Huglin, M.B., editor Light Scattering from Polymer Solutions, Academic Press, New York, 1972, month N/A.

"Light Scattering", Guy C. Berry Encyclopedia of Polymer Science and Engineering vol. 8, 2nd Edition, John Wiley & Sons, New York, 1987 (pp. 721–794), month N/A.

(List continued on next page.)

*Primary Examiner*—Ellen M. McAvoy
*Attorney, Agent, or Firm*—K. R. Walton; H. L. Cohen

[57] ABSTRACT

The invention pertains to oil soluble copolymers derived from ethylene and 1-butene which have a number average molecular weight between about 1,500 and 7,500, at least about 30 percent of all polymer chains terminated with ethylvinylidene groups, and ethylene-derived content of not greater than about 50 weight percent, and which form solutions in mineral oil free of polymer aggregates, as determined by light scattering measurements. Lubricating oil additives, particularly dispersants, produced by the functionalization and derivatization of these copolymers have enhanced performance (e.g., improved dispersancy and pour point) in lubricating oil compositions, attributable in part to the combination of properties characterizing the copolymers.

4 Claims, 5 Drawing Sheets

U.S. PATENT DOCUMENTS

| | | | |
|---|---|---|---|
| 2,984,550 | 5/1961 | Chamot | 44/62 |
| 3,036,003 | 5/1962 | Verdol | 252/33.4 |
| 3,087,436 | 4/1963 | Dettlof et al. | 103/130 |
| 3,087,936 | 4/1963 | Le Suer | 260/326.3 |
| 3,150,088 | 9/1964 | Hunt et al. | 252/32.7 |
| 3,150,089 | 9/1964 | Hunt | 252/33 |
| 3,166,516 | 1/1965 | Kirkpatrick et al. | 252/344 |
| 3,172,892 | 3/1965 | Le Suer et al. | 260/326.5 |
| 3,185,645 | 5/1965 | Clayton | 252/46.7 |
| 3,215,707 | 11/1965 | Rense | 260/326.3 |
| 3,231,587 | 1/1966 | Rense | 260/346.8 |
| 3,236,770 | 2/1966 | Matson et al. | 252/32.7 |
| 3,245,908 | 4/1966 | Lowe | 252/51.5 |
| 3,245,910 | 4/1966 | Lowe | 252/51.2 |
| 3,256,185 | 6/1966 | Le Suer | 252/32.7 |
| 3,271,310 | 9/1966 | Le Suer | 252/35 |
| 3,272,746 | 9/1966 | Le Suer et al. | 252/47.5 |
| 3,275,554 | 9/1966 | Wagenaar | 252/50 |
| 3,284,410 | 11/1966 | Meinhardt | 252/49.6 |
| 3,306,908 | 2/1967 | Le Suer | 260/326.3 |
| 3,316,177 | 4/1967 | Dorer | 252/51.5 |
| 3,326,804 | 6/1967 | Hu | 252/34 |
| 3,331,776 | 7/1967 | Krukziener | 252/56 |
| 3,355,270 | 11/1967 | Amick et al. | 44/68 |
| 3,361,673 | 1/1968 | Stuart et al. | 252/51.5 |
| 3,366,569 | 1/1968 | Norman et al. | 252/51.5 |
| 3,368,972 | 2/1968 | Otto | 252/47.5 |
| 3,373,111 | 3/1968 | Le Suer et al. | 252/51.5 |
| 3,381,022 | 4/1968 | Le Suer | 260/404.8 |
| 3,390,086 | 6/1968 | O'Halloran | 252/47.5 |
| 3,401,118 | 9/1968 | Benoit | 252/51.5 |
| 3,403,102 | 9/1968 | Le Suer | 252/49.8 |
| 3,413,347 | 11/1968 | Worrel | 260/570.5 |
| 3,415,750 | 12/1968 | Anzenberger | 252/51.5 |
| 3,438,757 | 4/1969 | Honnen et al. | 44/58 |
| 3,442,804 | 5/1969 | Traise et al. | 252/49.6 |
| 3,445,441 | 5/1969 | Rushton | 260/89.5 |
| 3,448,047 | 6/1969 | Traise et al. | 252/51.5 |
| 3,454,497 | 7/1969 | Wittner | 252/42.7 |
| 3,454,555 | 7/1969 | van der Voort et al. | 260/239 |
| 3,455,832 | 7/1969 | Davis | 252/51.5 |
| 3,459,661 | 8/1969 | Schlobohm | 252/42.7 |
| 3,461,172 | 8/1969 | Previc | 260/621 |
| 3,470,098 | 9/1969 | O'Halloran | 252/47.5 |
| 3,493,520 | 2/1970 | Verdol et al. | 252/51.5 |
| 3,513,093 | 5/1970 | Le Suer | 252/32.5 |
| 3,522,179 | 7/1970 | Le Suer | 252/51.5 |
| 3,533,945 | 10/1970 | Vogel | 252/49.6 |
| 3,539,633 | 11/1970 | Plasek et al. | 260/570.5 |
| 3,542,680 | 11/1970 | Le Suer | 252/57 |
| 3,551,466 | 12/1970 | Gee et al. | 260/429 |
| 3,558,743 | 1/1971 | Verdol et al. | 260/848 |
| 3,563,964 | 2/1971 | Wagensommer | 260/80.78 |
| 3,565,804 | 2/1971 | Honnen et al. | 252/50 |
| 3,573,205 | 3/1971 | Lowe et al. | 252/51.5 |
| 3,579,450 | 5/1971 | Le Suer | 252/56 |
| 3,586,629 | 6/1971 | Otto et al. | 252/42.7 |
| 3,591,598 | 7/1971 | Traise et al. | 260/296 |
| 3,600,372 | 8/1971 | Udelhofen et al. | 260/132 |
| 3,634,515 | 1/1972 | Plasek et al. | 260/570.5 A |
| 3,649,229 | 3/1972 | Otto | 44/73 |
| 3,649,659 | 3/1972 | Otto et al. | 260/429 R |
| 3,660,057 | 5/1972 | Ilnyckyj | 585/12 |
| 3,697,428 | 10/1972 | Meinhardt et al. | 252/56 D |
| 3,697,429 | 10/1972 | Engel et al. | 252/59 |
| 3,697,574 | 10/1972 | Plasek et al. | 260/462 R |
| 3,718,663 | 2/1973 | Plasek et al. | 260/326.3 |
| 3,725,277 | 4/1973 | Worrell | 252/51.5 R |
| 3,725,480 | 4/1973 | Traise et al. | 260/583 P |
| 3,726,882 | 4/1973 | Traise et al. | 260/296 |
| 3,741,896 | 6/1973 | Abbot et al. | 252/42.7 |
| 3,755,169 | 8/1973 | Adams et al. | 252/35 |
| 3,755,433 | 8/1973 | Miller et al. | 252/51.5 R |
| 3,798,165 | 3/1974 | Plasek et al. | 252/51.5 R |
| 3,798,247 | 3/1974 | Plasek et al. | 260/404.5 |
| 3,822,209 | 7/1974 | Knapp et al. | 252/47 |
| 3,865,740 | 2/1975 | Goldschmidt | 252/46.7 |
| 3,912,764 | 10/1975 | Palmer | 260/346.8 |
| 4,076,738 | 2/1978 | Pecoraro | 260/406 |
| 4,102,798 | 7/1978 | Ryer et al. | 252/51.5 A |
| 4,110,349 | 8/1978 | Cohen | 260/346.74 |
| 4,113,639 | 9/1978 | Lonstrup et al. | 252/51.5 A |
| 4,116,876 | 9/1978 | Brois et al. | 252/49.6 |
| 4,152,499 | 5/1979 | Boerzel et al. | 526/52.4 |
| 4,160,739 | 7/1979 | Stambaugh et al. | 252/34 |
| 4,161,452 | 7/1979 | Stambaugh et al. | 252/34 |
| 4,171,273 | 10/1979 | Waldbillig et al. | 252/51.5 A |
| 4,173,185 | 11/1979 | Voegelin | 101/120 |
| 4,234,435 | 11/1980 | Meinhardt et al. | 252/51.5 A |
| 4,273,891 | 6/1981 | Pindar et al. | 525/145 |
| 4,306,041 | 12/1981 | Cozewith et al. | 526/68 |
| 4,454,059 | 6/1984 | Pindar et al. | 252/51.5 R |
| 4,517,104 | 5/1985 | Bloch et al. | 252/51.5 A |
| 4,540,753 | 9/1985 | Cozewith et al. | 526/88 |
| 4,540,756 | 9/1985 | Johnson | 526/124 |
| 4,542,199 | 9/1985 | Kaminsky et al. | 526/160 |
| 4,575,574 | 3/1986 | Kresge et al. | 585/520 |
| 4,666,619 | 5/1987 | Kresge et al. | 252/56 S |
| 4,668,834 | 5/1987 | Rim et al. | 585/12 |
| 4,704,491 | 11/1987 | Tsutsui et al. | 585/10 |
| 4,797,219 | 1/1989 | Gutierrez et al. | 252/56 D |
| 4,832,702 | 5/1989 | Kummer et al. | 44/62 |
| 4,839,074 | 6/1989 | Rossi et al. | 252/56 D |
| 4,857,217 | 8/1989 | Gutierrez et al. | 252/47 |
| 4,859,210 | 8/1989 | Franz et al. | 44/53 |
| 4,863,623 | 9/1989 | Nalesnik | 252/50 |
| 4,925,579 | 5/1990 | Stemke | 252/32.7 E |
| 4,943,658 | 7/1990 | Kinoshita et al. | 562/572.2 |
| 4,956,107 | 9/1990 | Guiterrez et al. | 252/47 |
| 4,963,275 | 10/1990 | Guiterrez et al. | 252/47 |
| 4,981,605 | 1/1991 | Tsutsui et al. | 252/52 A |
| 5,017,299 | 5/1991 | Guiterrez et al. | 252/51.5 R |
| 5,084,197 | 1/1992 | Galic et al. | 252/52 A |
| 5,102,566 | 4/1992 | Fetterman et al. | 252/32.7 |
| 5,124,056 | 6/1992 | Guiterrez et al. | 252/47 |
| 5,151,204 | 9/1992 | Struglinski | 585/12 |
| 5,225,092 | 7/1993 | Eimert et al. | 585/12 |
| 5,229,022 | 7/1993 | Song et al. | 585/12 |
| 5,498,809 | 3/1996 | Emert et al. | 585/13 |

OTHER PUBLICATIONS

Journal of Macromolecular Science—Reviews of Macromolecular Chemistry and Physics James C. Randall, C29, (pp. 201–317) 1989, month N/A.

Eric T. Hsieh and James C. Randall Macromolecules, 15, (pp. 353–360), month N/A.

"C13–NMR in Polymer Quantitative Analyses" J.C. Randall and E. T. Hsieh in: NMR and Macromolecules, Sequence, Dynamic and Domain Structure ACS Symposium Series No. 247, (pp. 131–151) (American Chemical Society, 1984).

Periodic Table of the Elements (56th Edition of Handbook of Chemistry and Physics, CRC Press, 1975).

Textbook of Polymer Science John Wiley & Sons, 1984 Fred W. Billmeyer (pp. 198–202).

"Preparation and Clarification of Solutions", B. E. Tabor Chapter 1 in Huglin, M.B. editor Light Scattering from Polymer Solutions, Academic Press, New York, 1972.

Fred W. Billmeyer, "Laser Light Scattering", Academic Press, New York, pp. 198–202, (1974). (Book not provided, will be sent upon request).

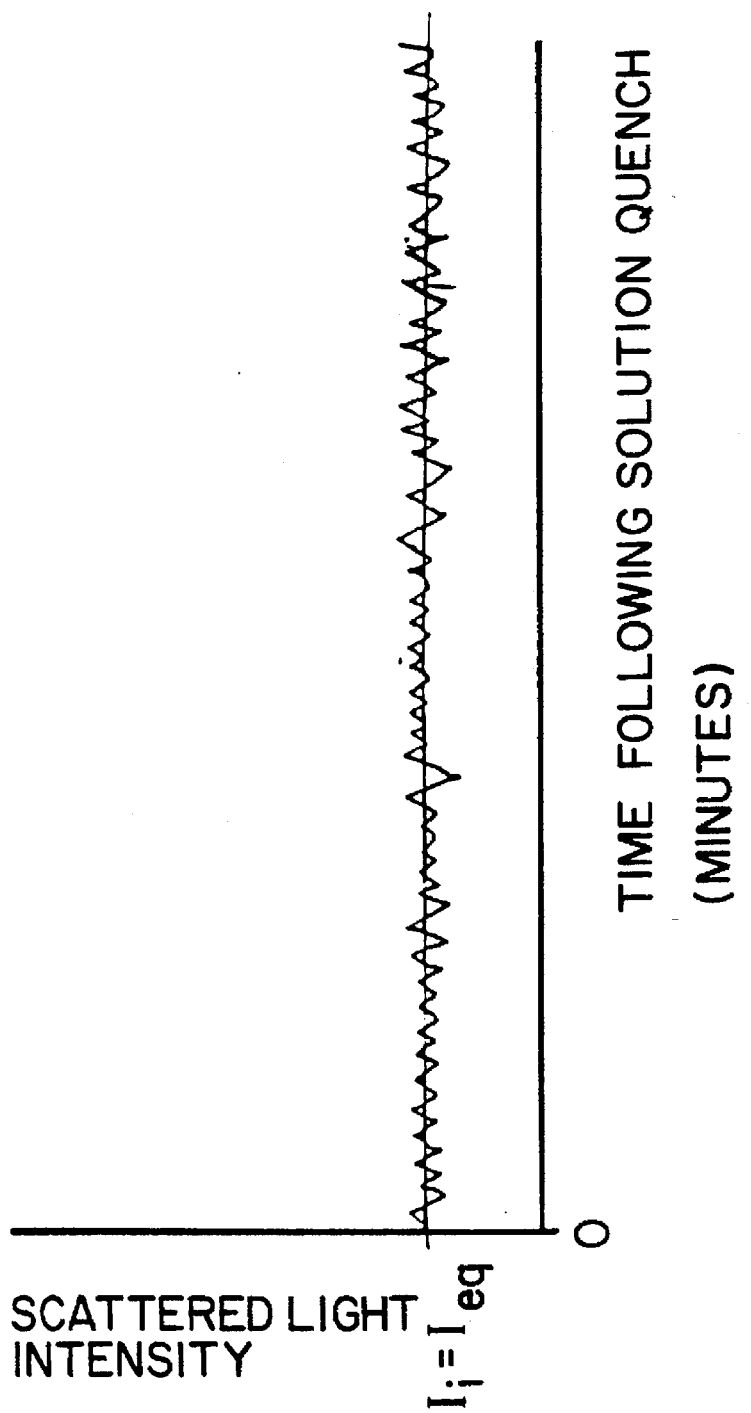

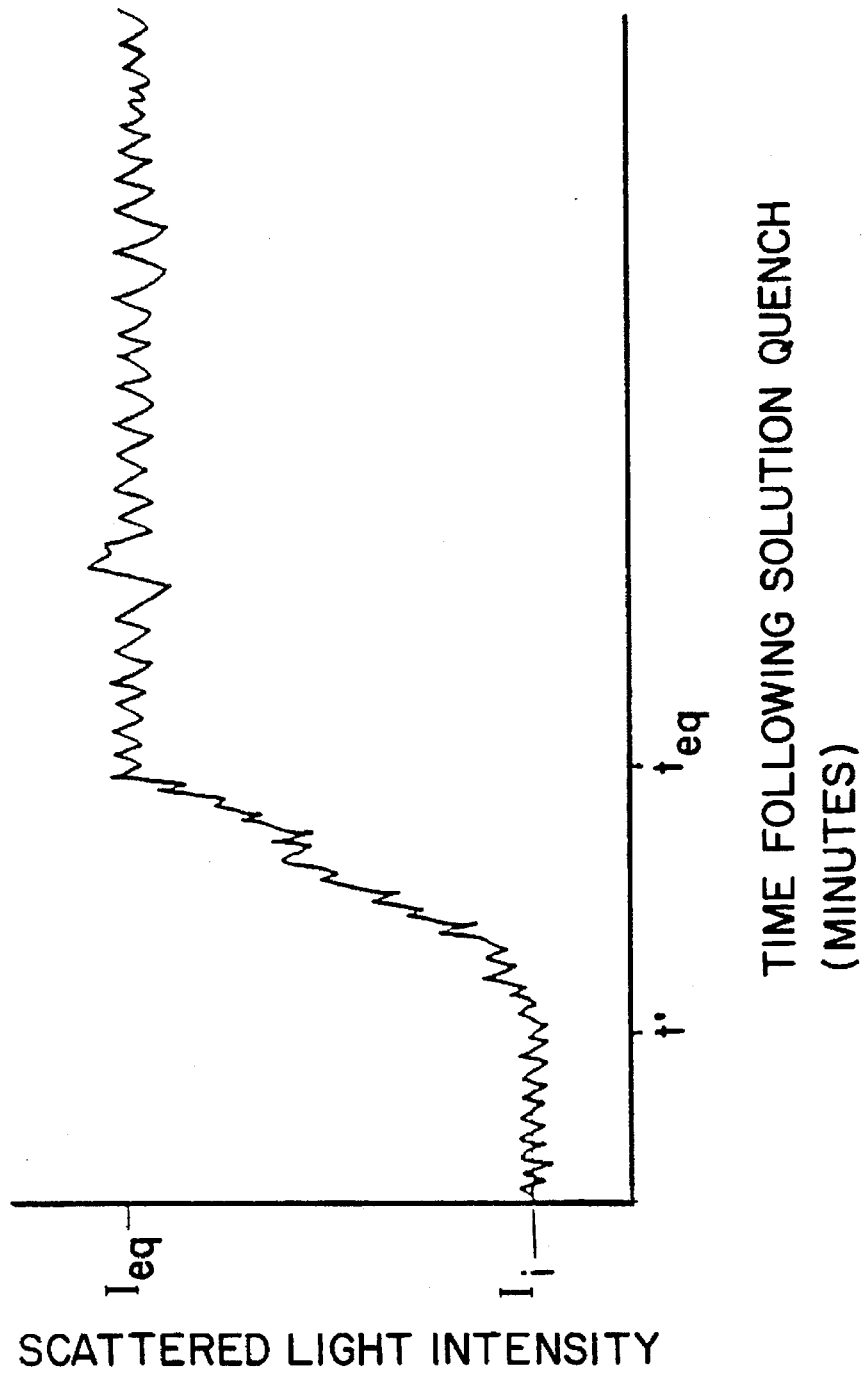

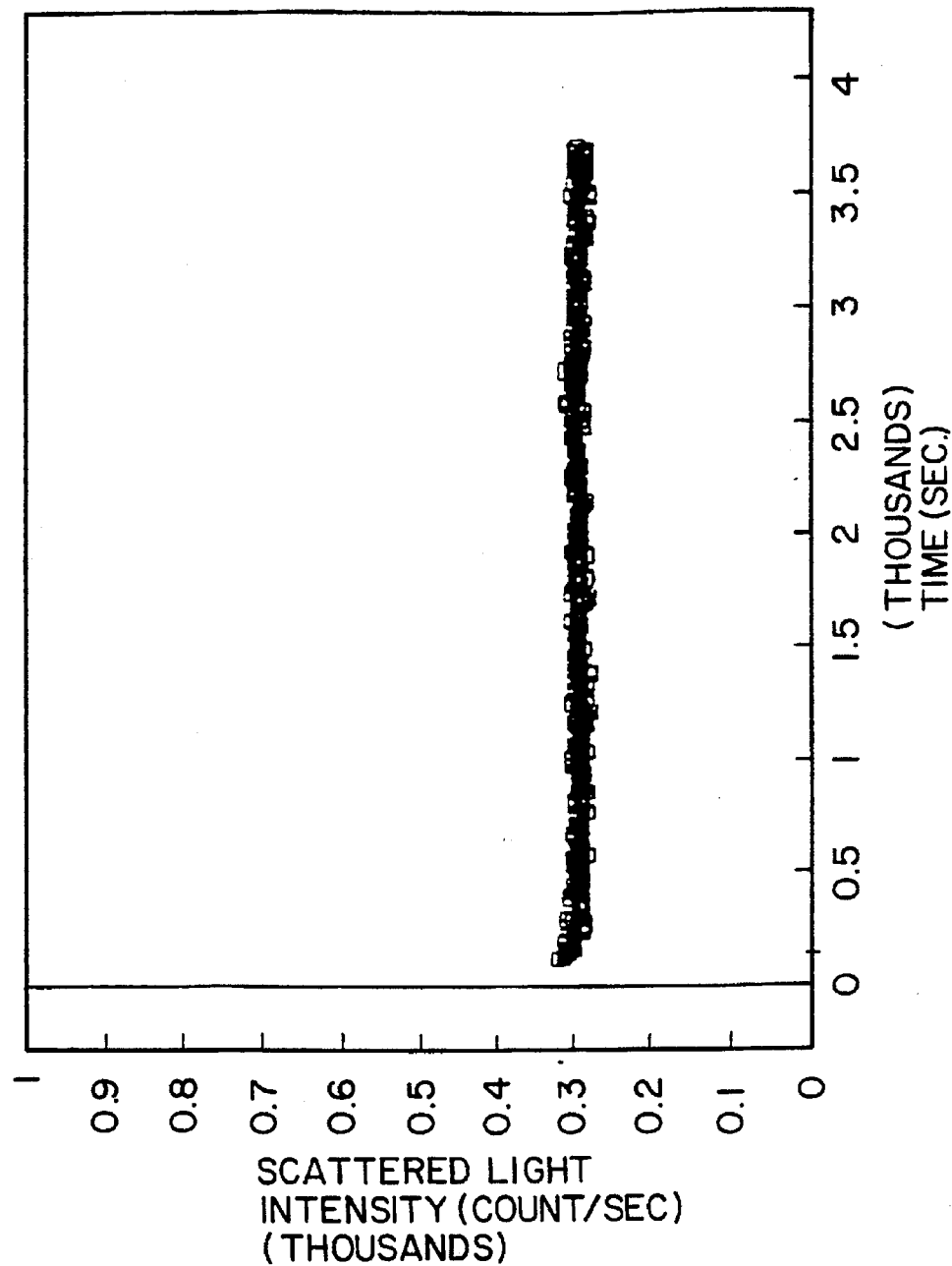

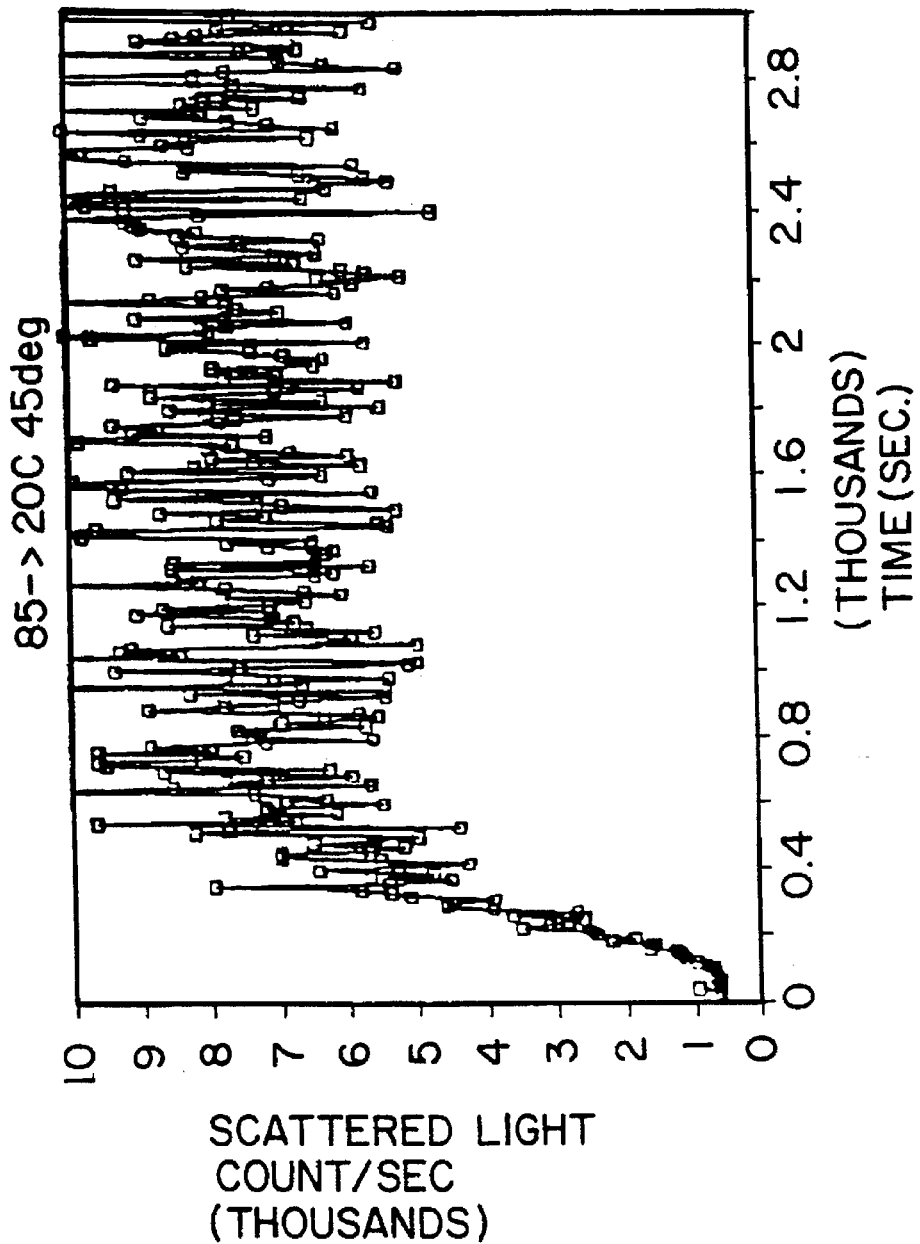

POLYMERS DERIVED FROM ETHYLENE AND 1-BUTENE FOR USE IN THE PREPARATION OF LUBRICANT DISPERSANT ADDITIVES

This is a divisional of application Ser. No. 08/445,574, filed May 22, 1995 now U.S. Pat. No. 5,498,809, issued Mar. 12, 1996, which is a Rule 62 continuation of 992,192, filed Dec. 17, 1992, now abandoned.

FIELD OF THE INVENTION

The invention relates to polymers derived from ethylene and 1-butene which possess a certain combination of chemical and physical properties rendering the polymers particularly suitable as "polymer backbones" for the preparation of lubricating oil additives, particularly dispersants. The invention also relates to improved oil-soluble dispersant additives prepared from the polymers and useful in lubricating oil compositions, and to concentrates containing the oil-soluble dispersant additives.

BACKGROUND OF THE INVENTION

Hydrocarbon oil compositions typically comprise a mixture of at least one hydrocarbon base oil and one or more additives, where each additive is employed for the purpose of improving the performance and properties of the base oil in its intended application; e.g., as a lubricating oil, heating oil, diesel oil, middle distillate fuel oil, and so forth. Lubricating oil compositions face rather stringent viscosity requirements, as set, for example, by ASTM specifications. Such compositions must meet a minmum viscosity requirement at high temperature (i.e., at least about 100° C.) and a maximum viscosity requirement at low temperature (about −5° to −30° C.). The minimum viscosity requirement at high temperature is intended to prevent the oil from thinning during engine operation to the point at which excessive engine wear and increased oil consumption would result. The maximum viscosity requirement at low temperature facilitates engine start-up in cold weather and also ensures the cold oil has sufficient pumpability and flowability to avoid engine damage due to insufficient lubrication.

In formulating a lubricating oil composition which meets both the low and the high temperature viscosity requirements, a formulator can use a single lubricating base oil of desired viscosity or a blend of oils of different viscosities, and he can manipulate the kinds and amounts of additives that must be present to achieve not only the viscosity requirements, but also requirements specified for other properties, such as dispersancy, pour point and cloud point. Generally, the mere blending of oils having different viscosity characteristics does not enable the formulator to meet the low and high temperature viscosity requirements of lubricating oil compositions. Instead, the primary tool for meeting the requirements is the use of viscosity index improving additives, hereinafter referred to as viscosity index improvers or, more simply, VI improvers.

A VI improver is conventionally an oil-soluble long chain polymer, often a hydrocarbon-based polymer with a number average molecular weight in the range of 20,000 to 200,000. The large size of these polymers enables them to significantly increase kinematic viscosities of base oils even at low concentrations. Unfortunately, lubricating oil solutions containing these VI improvers are non-Newtonian in nature. As a result, these solutions tend to give lower viscosities than expected in a high shear environment, such as that found in an operating internal combustion engine. It is believed that this behavior arises from shear-induced alignment of the VI polymer chains. Consequently, the VI improvers increase the low temperature viscosity of a lubricating base oil to a greater extent than they increase its high temperature viscosity. As a result, the two viscosity requirements for a lubricating oil composition become increasingly antagonistic as increasingly higher levels of VI improver are employed. Eventually, a point can be reached where the amount of VI improver added to achieve the required minimum viscosity at high temperature precludes the possibility of meeting the required maximum viscosity at low temperature. Accordingly, constraints exist on the amount of VI improver which a formulator can employ for a given lubricating base oil or base oil blend to meet the low and high temperature viscosity requirements for the lubricating oil composition.

The task of formulating a lubricating oil composition is more complicated than merely selecting the appropriate kind and amount of VI improver to add to the base oil. In addition to VI improvers, lubricating oil compositions typically contain dispersant additives, which can also affect the viscosity characteristics of the composition. Dispersants are typically polymeric materials with an oleophilic component providing oil solubility and a polar component providing dispersancy. Dispersants generally have a number average molecular weight of about 10,000 or less, and, consequently, have polymer chains much smaller than those of a typical VI improver. Among the materials which have been employed as dispersants are hydrocarbon polymers modified to contain nitrogen- and ester-based groups. Polyisobutylene is perhaps the hydrocarbon polymer most commonly used in the preparation of dispersants, although other hydrocarbon polymers, such as ethylene-α-olefin copolymers, can be employed as well. The primary function of a dispersant is to maintain in a suspension in the oil any insolubles formed by oxidation, etc. during use, thereby preventing sludge flocculation and precipitation. The amount of dispersant employed is dictated and controlled by the effectiveness of the particular material in achieving its dispersant function. Motor oils commercially available at U.S. service stations typically contain about four times as much dispersant as VI improver, based on active ingredient.

Conventional dispersants can also increase the low and high temperature viscosity characteristics of a base oil by virtue of their polymeric nature. However, because dispersant polymer molecules are much smaller than those of a VI improver, the dispersant is much less shear sensitive. As a result, a dispersant contributes more to the low temperature viscosity of the lubricating oil relative to its contribution to the high temperature viscosity than does a VI improver. Moreover, the dispersant, with its shorter polymer chains, contributes much less to the high temperature viscosity of the base oil in an absolute sense than does the VI improver. Thus, the magnitude of the low temperature viscosity increase induced by the dispersant can exceed the low temperature viscosity increase induced by the VI improver without the benefit of a proprotionately greater increase in high temperature viscosity as obtained from a VI improver. Consequently, as the dispersant-induced low temperature viscosity increase causes the low temperature viscosity of the oil to approach the maximum viscosity permitted at low temperature, it becomes increasingly difficult to introduce an amount of VI improver sufficient to meet the minimum viscosity required at high temperature without crossing the low temperature viscosity threshold.

A lubricating oil composition formulated with a kind and amount of dispersant and VI improver sufficient to meet the low and high temperature viscosity requirements and still achieve effective dispersancy does not necessarily end the formulator's task. The lubricating oil composition must meet other performance criteria, such as pour point and cloud point, which may necessitate the employment of still other additives.

Cloud point (ASTM D2500) is the temperature at which wax crystals first appear as a haze in a hydrocarbon oil upon cooling. These wax crystals typically have the highest molecular weight of the waxes in the hydrocarbon oil and, therefore, the lowest solubility. The cloud point of a hydrocarbon oil reflects the temperature at which problems in filtering the oil are encountered. However, the cloud point of a lubricating oil (as against a fuel oil) is of less significance than is its pour point, because the filters typically encountered by a lubricating oil (e.g., oil filters for internal combustion engines) have a relatively large pore size, and filter plugging is less of a problem.

Pour point is the lowest temperature at which a hydrocarbon oil will pour or flow when chilled without being disturbed under specified conditions. As the hydrocarbon oil is chilled, wax in the oil precipitates into crystals which form a network. The pour point of the oil is marked by the temperature at which the fluid component of the oil is immobilized by the wax crystal network. See, e.g., Mark, Herman, editor, *Encyclopedia of Polymer Science and Engineering*, volume 11, John Wiley & Sons, New York, 1988, pages 26–27. The lubrication of an engine or other equipment at temperatures near and below the pour point is significantly impaired, because the distribution of the chilled oil by pumping or siphoning is difficult or impossible. Operation of the engine or other equipment under such conditions will quickly result in significant damage and ultimately failure.

Because the waxes contributing to low-temperature problems are present in essentially all non-synthetic hydrocarbon oils used today, various additives have been developed to beneficially influence the oils' low temperature flow properties. These additives are generically referred to as lubricating oil flow improvers (LOFI's) or pour point depressants. The LOFI's act to modify the size, number, and growth of wax crystals in chilled lubricating oils in a manner imparting improved handling, pumpability, and/or vehicle operability at low temperatures.

The majority of LOFI's are or contain polymers of one of two general types—backbone polymers and side-chain polymers. The backbone polymers, such as ethylenevinyl acetate (EVA) copolymers, have various lengths of methylene segments randomly distributed in the backbone of the polymer, which associate or cocrystallize with the wax crystals. Extended wax crystal growth, and the concomitant formation of crystalline wax networks, is inhibited, however, by the branches and non-crystallizable segments in the polymer.

The side-chain polymers, the predominant variety of LOFI's, have methylene segments in their side chains, which are preferably non-branched side chains. These polymers work similarly to the backbone polymers except the side chains have been found to be more effective in inhibiting extended wax crystal growth in isoparaffins as well as the normal paraffins found in lube oils. More specifically, LOFI's are typically derived from unsaturated carboxylic acids or anhydrides which are esterified to provide pendent ester groups derived from a mixture of alcohols. Representative examples of this type of side chain LOFI include dialkyl fumarate-vinyl acetate copolymers and esterified styrene/maleic anhydride copolymers.

Unfortunately for the formulator, the LOFI's and other additives added to control the pour point, etc. of the lubricating oil composition may interact with the VI improver and the dispersant in a manner adversely affecting the composition's viscosity and dispersancy. Conversely, the dispersant and/or VI improver may contribute adversely to the performance of these other additives. Furthermore, even in the absence of other additives, the dispersant and VI improver may interact with the base oil itself to degrade the cloud point, pour point, etc the oil would otherwise have.

As an example, dispersants employing ethylene-α-olefin copolymers, unlike those based upon polyisobutylene, possess linear methylene segments derived from sequential units of ethylene in the polymer chain. These methylene segments possess the capability of interacting with the waxes present in the lubricating base oil. In some cases these interactions can be harmful to the low temperature properties of the oil and can in certain circumstances counteract and defeat the effect sought to be induced by the LOFI. Thus, dispersants based upon ethylene-α-olefin copolymer backbones must be carefully selected to avoid adverse wax interactions, while simultaneously achieving the proper overall high and low temperature viscosity requirements of the oil, which may or may not be significantly affected by the wax interaction. Furthermore, these problems must be solved in such a way that the dispersancy of the ethylene-α-olefin-based dispersant remains acceptable.

As already noted, short-chain hydrocarbon polymers modified to contain certain polar groups, particularly nitrogen- and ester-based groups, have been widely used as ashless dispersant additives in lubricating oils. The nitrogen- and ester-based dispersants can be prepared by first functionalizing the long-chain hydrocarbon polymer with maleic anhydride to form the corresponding polymer substituted with succinic anhydride groups, and then derivatizing the succinic anhydride-substituted polymer with an amine or an alcohol or the like. Polyisobutylene has often been the polymer of choice, chiefly because it is readily available by cationic polymerization from butene streams (e.g., using $AlCl_3$ catalyst). Such polyisobutylenes generally contain residual unsaturation in amounts of about one ethylenic double bond per polymer chain, positioned along the chain. The ethylenic double bonds serve as sites for functionalizing the polyisobutylenes by, for example, the thermal "ene" reaction (i.e., by direct reaction with maleic anhydride or one or more other dicarboxylic acid moieties).

The polyisobutylene polymers (PIB) employed in most conventional dispersants are based on a hydrocarbon chain of a number average molecular weight ($M_n$) of from about 900 to 2500. PIB having a $M_n$ of less than about 300 gives rather poor performance results when employed in dispersants because the molecular weight is insufficient to keep the dispersant molecule fully solubilized in lubricating oils. On the other hand, high molecular weight PIB ($M_n$>3000) becomes so viscous that conventional industrial practices are incapable of handling this product in many operations. This problem becomes much more severe as the PIB molecular weight increases to 5,000 or 10,000.

Increased amounts of terminal ethylenic unsaturation in polyisobutylene (so-called "reactive polyisobutylene") have been achieved by $BF_3$-catalyzed polymerization of isobutylene. Exemplary of references disclosing these polymers is U.S. Pat. No. 4,152,499. Nonetheless, the reactive polyisobutylenes can still contain substantial amounts of unsaturation elsewhere along the chain. Furthermore, it is difficult to produce reactive polyisobutylene polymers at molecular weights of greater than about 2,000, and, in any event, the reactive polyisobutylenes still have the above-noted viscosity increase disadvantages as their molecular weights are increased.

A variety of hydrocarbon polymers have been disclosed to be suitable polymer backbones for the preparation of ashless nitrogen and ester dispersants. U.S. Pat. No. 4,234,435, for example, discloses dispersants prepared from polyalkenes with a $M_n$ value of from 1,300 to about 5,000 and $M_w/M_n$ of about 1.5 to about 4. The polyalkenes are homopolymers or interpolymers of polymerizable olefin monomers, usually polymerizable terminal olefin monomers, of 2 to about 16 carbon atoms. The polyalkenes are functionalized by reaction with one or more acidic reactants such as maleic acid, fumaric acid and maleic anhydride. This patent, however, provides no examples directed to the preparation of suitable polyalkene ethylene-α-olefin interpolymers or their use as dispersant backbones.

It is generally known that ethylene-α-olefin copolymers can be prepared by polymerizing ethylene and the α-olefin co-monomer using conventional Ziegler-Natta catalysts (e.g., $VCl_4$ or $VOCl_3$ with a halide source, such as organoaluminum halides and/or hydrogen halides). However, because of the relatively high activity of these catalysts, the resulting copolymers tend to have number average molecular weights well in excess of about 10,000 and thus are generally not suitable for use as polymer backbones for dispersants. For example, ethylene-propylene (EP) polymers and ethylene-propylene-diene terpolymers (EPDM) having a viscosity average molecular weight ($M_v$) of from about 20,000 to 300,000 are produced using Ziegler catalysts. These high molecular weight EP and EPDM polymers find use as viscosity index improvers. See, e.g., U.S. Pat. Nos. 3,563,964; 3,697,429; 4,306,041; 4,540,753; 4,575,574; and 4,666,619. Other high molecular weight olefin polymers produced using Ziegler catalysts, such as polypropylenes and ethylene-1-butene copolymers, have also been disclosed to be useful as viscosity index improvers. See, e.g., U.S. Pat. No. 4,540,756.

It is also known in the art that ethylene-α-olefin copolymers useful as viscosity index improvers may, when functionalized with acid moieties such as maleic anhydride and subsequently reacted with an amine, be employed as multifunctional viscosity index improvers. See, e.g., U.S. Pat. Nos. 3,316,177; 3,326,804; 4,160,739; 4,161,452; 4,171,273; and 4,517,104.

Certain of the references disclosing the production of ethylene-α-olefin copolymers using conventional Ziegler catalysts include within their scope the production of copolymers having relatively low molecular weights; i.e., values of $M_n$ below about 10,000. However, these references often disclose the lower molecular weight copolymers To be outside the preferred ranges, and they often do not provide examples of the preparation or use of low molecular weight polymers. U.S. Pat. No. 4,863,623, for example, discloses lubricant additives having viscosity-improving, dispersancy and anti-oxidant properties, prepared from ethylene copolymers and terpolymers of $C_3$ to $C_{10}$ α-monoolefins and optionally non-conjugated dienes or trienes. To prepare the additive, the copolymer or terpolymer is first grafted with an ethylenically unsaturated carboxylic function, preferably maleic anhydride or a derivative thereof, by the thermal "ene" process or by grafting in solution or in solid form using a radical initiator, and the grafted material is then further derivatized with an amino-aromatic polyamine compound. The ethylene copolymers and terpolymers are disclosed to have a molecular weight ranging from about 5,000 to 500,000 and an α-olefin content of 20 to 85 mole percent. The patent discloses the copolymers and terpolymers can be prepared using Ziegler type catalysts. The preferred molecular weight range is disclosed to be 25,000 to 250,000, and the examples are directed to the use of EP copolymers having an average molecular weight of 80,000.

Along similar lines is Canadian Patent Application 2,021,959. The application discloses dispersant and anti-oxidant lubricant additives prepared from ethylene copolymers and terpolymers of $C_3$ to $C_{10}$ α-monoolefins and optionally non-conjugated dienes or trienes. As in U.S. Pat. No. 4,863,623 supra, the additive is produced by first thermally or radically grafting the copolymer or terpolymer with an ethylenically unsaturated carboxylic acid material and then reacting the grafted polymer with an amino-aromatic polyamine compound. The ethylene copolymers and terpolymers are disclosed to have a molecular weight ranging from about 1,000 to 40,000. It is further disclosed that the copolymers and terpolymers can be prepared using Ziegler catalysts. But it is also noted that many polymerization processes produce the copolymers and terpolymers with molecular weights substantially above 75,000 thus requiring that the polymers be degraded, usually mechanically or thermally, to obtain polymers in the prescribed $M_n$ range of 1,000 to 40,000. The examples are directed to the grafting of EP copolymers having number average molecular weights higher than 10,000.

Ethylene-α-olefin copolymers which have sufficiently low molecular weights to be useful dispersant polymer backbones can be prepared using conventional Ziegler-Natta catalysts by conducting the polymerization in the presence of a molecular weight regulator such as hydrogen. A key disadvantage to the use of hydrogen as a chain stopper is that it can result in the saturation of the olefinic double bond content in the copolymers. The resulting low unsaturation content of the copolymers makes their functionalization by a thermal "ene" reaction highly unattractive.

U.K. Patent 1,329,334 exemplifies the use of a conventional Ziegler-Natta catalyst for the preparation of ethylene-α-olefin copolymers of relatively low molecular weight. The patent discloses the production of ethylene polymer wax by polymerizing ethylene and optionally an α-olefin in the presence of hydrogen using a catalyst composed of a titanium or vanadium halogen compound supported on a carrier (a hydrocarbon-insoluble Mg compound) and an organoaluminum compound. The molecular weight and density of the polymer wax are controlled by the amount of hydrogen and/or α-olefin used in the polymerization. At the temperatures and pressures used in the polymerization, the content of double bonds in the polymer wax is reduced. The polymer wax is disclosed to have a $M_v$ in the range of 400 to 20,000. The wax may be oxidized without the formation of cross-linkages due to the small content of double bonds in the wax, and the oxidized wax may be modified by reaction with a maleic acid compound. The patent contains an example disclosing the production of an ethylene-1-butene polymer wax containing 28 ethyl groups per 1000 carbon atoms, which is equivalent to about 94 mole % ethylene assuming the ethyl groups in the polymer are due to units derived from 1-butene.

Ethylene-α-olefin copolymers of low molecular weight and containing residual double-bond unsaturation have been prepared using a new type of catalyst comprising a metallocene and an alumoxane, as disclosed in the following references.

U.S. Pat. No. 4,668,834 teaches ethylene-α-olefin copolymers and terpolymers having a $M_n$ of between about 250 and about 20,000, a viscosity index of at least about 75, and a vinylidene-type terminal unsaturation. The patent also discloses that the molar ethylene content of the copolymers is preferably in the range of between about 20 and about 80, more preferably between about 30 and about 70 percent, and most preferably between about 35 and about 65 percent. The patent further discloses the preparation of these polymers via certain Group IV catalysts, particularly certain metallocenes, and aluminoxane co-catalysts. Propylene and 1-butene are specifically disclosed to be among the preferred olefins for polymerization with ethylene. The ethylene-α-olefin copolymers and terpolymers are disclosed to be useful as intermediates in epoxy-grafted electrical encapsulation compositions. The patent contains examples directed to the preparation and epoxy-grafting of ethylene-propylene copolymers, but not of ethylene-1-butene (EB) copolymers. The use of these polymers to prepare ashless dispersants containing nitrogen is not disclosed.

U.S. Pat. No. 4,704,491 relates to liquid ethylene-α-olefin random copolymers, useful when hydrogenated as synthetic lubricant oil, characterized inter alia by having 10–85 mole % (=5–74 wt. %), preferably 20–80 mole % (=11–67 wt. %), most preferably 30–70 mole % (17–54 wt. %) ethylene units; 15–90 (preferably 20–80, most preferably 30–70) mole % α-olefin units ; $M_n$ of from 300 to 10,000; a $M_w/M_n$ of not more than 2.5; and an iodine value in the range of 0 to 85. The copolymers are also characterized by a B value of at least 1.05 but not more than 2, wherein the B value is an index showing the state of distribution of monomer components in the copolymer chain and is defined as $P_{OE}/(2P_O*P_E)$, wherein $P_E$ is the molar fraction of ethylene component in the copolymer, $P_O$ is the molar fraction of the α-olefin component in the copolymer, and $P_{OE}$ is the molar fraction of α-olefin-ethylene chains in the total dyad chains. The patent discloses the B value may be determined from the C-13 NMR spectrum of the copolymer. The patent states that the liquid copolymer can be easily modified since it has a double bond capable of reacting with maleic anhydride, etc., at the molecular chain ends.

The patent further discloses that these copolymers can be produced by copolymerizing ethylene and a $C_3$–$C_{20}$ α-olefin in the presence of a catalyst comprising a group IVb transition metal compound, such as a metallocene, and an aluminoxane. In addition to numerous examples directed to EP copolymers, the patent provides two examples of the preparation of EB copolymers by the polymerization of ethylene and 1-butene in the presence of zirconocene-aluminoxane catalyst systems. Example 6 discloses an EB copolymer having an ethylene content of 55 mole % (=38 weight percent) and an $M_n$ of 1200. Example 14 discloses an EB copolymer with 60 mole % ethylene (43 wt %) and $M_n$ of 2300.

PCT Published Application WO 90/1,503 is directed to ethylene-α-olefin polymers which have a molar content of ethylene of from about 20 to about 80 percent (=11–67 wt. %), preferably about 30 to about 70 percent (=17–54 wt. %), most preferably about 45 to about 65 percent (=29–48 wt. %); a number average molecular weight of from about 300 to about 10,000; and in which at least 90% of all polymer chains contain at least one carbon-carbon double bond and exhibit a ratio of vinylidene to vinyl double bonds of at least 3.5 to 1. It is disclosed that the polymers can be prepared by polymerization of ethylene and the α-olefin using certain metallocene-alumoxane catalysts and by using certain procedures and conditions. Example 5 discloses the preparation of an EB copolymer with $M_n$ of 860 using dimethylsilyldicyclopentadienyl zirconium dichloride and methylalumoxane. The remaining preparative examples are directed to EP copolymers.

U.S. Pat. No. 5,043,515 teaches a zirconocene/aluminoxane catalyst for oligomerizing olefins and the oligomerization process using the catalyst. More particularly, the patent discloses the oligomerization of ethylene or ethylene with one or more $C_3$–$C_{10}$ α-olefins using the catalyst. It is further disclosed that, when the starting material is ethylene in combination with one or more α-olefins, the product olefins (i.e., the oligomers) contain significant portions of vinylidene olefins. Example 3–5 of the patent describes the oligomerization of ethylene and 1-butene using bis(cyclopentadienyl)zirconium dichloride and aluminoxane. The oligomers are disclosed to be useful as intermediates in preparing specialty detergents or lubricant additives.

The following references also disclose metallocene-alumoxane-prepared, low-molecular-weight ethylene-α-olefin copolymers, but are primarily directed to the chemical modification of the copolymers to provide additives for lubricating oils.

U.S. Pat. No. 4,981,605 relates to liquid epoxidized ethylenic random copolymers and to liquid hydroxylated ethylenic random copolymers, both of which are useful as lubricant oil additives, paint additives, and resin modifiers. The patent discloses that the epoxidized/hydroxylated ethylenic random copolymer is an epoxidation/hydroxylation product of a liquid ethylenic random copolymer of ethylene and a $C_3$–$C_{20}$ α-olefin, wherein the epoxy/hydroxyl groups are each formed via a carbon-carbon unsaturated bond derived from ethylene or the α-olefin and positioned at the polymer chain end of the liquid ethylenic random copolymer. The patent further discloses that the liquid ethylene random copolymer has inter alia an ethylene component content of 10–85 mole %, an α-olefin content of 15 to 90 mole %, a $M_n$ of usually 200 to 10,000, and a molecular weight distribution of usually not more than 4.0. Referential Example 6 discloses the preparation of a liquid EB random copolymer with an ethylene content of 58 mole % (41 wt %) and $M_n$ of 1500 by polymerization of ethylene and 1-butene in the presence of bis(cyclopentadienyl)zirconium dichloride and aluminoxane.

European Published Patent Application 353,935 A1 is directed to oil-soluble lubricating oil additives comprising at least one terminally unsaturated ethylene-α-olefin polymer having a number average molecular weight of 300 to 10,000 substituted with mono- or dicarboxylic acid producing moieties, wherein at least about 30 percent of the polymer chains of the ethylene-α-olefin polymer possess terminal ethenylidene unsaturation. European Published Patent Application 441,548 A1 provides similar teachings for terminally unsaturated ethylene-α-olefin copolymers having number average molecular weights from about 300 to 20,000. EP 353,935 A1 further discloses that the monocarboxylic acid and the dicarboxylic acid or anhydride substituted polymers can be further reacted with a nucleophilic reagent such as amines, alcohols, amino alcohols and metal compounds, to form derivatives useful as lubricating oil additives such as dispersants. Suitable ethylene contents for the ethylene-α-olefin polymers are disclosed to range from 20 to 80, preferably 30 to 70, and most preferably 45 to 65 mole %. Example 5 discloses the preparation of an EB copolymer of $M_n$ of 860 using dimethylsilyldicyclopentadienyl zirconium dichloride and methylalumoxane. The ethylene content of the polymer is not disclosed in the Example. The subsequent functionalization of the polymer to an EB-substituted succinic anhydride (EBSA), and the derivatization of the EBSA with an amido amine are also exemplified.

U.S. Pat. No. 4,943,658 discloses liquid oxidatively modified ethylenic random copolymers, useful as formulating agents for lubricant oils, wherein the liquid ethylenic random copolymer comprises 20–80 mole % of ethylene and 80–20 mole % of α-olefin and has a number average molecular weight of from 200 to 10,000 and a molecular weight distribution in the range of up to 4. The examples are directed to the modification of EP copolymers.

U.S. Pat. No. 5,017,299 is directed to oil-soluble lubricating oil additives comprising Mannich Base condensates of an alkyl substituted hydroxy aromatic compound with formaldehyde and an amine, wherein the alkyl moiety of the aromatic compounds is derived from at least one ethylene-α-olefin copolymer of 300 to 10,000 number average molecular weight and wherein at least about 30% of the polymer chains contain terminal ethenylidene unsaturation.

While many of the above described metallocene-derived ethylene-α-olefin polymers can be successfully employed to make ashless dispersants, it has been found that further improvements in the performance of ashless dispersants incorporating such polymers, as well as significant improvements in the economics of the dispersants can be achieved by selectively controlling, for example, the monomer identity, monomer content, and certain polymer properties, within the broad general class of ethylene-α-olefin copolymers.

SUMMARY OF THE INVENTION

The present invention is directed to copolymers derived from ethylene and 1-butene (alternatively referred to as ethylene-1-butene copolymers or, more simply, EB copolymers) which can be characterized by a complex set of properties, such as having a number average molecular weight between about 1,500 and 7,500, having at least about 30 percent of all polymer chains terminated with ethylvinylidene groups, having an ethylene content of not greater than about 50 weight percent, and forming solutions in mineral oil which are free of polymer aggregates, as indicated by light scattering measurements. More particularly, the EB copolymers of the invention are characterized by forming mineral oil solutions which have values of about zero for their light scattering factor, $S_f$, as hereinafter defined. The $S_f$ value of about zero exhibited by these solutions shows that there is an absence of association or aggregation between individual EB polymer molecules dissolved in the mineral oil solutions. These aggregation-free mineral oil solutions of the EB copolymers of the invention may alternatively be referred to as homogeneous mineral oil solutions.

This combination of a relatively limited range of properties yields EB copolymers of the invention especially suitable for use as polymer backbones in lubricating oil additives, particularly dispersant additives. The limited range of number average molecular weights characterizing the EB copolymers of the present invention ensures that dispersants produced from the copolymers are fully solubilized in lubricating base oils, and at the same time assists in avoiding or reducing handling problems due to high viscosity levels and wax crystal interactions. Because of the relatively high level of terminal ethylvinylidene unsaturation in the inventive EB copolymers, the dispersant additives produced therefrom have high active ingredient concentrations, thereby providing enhanced lubricating oil dispersancy, as exhibited by enhanced sludge and varnish control properties.

Furthermore, the polymers of the present invention and the dispersant additives produced therefrom possess enhanced pour point performance in lubricating oil compositions to which they are added and which also contain conventional LOFT's. This beneficial pour point behavior of the dispersants is believed to be attributable in part not only to the ability of the EB copolymers to form homogeneous mineral oil solutions free of polymer aggregates as manifested by $S_f$ values of about zero, but also to the limited ethylene content. In contrast, EB copolymers with $S_f$ values greater than zero and/or ethylene contents in excess of about 50 weight percent, and dispersant additives produced therefrom, can exhibit an increase in the pour point of lubricating oil compositions in which they are used. Accordingly, in one of its aspects, this invention concerns lubricating oil compositions comprising a major amount of a lubricating base oil, an effective amount of a lubricating oil flow improver, and a minor amount of the EB copolymer of the present invention.

A further aspect of this invention relates to the ethylene-1-butene copolymer functionalized with reactive groups, such as by substitution with mono- or dicarboxylic acid materials (i.e., acid, anhydride or acid ester) produced by reacting (e.g., by the "ene" reaction) the EB copolymers of the invention with mono-unsaturated carboxylic reactants. The monocarboxylic acid and the dicarboxylic acid or anhydride substituted EB copolymers are useful per se as additives to lubricating oils, and, in another aspect of this invention, can also be reacted with nucleophilic reagents, such as amines, alcohols, amino alcohols and metal compounds, to form derivative products which are also useful as lubricating oil additives, e.g., as dispersants.

In still another aspect of this invention, lubricating oil additives are produced by functionalizing the EB copolymers of the invention using reactants other than the mono-unsaturated carboxylic reactants heretofore described. Accordingly, the copolymer can be functionalized by reaction with a hydroxy aromatic compound in the presence of a catalytically effective amount of at least one acidic alkylation catalyst. Subsequently the alkylated hydroxyaromatic compound can be reacted by Mannich Base condensation with an aldehyde and an amine reagent to provide a derivatized copolymer.

Lubricating oil additives within the scope of this invention are also produced by oxidation of the EB copolymer of the invention, such as oxidation with a gas containing oxygen and/or ozone. The copolymer can also be functionalized by hydroformylation and by epoxidation. The EB copolymers can also be functionalized by contacting the copolymers under Koch reaction conditions with carbon monoxide in the presence of an acidic catalyst and a nucleophilic trapping agent such as water or a hydroxy-containing compound or a thiol containing compound to form carboxyl groups on the polymer. Furthermore, the aforesaid functionalized polymers formed by oxidation, hydroformylation, epoxidation, and Koch reaction can be derivatized by reaction with at least one derivatizing compound to form derivatized polymers.

BRIEF DESCRIPTION OF THE DRAWINGS

FIG. 1 provides a schematic comparison of the light scattering behavior of the EB polymer of the invention with another EB polymer. FIG. 1-A is a graphical plot of the scattered light intensity for a solution of the EB polymer of the present invention in S150NL mineral oil as a function of the time which has elapsed following the quenching of the solution from a temperature of about 80° C. or higher to 20° C., wherein the EB polymer forms a homogeneous solution with an absence of aggregates following the quench. FIG.

Figure 2:
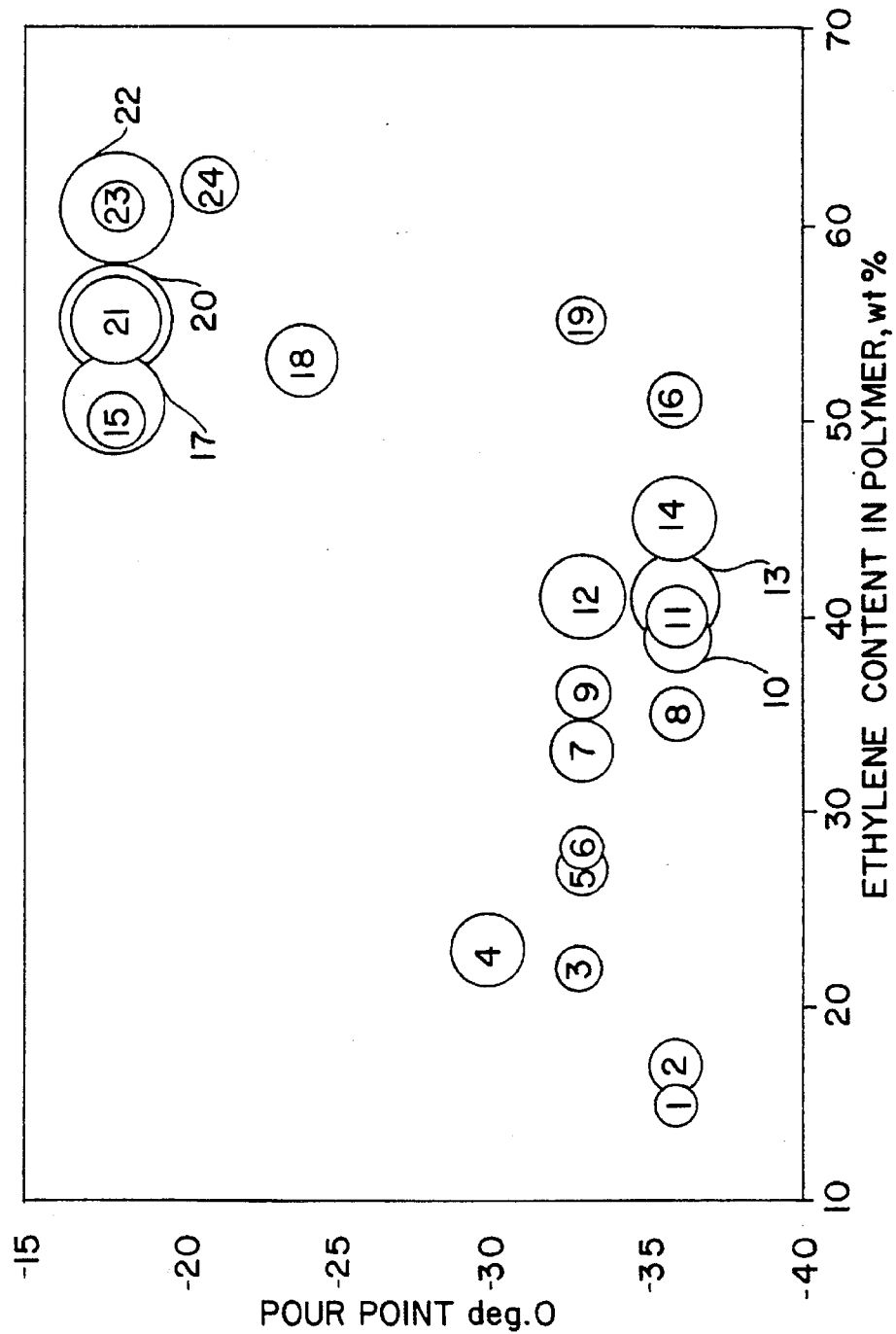

1-B is a comparative graphical plot of scattered light intensity data for a S150NL mineral oil solution of an EB polymer which does form a solution containing aggregates following the quench.

FIG. 2 is a plot of the pour points of the EB copolymers in Table IV as a function of their ethylene contents in weight percent. The diameter of the circle marking the pour point of a given copolymer is proportional to its number average molecular weight. The number associated with each circle is the sample number assigned to the copolymer in Table IV.

FIG. 3 provides graphical plots of the scattered light intensity from solutions of EB polymer in S150NL mineral oil as a function of the time which has elapsed following the quenching of the solution from a temperature of about 80° C. to 20° C. FIG. 3-A is a plot of the light scattering data for a sample of the EB copolymer prepared in Example 1, and FIG. 3-B is a plot of the light scattering data for a sample of the EB copolymer prepared in Comparative Example 2.

DETAILED DESCRIPTION OF THE INVENTION

The present invention relates to copolymers derived from ethylene and 1-butene characterized by a certain combination of chemical and physical properties which makes the copolymers especially suitable for use as the backbones of dispersant additives. More particularly, the EB copolymers of the invention possess a relatively high degree of terminal vinylidene unsaturation, a number average molecular weight within a limited range, controlled ethylene content, and the ability to form mineral oil solutions which have an absence of polymer aggregation. Each of these properties contributes in one or more respects to the utility of the copolymer as a dispersant backbone.

The EB copolymers of this invention possess a high degree of terminal vinylidene-type unsaturation. The EB copolymers of this invention have polymer chains of formula POLY-C(—CH$_2$CH$_3$)=CH$_2$, wherein POLY represents the polymer chain and the —C(—CH$_2$CH$_3$)=CH$_2$ represents an ethylvinylidene group terminating one end of the chain. The EB copolymers typically have ethylvinylidene groups terminating at least about 30 percent of the polymer chains. More preferably, ethylvinylidene groups terminate at least about 50 percent of the polymer chains, and most preferably ethylvinylidene groups terminate at least about 65 percent of the polymer chains, and typically from about 50 to 75 percent. In addition, the copolymers typically have vinyl groups (i.e., POLY-CH=CH$_2$, where —CH=CH$_2$ is vinyl) terminating no more than about 10 percent of the chains and internal mono-unsaturation in the balance of the chains. The internal mono-unsaturation typically includes vinylenes (i.e., POLY-CH=CH(—CH$_3$), where the methyl may be cis or trans to POLY) in amounts between about 1 to 8 percent based upon total polymer unsaturation and trisubstituted vinyls in amounts between about 20 and 50 percent. The percentage of polymer chains exhibiting terminal ethylvinylidene unsaturation, terminal vinyl unsaturation, etc. may be determined by FTIR spectroscopic analysis, titration, or by C-13 NMR. It will be understood that a change in the type of metallocene catalyst or co-catalyst used to prepare the polymer (see discussion infra) can shift the above described double bond distribution to some extent. Because of the relatively high level of terminal ethylvinylidene unsaturation in the EB copolymers, the dispersant additives produced therefrom have high active ingredient concentrations, thereby providing enhanced lubricating oil dispersancy, as exhibited by enhanced sludge and varnish control properties.

The copolymers of this invention have a number average molecular weight ($M_n$) of typically from about 1,500 to about 7,500, preferably from about 1,500 to 6,000 (e.g., 1,500–5,000), and most preferably from about 2,000 to 5,000 (e.g., 2,200 to 4,000).

With regard to composition, the EB copolymer will typically contain not greater than about 50, preferably not greater than about 45, and most preferably not greater than 40 weight percent ethylene, based upon the total polymer weight. Thus, the ethylene content can range typically from about 1 to about 50 (e.g., from 5 to about 50) weight percent, preferably from about 5 to about 45 (e.g., 5 to about 35) weight percent, and most preferably from about 10 to about 35 (e.g., 10 to about 30) weight percent. The balance of the copolymer content is substantially based upon units derived from 1-butene. Thus, the 1-butene content is typically from about 99 to 50 (e.g., 95 to about 50) weight percent, preferably from about 95 to about 55 (e.g., 95 to about 65) weight percent, and most preferably from about 90 to 65 (e.g., 90 to about 70) weight percent.

The copolymers of this invention may optionally contain small amounts (e.g., typically up to about 10, preferably up to about 5 weight percent) of units derived from other α-olefins and C$_3$ to C$_{22}$ diolefins. In particular, introduction of small amounts of other C$_4$ olefins can result during the preparation of the EB copolymers through the use of 1-butene reactant streams which also contain certain amounts of 2-butene, isobutene, and/or butadiene, as described in more detail in the Section entitled "Preparation of the Ethylene-1-Butene Copolymer".

The EB copolymers of the invention also form mineral oil solutions having an absence of aggregation. By mineral oil solutions having an absence of aggregation is meant an absence of association between individual EB copolymer molecules dissolved in S150NL mineral oil at low concentration, typically about 5 wt. %. More particularly, the EB copolymers of the invention form mineral oil solutions with an absence of aggregation at 20° C. after quenching of the solutions from a temperature of about 80° C. or higher. That the solutions formed on quenching to 20° C. do indeed have an absence of aggregation, and are thus homogeneous, is determined by their light scattering behavior, wherein these solutions have a value of about zero for their light scattering factor $S_f$.

EB copolymers of the present invention which form homogeneous solutions with an absence of aggregation generally exhibit one or more beneficial or improved properties pertinent to their use in lubricating oils relative to those EB copolymers which exhibit aggregation. Furthermore, when the polymers of the present invention are used as polymer backbones in lubricating oil additives, particularly dispersant additives, the beneficial or improved properties of the polymer are imparted to the additive. For example, as described more fully below, the non-aggregating nature of the EB copolymers of the invention is a sufficient condition for the acceptable pour point performance of the copolymers in mineral lubricating oils and for the acceptable pour point performance of additives obtained by functionalization or derivatization of the copolymers.

The State of Aggregation in Mineral Oil Solutions of EB Copolymers—Characterization by Light Scattering The state of aggregation of an EB copolymer in a mineral oil solution at 20° C. is determined from the value of its scattering factor $S_f$ as given by the following equation $$S_f = (I_{eq} - I_o)/I_o \qquad (I)$$

In equation (I), $I_o$ is the average initial intensity of the light scattered from a solution comprising from about 1 to 10 weight percent, typically about 5 weight percent, of the EB copolymer in S150NL (solvent 150 neutral light) mineral lubricating oil (Exxon Company U.S.A.) immediately after the solution has been quenched from a temperature of about 80° C. or higher to a temperature of 20° C. $I_o$ is determined from the measurement of the scattered intensity at time t=0; i.e., immediately following the quench. $I_{eq}$ is the average intensity of the light scattered from the same solution, maintained at 20° C., after the elapse of at least a time $t=t_{eq}$ following the quench. As described more fully below, $t_{eq}$ is the time sufficient for the solution to achieve a constant (or "equilibrium") value of scattered light intensity following the quench.

The EB copolymers of the invention have a value of about zero for $S_f$, which means that the values for $I_{eq}$ and $I_o$ are essentially equivalent. In other words, the average intensity of the light scattered from a solution of about 1 to 10 weight percent of an EB copolymer of the invention in S150NL oil, measured while maintaining the solution at a temperature of 20° C. after first quenching from a temperature of about 80° C. or higher, does not change over the elapsed time following the quench.

In contrast, EB copolymers having a tendency to aggregate in mineral oil solutions have an $S_f$ of greater than zero. For a solution comprising about 1 to 10 weight percent of such an aggregating EB copolymer in S150NL oil, the average intensity of the light scattered from the solution is greater for times t equal to or greater than $t_{eq}$ following the quenching of the solution from about 80° C. or higher to 20° C. than the average intensity immediately following the quench at time t=0.

FIG. 1 provides a schematic comparison of the light scattering behavior of the EB copolymers of the invention with EB copolymers which have $S_f$ greater than zero. FIG. 1-A is a plot of the scattered light intensity in arbitrary units for a solution of the inventive EB copolymer in S150NL mineral oil at 20° C. as a function of the time elapsed since the quench. While there are random fluctuations in the measured values of the scattered intensity due to background noise, the average scattered intensity does not change with elapsed time. Thus, $I_o=I_{eq}$, and $S_f=0$.

FIG. 1-B is a plot analogous to FIG. 1-A, showing the scattered light intensity as a function of post-quench time for a solution of an EB copolymer having $S_f$ greater than zero. For a relatively short period of time immediately following the quench, the average scattered light intensity has a relatively low and constant value, essentially equal to $I_o$, the intensity at time t=0. There follows a time period in which the scattered light intensity measurably increases, shown in FIG. 1-B as the interval of time from $t_{eq'}$ to $t_{eq}$. For the times greater or equal to $t_{eq}$, the average scattered intensity has a relatively high and constant (or "equilibrium") value, equal to $I_{eq}$. Thus, $I_{eq}>I_o$, and $S_f>0$.

As noted earlier, the difference between the light scattering behavior of the EB copolymers of the invention, which have $S_f=0$, and that of EB copolymers which have $S_f$ greater than zero is related to the degree of aggregation (also called self-association) of the copolymers in the S150NL mineral oil solution. It is known by those skilled in the art of polymer light scattering that, for a constant intensity of light incident on a dilute polymer solution which is maintained at a constant temperature and which has a fixed concentration (e.g., a fixed weight of solute per volume of solution), the scattered light intensity measured at a given scattering angle Θ increases as the molecular weight of the polymer increases. See, e.g., the discussion on pages 201–210 in Chapter 8 of Chu, Benjamin, *Laser Light Scattering*, Academic Press, New York, 1974, and the discussion on pages 198–202 of Billmeyer, Fred W., *Textbook of Polymer Science*, John Wiley & Sons, New York, 1984. It is also known that, if the individual polymer molecules in a dilute solution aggregate in the solution, the scattered light intensity of the solution would be higher for a given concentration than it would be in the absence of the aggregation, due to the increase in the size of the scattering particles, or, in other words, due to an increase in the "apparent" molecular weight of the polymer particles. See, e.g., Elias, H.-G., "The Study of Association and Aggregation Via Light Scattering," Chapter 9 in Huglin, M. B., editor, *Light Scattering from Polymer Solutions*, Academic Press, New York, 1972.

In terms of aggregation, then, the light scattering behaviors described above for mineral oil solutions of EB copolymers are accounted for as follows: For both EB copolymers of the invention and for EB copolymers having $S_f$ greater than zero, solutions comprising about 1 to 10 weight percent EB copolymer in S150NL mineral oil in equilibrium at temperatures of 80° C. or higher are essentially free of aggregation. On the other hand, solutions of EB copolymers having $S_f$ greater than zero contain aggregated EB copolymers in equilibrium at temperatures of about 20° C., but solutions of the EB copolymers of the invention remain free of aggregation. Thus, when a solution comprising an EB copolymer having $S_f$ greater than zero in S150NL mineral oil is suddenly quenched from equilibrium at 80° C. or higher to a temperature of 20° C., the solution will initially contain unaggregated EB copolymer molecules in a quasi-stable condition. After the elapse of a time $t_{eq}$, the solution will reach thermal equilibrium at 20° C. and the molecules, having had sufficient time to interact with one another, will have formed polymer aggregates. Applying the light scattering principles described in the previous paragraph, the scattered light intensity of this solution for times $t_{eq}$ and longer will be greater than the intensity at time t=0, based upon the increase in the apparent molecular weight of the copolymer molecules for times $t_{eq}$ and longer due to aggregation.

On the other hand, analogous measurements of scattered light intensity as a function of time for quenched S150NL mineral oil solutions of the inventive EB copolymers manifest no changes in scattered light intensity, since the inventive copolymer molecules do not aggregate in S150NL mineral oil after quenching the solution from 80° C. to 20° C. and therefore have no net change in apparent molecular weight.

It is important to point out that factors in addition to the formation of aggregates can in principle contribute to a change in the scattered light intensity of a polymer solution upon quenching. In particular, scattering intensity is a function of the specific refractive index increment of a polymer solution, dn/dc=the change in the refractive index of a solution with the change in polymer concentration, the value of which is temperature dependent. It has been found here, however, that the scattering contribution due to the temperature dependence of dn/dc is negligible relative to that attributable to polymer aggregation.

As should be clear from the above discussion, values of $t_{eq}$ for solutions of EB copolymers having $S_f$ greater than zero is determinable from, and indeed fixed by, the plot of scattered light intensity versus time. In measuring $I_o$ and $I_{eq}$ for these cases, the actual value of $t_{eq}$ is used. $t_{eq}$ is typically at least about 5 minutes and generally no more than about 15 to 20 minutes. In a typical experiment, the scattered light intensity is measured several times per minute for up to at least about 60 to 120 minutes. Taking measurements for these extended periods of time insures that EB copolymers having unusually long $t_{eq}$'s (e.g., about 30 minutes) are not missed.

On the other hand, for solutions of the EB copolymer of the invention, it is neither possible nor necessary to determine the actual value of $t_{eq}$ from the plot of scattered light intensity versus post-quenching time, because the average scattering intensity does not change with time. Thus, in measuring $I_{eq}$ here, any convenient, arbitrarily chosen value of $t_{eq}$ may be used; e.g., about 15 minutes. (Note, however, that measurements should be taken for at least 30 minutes folowing the quench to insure the particular copolymer under test is not an aggregating copolymer with an unusually long $t_{eq}$.)

Values for $I_o$ and $I_{eq}$ may be measured using conventional elastic light scattering techniques, the practice of which has been described in a number of publications including Huglin, M. B., editor, *Light Scattering from Polymer Solutions*, Academic Press, New York, 1972 Kerker, Milton, *The Scattering of Light and Other Electromagnetic Radiation*, Academic Press, New York, 1969; and Chu, Benjamin, *Laser Light Scattering*, Academic Press, New York, 1974; and Berry, Guy C., "Light Scattering," in *Encylopedia of polymer Science and Engineering*, volume 8, 2nd edition, John Wiley & Sons, New York, 1987, pages 721–794. For the purposes of this invention, the critical determination is whether or not a change occurs in the scattered light intensity, as defined by $S_f$ in equation (I), as a function of time. Thus, it is not necessary to measure the scattering against a calibration standard or to otherwise determine the intensity in absolute terms.

In a typical light-scattering photometer useful for measuring $I_o$ and $I_{eq}$, a monochromatic beam of light emitted from a laser is directed into the sample cell containing the EB copolymer solution. The light scattered from the copolymer solution at a scattering angle $\Theta$ subsequently passes through certain detector optics, finally reaching a photomultiplier PM which, in combination with a data acquisition system DAS, provides an output signal that is a function of the scattered light intensity. Depending upon the choice of PM and DAS, the output signal may be either an analog signal or a count of the scattered photons.

Because it produces a relatively high intensity, monochromatic beam of light, a laser is the preferred light source in a light-scattering photometer. The laser may have Brewster windows or the equivalent (e.g., a Nicol prism placed in the path of the beam emitted from laser) in order to provide a polarized light beam incident on sample cell, but a polarized light source is not necessary. The laser may be any laser capable of emitting light radiation. Suitable lasers include, but are not limited to, He—Ne lasers emitting at 632.8 nm and Ar lasers emitting at either 548 nm or 488 nm.

Careful sample preparation is critical to the accurate measurement of $I_{eq}$ and $I_o$. Most particularly, the presence of dust or other extraneous material in the EB copolymer solution must be avoided, since it could otherwise contribute significantly to the scattering and lead to indeterminate or erroneous results. Thus, the solution is typically centrifuged or filtered or both just prior to any scattering measurements. It is also important to completely dissolve the polymer in the oil to avoid scattering contributions due to solution inhomogeneities. Complete dissolution is typically accomplished by using a combination of vigorous mixing of the polymer with the oil, followed by heating the mixture to a high temperature and maintaining the solution at that high temperature until dissolution is complete.

A preferred method of sample preparation involves adding to a suitable portion of S150NL mineral oil the amount of EB copolymer necessary to produce the desired concentration of the polymer in the oil (i.e., about 1 to 10 weight percent, typically 5 weight percent), agitating the polymer-oil combination for several hours, and then heating the polymer-oil mixture to a temperature of about 80° to 90° C. and maintaining the mixture at that high temperature with occasional shaking until dissolution is complete. The solution is then maintained at about 80° C. or higher for several more hours, and then filtered directly into the sample cell. The resulting dust-free solution still at about 80° C. or higher is then immediately quenched by placement in the sample holder, thermostatted at 20° C., of the light scattering photometer, and the scattering intensity from the solution is monitored as a function of time in the manner already described.

Preferred EB copolymers of the invention may be further characterized by pour points of about −30° C. or less, as determined by ASTM Method No. D97, wherein the measurements are made upon solutions comprising 2 weight percent of the EB copolymer of the invention and 0.2 weight percent of a conventional lube oil flow improver comprising a $C_8$–$C_{18}$ dialkyl fumarate-vinyl acetate copolymer in S150NL mineral lubricating oil. As noted earlier, the pour point of an oil composition is the lowest temperature at which it will flow when chilled in a specific manner; here, the manner prescribed by ASTM Method No. D97. Desirable lubricating oil compositions typically have a relatively low pour point, typically about −30° C. or less.

A requirement of any dispersant additive is that it not adversely affect (i.e., does not significantly increase) the pour point of the lubricating oil composition to which it is added. It has been found that the pour point behavior of dispersant additives is largely determined by the pour point behavior of the polymer from which they are derived. More particularly, it has been found that, if an EB copolymer in solution exhibits a pour point of about −30° C. or less, as determined according to the method described in the last paragraph, the addition to a lubricating oil composition of an effective amount of a dispersant additive produced by the functionalization and/or derivatization, as hereinafter described, of the EB copolymer does not significantly alter the pour point of the composition.

The pour point behavior exhibited by a given EB copolymer is related to whether or not it forms aggregates in mineral oil solutions, as defined supra in terms of light scattering. The EB copolymers of the invention, which have $S_f$ values of about zero and thus a tendency not to form aggregates, exhibit pour points of about −30° C. or less. It is emphasized, however, that, while absence of aggregation as determined by $S_f$ has been found to be a sufficient condition for satisfactory pour point, it has not been found to be a necessary condition. It is not a necessary condition, because, though some EB copolymers with $S_f$ values greater than zero (i.e., a tendency to form aggregates) exhibit high pour points of greater than about −30° C., other EB copolymers with $S_f$ values greater than zero may nonetheless have pour points below about −30° C.

Among the other factors implicated in pour point performance are the ethylene content and the number average molecular weight of the polymer. FIG. 2 plots the pour points, measured as described in the second to last paragraph, of a series of EB copolymers having ethylene contents ranging from 15 to 62 wt. % and number average molecular weights ranging from 1,627 to 12,432. These copolymers, some within the scope of the present invention and some not, were all prepared using the catalysts and processes as generally described in the section entitled "Preparation of the Ethylene-1-Butene Copolymer." Based on the data shown in FIG. 2, it has been concluded that an EB copolymer which has an ethylene content of less than about 50 weight percent and an $M_n$ of up to about 7,500 can be expected to have acceptable pour point behavior. It has also been concluded that a polymer which has an ethylene content above about 60 weight percent and $M_n$ above about 10,000 can be expected to have unacceptable pour point behavior. However, the pour point behavior of polymers having ethylene contents in the range from about 50 to 60 wt. % appear to be unpredictable. For example, polymer sample number 16 (51 wt. % ethylene and $M_n$=2,844) has a pour point of –36° C., but polymer sample number 15 (50 wt.% ethylene and $M_n$=3,370) has a pour point of –18° C. Thus, it is believed that the 50–60 wt. % range of ethylene content represents a discontinuous transitional range, wherein it is possible to achieve good pour point behavior, but not on a predictable basis.

It should be clear, in view of FIG. 2, that the advantages of the EB copolymers of the present invention over other EB copolymers depend to a degree upon the range(s) of ethylene content and/or $M_n$ in which the other polymers lie. The present invention is directed to EB copolymers which have an ethylene content of not greater than about 50 wt. %, a number average molecular weight of up to about 7,500, and a tendency not to form aggregates in mineral oil solutions, as indicated by an $S_f$ value of about zero. The advantage of the EB copolymers of the present invention over EB copolymers which have ethylene contents above about 50 wt. % (regardless of $M_n$) is the predictably acceptable pour point performance of the inventive copolymer. The advantage of the EB copolymers of the present invention over other EB copolymers which have ethylene contents below about 50 wt % and $M_n$ up to about 7,500 (and thus acceptable pour points) is the absence of aggregation in mineral oil solutions of the inventive copolymer. It is believed that this absence of aggregation exhibited by the EB copolymers of the present invention generally results in more predictable and less adverse interactions between the copolymers (and their functionalized and derivatized counterparts) and the mineral oil (e.g., interactions with the wax component of the mineral oil), relative to EB copolymers having ethylene contents and number average molecular weights in the same range, but exhibiting aggregation, as indicated by their non-zero $S_f$ values.

The EB copolymers of the invention preferably also have an average ethylene sequence length (ESL) of from about 1 to 2.50. ESL is the ratio of the total number of ethylene units in the copolymer chains to the total number of discrete ethylene sequences in the copolymer chains, as given by the following equation (II):

$$ESL = (X_{EEE} + X_{BEE+EEB} + X_{BEB})/(X_{BEB} + 0.5 \cdot X_{BEE+EEB}) \quad \text{(II)}$$

wherein $X_{EEE}$ is the mole fraction of ethylene-ethylene-ethylene triad sequences in the copolymer; $X_{BEE+EEB}$ is the mole fraction of butene-ethylene-ethylene and ethylene-ethylene-butene triad sequences; and $XBE_B$ is the mole fraction of butene-ethylene-butene triad sequences. The ESL value is an index reflecting the distribution of the units derived from ethylene in the ethylene-1-butene copolymer chains. As the value for ESL increases for a given EB copolymer of fixed ethylene content, the number of isolated ethylene units in the chains declines, and, concomitantly, the number of ethylene units per ethylene sequence increases. Naturally, as the ethylene content increases in an EB copolymer containing even a random distribution of ethylene units, the general tendency is to obtain increased ESL values.

As per equation (II), the ESL value of an EB copolymer can be calculated from $X_{EEE}$, $X_{BEE+EEB}$, and $X_{BEB}$, which are determined from the polymer's C-13 NMR spectrum, using the methods described in, for example, Randall, James C., Journal of Macromolecular Science—Reviews of Macromolecular Chemistry and Physics, C29, 201–317 (1989), and in Hsieh, Eric T. and Randall, James C., Macromolecules, 15, 353–360 (1982).

While not wishing to be bound by any particular theory, it is believed that the relatively low ESL values of the EB copolymers of the invention establish, at least in part, the structural basis for the absence of aggregation in the 1–10 weight percent mineral oil solutions of these copolymers at 20° C., as discussed supra with respect to the light scattering behavior of the copolymers. It is believed that aggregation occurs in EB copolymers which have long crystalline-like ethylene sequences in the chains, wherein the sequences in one polymer chain act as the sites for aggregation with similar crystalline-like ethylene sequences in the other chains. The relatively low ESL values of the inventive EB copolymers point to a relative absence of long crystalline-like ethylene sequences in the copolymer molecules, and thus to an absence of aggregation sites. On the other hand, EB copolymers with $S_f$ values greater than zero have relatively high ESL values, indicating that they have one or more relatively long crystalline-like ethylene sequences in most or all of their copolymer chains, and, therefore, have a tendency to aggregate. (Note: An important assumption underlying this discussion is that the total ethylene content in the copolymer is above the threshold amount necessary to allow formation of a concentration of ethylene segments sufficient to affect the aggregative behavior of the copolymer as a whole. It is possible, even at very low ethylene content, to produce a copolymer having a high value of ESL, but which, because so few ethylene segments are present on an absolute basis, will not affect aggregation behavior.).

It is believed that other types of crystallinity that may be present in the copolymer, either in addition to or as a substitute for ethylenic crystallinity, play little or no role in polymer aggregation. Thus, random EB copolymers with low ethylene content (e.g., no more than about 5 weight percent) and virtually no ethylenic crystallinity have $S_f$ values of about zero, even though these copolymers may have substantial isotactic crystallinity due to the presence of relatively long isotactic sequences derived from 1-butene in most or all of the copolymer chains; sequences which arguably could act as aggregation sites. Interestingly, it has been found that isotactic 1-butene homopolymers also have $S_f$ values of about zero, which is consistent with the theory that isotactic crystallinity has no role in determining whether or not an EB copolymer will aggregate in mineral oil solutions.

The relatively low ESL values of the EB copolymers of the invention also point to a structural basis for the pour point behavior of the EB copolymers of the invention, and thus for the dispersant additives functionalized and/or derived therefrom. As a lubricating oil is cooled, wax in the oil precipitates into crystals which form a network. As noted earlier in the section entitled "Background of the Invention," the pour point of the oil is marked by the temperature at which the fluid component of the oil is immobilized by the wax crystal network. Because the EB copolymers of the invention have a minimized content of long crystalline-like ethylene sequences (i.e., minimized wax-like character), the copolymers' participation in the formation of the wax crystal network is also minimal, along with their impact on the pour point of the oil.

By contrast, with respect to those EB copolymers with $S_f$ values greater than zero and with high pour points, the copolymers have sufficiently long crystalline-like ethylene sequences, such that they increase the pour point of the oil by participating in the formation of the wax crystal network in a disadvantageous manner as the oil cools.

As to those EB copolymers with $S_f$ values greater than zero, but which nonetheless have acceptable pour point, it appears that there is a transitional range of ethylene sequence lengths which are sufficient to cause aggregation of these copolymers, but which at the same time are either insufficient to permit the copolymer to participate effectively in the formation of the wax crystal network or are sufficient to permit an interaction, but the interaction occurs in a beneficial manner, similar to the manner a LOFI beneficially controls wax interactions.

The copolymers of this invention preferably also have a molecular weight distribution (MWD), defined as the ratio of the weight average molecular weight ($M_w$) to the number average molecular weight (i.e., MWD=$M_w/M_n$), of less than about 5, preferably less than about 4, and most preferably less than about 3. More specifically, the copolymers have a molecular weight distribution of from about 1.0 to about 3.5, and most preferably from about 1.1 to about 3. Both $M_n$ and $M_w$ can be determined by the technique of gel permeation chromatography (GPC) with a suitable calibration curve, from which MWD can be readily obtained. $M_n$ and MWD for ethylene-α-olefin copolymers, for example, can be obtained using calibration curves based upon polydisperse ethylene-α-olefin copolymers having ethylene contents similar to that of the samples under test. For a description of the determination of $M_n$ and MWD using GPC (also known as size exclusion chromatography), see W. W. Yau, J. J. Kirkland and D. D. Bly, "Modern Size Exclusion Liquid Chromatography", John Wiley and Sons, New York, 1979.

$M_n$ can alternatively be determined for certain polymers such as ethylene-α-olefin copolymers from either their proton- or carbon-13 NMR spectra obtained in solution, using conventional analytical techniques known to those skilled in the art. See, for example, "C13-NMR in Polymer Quantitative Analyses," J. C. Randall and E. T. Hiseh, in: *NMR and Macromolecules. Sequence, Dynamic, and Domain Structure*, ACS Symposium Series No. 247, 131–151 (American Chemical Society, 1984).

Preparation of the Ethylene-1-Butene Copolymer

Ethylene-1-butene copolymers of the present invention which have a relatively high degree of terminal ethylvinylidene unsaturation can be prepared by polymerizing monomer mixtures comprising ethylene and 1-butene in the presence of a catalyst system comprising at least one metallocene (e.g., a cyclopentadienyl-transition metal compound) and preferably an activator, e.g., an alumoxane compound. The term metallocene refers to compounds containing a coordination bond between a transition metal and at least one cyclopentadiene ring structure. The term cyclopentadiene ring structure includes saturated or unsaturated polycyclic structures such as indenyl and fluorenyl which incorporate a five-membered ring. The co-monomer content can be controlled through the selection of the metallocene catalyst component and by controlling the relative proportions of the ethylene and 1-butene.

The preferred method and catalysts for preparing the EB copolymers are disclosed in commonly assigned copending U.S. Ser. No. 992,690, filed Dec. 17, 1992, (Docket No. PT-937), entitled "Dilute Feed Process for the Polymerization of Ethylene-α-Olefin Copolymer Using Metallocene Catalyst System," herein incorporated by reference.

The catalysts employed in the production of these EB copolymers are organometallic coordination compounds which are cyclopentadienyl derivatives of a Group 4b metal of the Periodic Table of the Elements (56th Edition of Handbook of Chemistry and Physics, CRC Press, 1975) and include mono-, di- and tricyclopentadienyls and their derivatives of the transition metals. Particularly desirable are the metallocenes of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 C1 to C5 hydrocarbyl substituents) or other substituents, e.g. such as, for example, a trialkyl silyl substituent. The metallocene can contain one, two, or three cyctopentadienyl rings; however, two rings are preferred.

Useful metallocenes can be represented by the general formulas:

$$(Cp)_m MR_n X_q \qquad \text{(III)}$$

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

$$(C_5R'_k)_g R''_s (C_5R'_k) MQ_{3-g} \qquad \text{(IV)}$$

and $$R''_s (C_5R'_k)_2 MQ' \qquad \text{(V)}$$

wherein ($C_5R'_k$) is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$–$C_6$ ring, R" is a $C_1$–$C_4$ alkylene radical, a dialkyl germanium or silicon, or a alkyl phosphine or amine radical bridging two ($C_5R'_k$) rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula III are dialkyl metallocenes such as bis(cyclopentadienyl)titanium dimethyl, bis(cyclopentadienyl)titanium diphenyl, bis(cyclopentadienyl)zirconiumdimethyl, bis(cyclopentadienyl) zirconiumdiphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride bis(cyclopentadienyl)titanium phenyl chloride, bis(cyclopentadienyl)zirconium hydrochloride, bis(cyclopentadienyl)zirconium methyl chloride, bis(cyclopentadienyl). zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide. bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyi zirconium triphenyl, and cyclopentadienyl zirconium trineopentyl, cyclopentadienylzirconium trimethyl, cyclopentadienylhafnium triphenyl, cyclopentadienylhafniumtrineopentyl, and cyclopentadienylhafnium trimethyl.

Illustrative, but non-limiting examples of IV and V metallocenes which can be usefully employed are monocyclopentadienyl-titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl) Ti=$CH_2$. Al$(C_3)_3$,

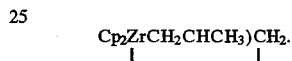

substituted bis(Cp)Ti(IV) compounds such as bis(indenyl) titanium diphenyl or dichloride, bis (methylcyclopentadienyl)titanium diphenyl or dihalides; dialkyl, trialkyl, tetra-alkyl and penta-alkyl cyclopentadienyltitanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae IV and V.

Illustrative but non-limiting examples of the zirconocenes of Formula IV and V which can be usefully employed are, pentamethylcyclopentadienyl zirconium trichloride, pentaethylcyclopentadienyl zirconium trichloride, the alkyl substituted cyclopentadienes, such as bis (ethylcyclopentadienyl)zirconium dimethyl, bis(beta-phenylpropylcyclopentadienyl)zirconium dimethyl, bis (methylcyclopentadienyl)zirconium dimethyl, bis(n-butylcyclopentadienyl)zirconium dimethyl bis (cyclohexylmethylcyclopentadienyl)zirconium dimethyl bis (n-octyl-cyclopentadienyl)zirconium dimethyl, and haloalkyl and dihydride, and dihalide complexes of the above; dialkyl, trialkyl, tetra-alkyl, and penta-alkyl cyclopentadienes, such as bis (pentamethylcyclopentadienyl)zirconium diphenyl, bis (pentamethylcyclopentadienyl)zirconium dimethyl, bis(1,2-dimethylcyclopentadienyl)zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl) zirconium dichloride and dimethyl bis(1,3-di-trimethylsilylcyclopentadienyl)zirconium dichloride and dimethyl and bis(1,2,4-tri-trimethylsilylcyclopentadienyl) zirconium dichloride and dimethyl. Carbenes represented by the formulae Cp2Zr=C2 P (C65)2C3, and derivatives of these compounds such as

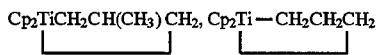

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl)zirconium dichloride, and cyclopentadienyl(indenyl)zirconium dichloride can be employed.

Bis(cyclopentadienyl)hafnium dichloride, bis (cyclopentadienyl)hafnium dimethyl, bis(cyclopentadienyl) vanadium dichloride and the like are illustrative of other metallocenes.

Some preferred metallocenes are bis(cyclopentadienyl) zirconium dimethyl, bis(cyclopentadienyl)zirconium dichloride; bis(cyclopentadienyl)titanium dichloride; bis (methylcyclopentadienyl)zirconium dichloride; bis (methylcyclopentadienyl)titanium dichloride; bis(n-butylcyclopentadienyl)zirconium dichloride; dimethylsilyldicyclopentadienyl zirconium dichloride; bis (trimethylsilycyclopentadienyl)zirconium dichloride; and dimethylsilyldicyclopentadienyl titanium dichloride; bis (indenyl)zirconium dichloride; bis(4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis (methylcyclopentadienyl)zirconium dichloride.

The alumoxane compounds useful in the polymerization process may be cyclic or linear. Cyclic alumoxanes may be represented by the general formula (R—Al—O)$_n$ while linear alumoxanes may be represented by the general formula R(R—Al—O)$_n$.AlR$_2$. In the general formula R is a C1–C5 alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for example, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to 1000:1, and desirably about 1:1 to 100:1. Preferably, the mole ratio will be in the range of about 50:1 to 5:1 and most preferably about 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and 300° C., preferably between about 30° and 200° C. Reaction time is not critical and may vary from several hours or more to several minutes or less, depending upon factors such as reaction temperature and the like. One of ordinary skill in the art may readily obtain the optimum reaction time for a given set of reaction parameters by routine experimentation.

The catalyst systems described herein are suitable for the polymerization of ethylene and 1-butene in solution over a wide range of pressures. The polymerization can be completed at a pressure of from about 10 to 3,000 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid 1-butene as the reaction medium. Alternatively, polymerization may be accomplished in the presence of a hydrocarbon inert to the polymerization such as butane, isobutane, pentane, isopentane, hexane, isooctane, decane, toluene, xylene, and the like.

The feedstream containing the 1-butene reactant may optionally contain certain amounts of other $C_4$ hydrocarbons. More particularly, the feedstream can comprise less than about 5 weight percent isobutylene, at least about 12 weight percent total n-butenes (i.e., 1-butene and 2-butene), and less than about 1 weight percent butadiene, together with n-butane and isobutane. When used to prepare the EB copolymer, a preferred $C_4$ feedstream comprises spent $C_4$ streams produced as by-product in the manufacture of polyisobutylene, wherein the $C_4$ feedstream (often referred to as Raffinate II) contains less than about 5 weight percent isobutylene, about 10 to 70 weight percent saturated butanes and about 15 to 85 weight percent 1-butene and 2-butene. The saturated butanes function as a diluent or solvent in the reaction mixture. Typically the $C_4$ feedstream is maintained at a sufficient pressure to be in the liquid form both at the reactor inlet and in the reaction mixture itself at the reaction temperature.

The polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and 1-butene comonomer are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

Employing a metallocene-alumoxane catalyst in accordance with the procedures and under the conditions as described above can produce an ethylene-1-butene copolymer having an ethylvinylidene group terminating at least about 30% of all polymer chains. However, these procedures alone do not ensure that the resulting EB copolymer has the requisite $S_f$ value of about zero, the property which determines the polymer to be suitable for use as a backbone for lubricating oil dispersant additives.

To produce the EB copolymers of the invention, the following catalysts, procedures and conditions are preferred. The catalyst is preferably a catalyst selected from the general formulae IV and V discussed earlier, wherein s=1, g=1 or 2, and M is a Group 4b transition metal selected from the group consisting of zirconium and titanium, and other values and terms as defined earlier. More preferably, the catalyst has the general formula IV, wherein M is zirconium, s=1, g=1, and each R', either the same or different, is an alkyl radical having from 1 to 7 carbon atoms or is a hydrocarbyl radical wherein two carbon atoms of the radical are substituted at two adjacent carbon atoms on the cyclopentadienyl ring to form a fused ring structure with the cyclopentadienyl ring selected from the group consisting of indenyl, dihydroindenyl and tetrahydroindenyl, and R" is as defined earlier. The most preferred catalysts are those of general formula IV with s=1, g=1, and R' as defined in the last sentence, and in which R" is a dialkyl-silicon-containing radical bridging the two $(C_5R'_k)$ rings. Illustrative of the most preferred catalysts are 1,1-dimethylsilyl-bridged bis(4, 5,6,7-tetrahydroindenyl)zirconium dichloride and 1,1-dimethylsilyl-bridged bis(methylcyclopentadienyl) zirconium dichloride.

The polymerization is preferably conducted using either liquid 1-butene or a mixture of liquid 1-butene in an inert hydrocarbon solvent or diluent at a temperature ranging from about 50° to 200° C. and a pressure from about 10 to 100 bar, preferably from about 10 to 30 bar. When a solvent/diluent is employed, it is preferably a $C_4$ hydrocarbon (i.e., n-butane, isobutane, or mixtures thereof). The 1-butene feed may also contain certain amounts of other $C_4$ hydrocarbons, of the kinds and in the amounts earlier discussed.

The ethylene and 1-butene, whether as a liquid or mixed with a solvent/diluent, may be fed to the reactor as separate streams or as a single, pre-mixed stream. In either case, the ethylene content of the resulting polymer is controlled in part by the weight percent ethylene content, based upon the total weight of monomer, entering the reactor. The EB copolymer typically contains from 1 to about 50 weight percent ethylene. Of course, the amount of ethylene incorporated into the EB copolymer depends upon the particular reaction conditions employed and the catalyst system selected. For a given set of conditions and a given catalyst system, the amount of ethylene required to provide an EB copolymer with a particular ethylene content can be readily determined by those skilled in the art without undue experimentation.

While conducting the polymerization, there is preferably sufficient mixing of the ethylene and 1-butene monomers in the reactor in order to avoid the production of ethylene homopolymer and to avoid the production of EB copolymers with $S_f$ values greater than zero. More particularly, it is preferred that ethylene monomer and 1-butene monomer together enter a turbulent zone inside the reactor. This can be accomplished in a stirred reactor, for example, by placing all of the monomer feed inlets near to each other and near the impeller blade. Mixing is also facilitated by the use of a dilute pre-mixed feed as described in the above referred to Dilute Feed Process patent application.

Sufficient mixing in the reactor promotes the random incorporation of ethylene units in the growing polymer chains, resulting thereby in EB copolymers of relatively homogeneous composition (both inter-chain and intra-chain) and relatively short sequences of ethylene (i.e., low ESL values), compared to analogous EB copolymers produced without such mixing. As discussed supra, it is believed that the reason the EB polymers of the invention have $S_f$ values of about zero is that the copolymer molecules contain relatively few crystalline-like, long ethylene sequences capable of acting as sites for aggregation. Sufficient mixing, thus, reduces the probability that sites for aggregation will form in the polymer molecules. Effective mixing is especially important to the production of EB copolymers of the invention having high ethylene content (i.e., above about 35 weight percent), because, without mixing, the resulting EB copolymers would tend to have sufficient ethylenic crystallinity in the copolymer molecules, as manifested by ESL values above about 2.50, to exhibit $S_f$ values above zero.

With a preferred catalyst employed in accordance with the procedures and conditions as just described an EB copolymer of the invention is produced; i.e., an EB copolymer which has an $S_f$ value of about zero and an ethylvinylidene group terminating at least about 30% of all polymer chains.
Functionalized Polymers The polymers produced in accordance with the present invention can be functionalized. By functionalized, it is meant that the polymer is chemically modified to have at least one functional group present within its structure, which functional group is capable of: (1) undergoing further chemical reaction (e.g. derivatization) with other material and/or (b) imparting desirable properties, not otherwise possessed by the polymer alone, absent such chemical modification.

More specifically, the functional group can be incorporated into the backbone of the polymer, or as pendant groups from the polymer backbone.

The functional group typically will be polar and contain hetero atoms such as P, O, S, N, halogen and/or boron. It can be attached to the saturated hydrocarbon part of the polymer via substitution reactions or to an olefinic portion via addition or cycloaddition reactions. Alternatively, the functional group can be incorporated into the polymer by oxidation or cleavage of a small portion of the end of the polymer (e.g. as in ozonolysis).

Functionalization of the polymer backbone with substituent functional groups typically relies on an ethylenic unsaturation, preferably a terminal ethylenic unsaturation, present in the polymer for reaction with a functional compound containing or constituting the functional group.

Thus, reaction of these functional compounds and the polymer can occur through a variety of mechanisms. Useful and preferred functional groups include halogen, carboxyl materials present as acids, esters, salts, or anhydrides, alcohols, amines, ketones, aldehydes and the like.

Useful functionalization reactions include: maleation, which is the reaction of the polymer at the point of unsaturation with maleic acid or anhydride; halogenation of the polymer at the olefinic bond and subsequent reaction of the halogenated polymer with an ethylenically unsaturated functional compound; reaction of the polymer with an unsaturated functional compound by the "ene" reaction absent halogenation; reaction of the polymer with at least one phenol group; (this permits derivatization in a Mannich Base-type condensation); reaction of the polymer at its point of unsaturation with carbon monoxide using a Koch-type reaction wherein an acid group such as an iso acid or neo acid is formed; reaction of the polymer with the functional compound by free radical addition using a free radical catalyst; and reaction of the polymer by air oxidation methods, epoxidation, chloroamination or ozonolysis.

Characterization of the degree to which the polymer has been functionalized is referred to herein as "functionality".

Functionality refers generally to the average number of functional groups present within the polymer structure per polymer chain. Thus, functionality can be expressed as the average number of moles of functional groups per "mole of polymer". When said "mole of polymer" in the functionality ratio includes both functionalized and unfunctionalized polymer, functionality is referred to herein as F. When said "mole of polymer" includes only functionalized polymer, functionality is referred to herein as F*.

The distinction between F and F* arises, when all the polymer chains do not undergo reaction with the functional compound. In this instance typical analytical techniques employed to determine F* will normally necessitate identification of the weight fraction of functionalized polymer, based on the total weight of polymer (functionalized+ unfunctionalized) in the sample being analyzed for functionality. This weight fraction is commonly referred to as Active Ingredient or AI. Since the determination of AI is a separate analytical step, it can be more convenient to express functionality as F rather than F*. In any event, both F and F* are alternate ways of characterizing the functionality.

As a general proposition, the polymer of the present invention can be functionalized to any functionality effective to impart properties suitable for the end use contemplated.

Typically, where the end use of the polymer is for making dispersant, e.g. as derivatized polymer, the polymer will possess dispersant range molecular weights ($M_n$) and the functionality will typically be significantly lower than for polymer intended for making derivatized multifunctional V.I. improvers, where the polymer will possess viscosity modifier range molecular weights ($M_n$) as described above.

Moreover, the particular functionality selected, for polymer intended to be derivatized, will depend on the nature of the derivatization reactions and type and number of chemical linkages established by the derivatizing compound.

In most instances, one derivatizing linkage will be formed for each functional group, e.g., each carboxy functional group will form 1 ester linkage. However, certain functional groups can not only act individually to form a single derivatizing linkage, but also collectively such that two functional groups form a single derivatizing linkage.

For example, where two carboxy groups form an anhydride group and the derivatizing group is a primary amine it is possible to form, inter-alia, two amide linkages or one imide linkage. Thus, while the anhydride group contains two carboxy functional groups, the chemical effect obtainable therefrom when both functional groups react, depends on the number of derivatizing linkages achieved.

Accordingly, for purposes of the present invention, when functionality is reported hereinafter in the context of describing functionalized polymer intended for derivatization, and the subject functional groups are capable of forming less than one derivatizing linkage per functional group, such functionality recitation is to be interpreted as representing the average number of derivatizing. linkages to be produced per polymer chain.

Thus, where the derivatizing linkage is to be an imide, and the functional groups are anhydride carboxy groups, a functionality of "2" is intended to represent "2" derivatizing imide linkages and consequently, in effect, an average of two anhydride groups per polymer chain (rather than two carboxy functional groups) since each anhydride will form one derivatizing imide linkage. However, where the derivatizing linkage is to be an amide, and the functional groups are anhydride carboxy groups, a functionality of "2" represents "2" amide derivatizing linkages and consequently, in effect, a single anhydride group since one anhydride will form two amide derivatizing linkages.

Accordingly, while any effective functionality can be imparted to the functionalized polymer intended for subsequent derivatization, it is contemplated that such functionalities, expressed as F*, can be for dispersant end uses, typically not greater than about 3, preferably not greater than about 2, and typically can range from about 1 to about 3, preferably from about 1.5 to about 2.5, and most preferably from about 1.1 to about 2 (e.g. 1.2 to about 1.3).

F and F* values can be interconnected using the Al which for polymers of the present invention typically are at least about 0.50, preferably from 0.65 to 0.99, more preferably from 0.75 to 0.99, yet more preferably 0.85 to 0.99. However, the upper limit of A.I. is typically from 0.90 to 0.99, and more typically 0.90 to 0.95. Where A.I. is 1.0 F=F*.

Acyl Functionalized Polymer

The most preferred functionalities for technique of the present invention is to chemically modify the polymer to have chemical moieties present within its structure which contain or constitute at least one acyl functional group, i.e.

wherein X is hydrogen, nitrogen, hydroxy, oxyhydrocarbyl (e.g. ester), oxygen, the salt moiety —OM wherein M is a metal, e.g. alkali, alkaline earth, transition metal, copper zinc and the like, oxyhetero, e.g. —O—Z wherein Z represents a hetero atom such as phosphorus boron, sulfur, which hetero atom may be substituted with hydrocarbyl or oxyhydrocarbyl groups, or two acyl groups may be joined through (X).

Within this broad class of compounds the most preferred are acyl groups derived from monounsaturated mono- or dicarboxylic acids and their derivatives, e.g. esters and salts.

More specifically, polymer functionalized with mono- or dicarboxylic acid material, i.e., acid, anhydride, salt or acid ester suitable for use in this invention, includes the reaction product of the polymer with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said monounsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxyl group, i.e., of the structure

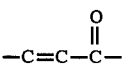

and (iv) derivatives of (iii) such as $C_1$ to $C_5$ alcohol derived monoesters of (iii). Upon reaction with the polymer, the double bond of the monounsaturated carboxylic reactant becomes saturated. Thus, for example, maleic anhydride reacted with the polymer becomes succinic anhydride, and acrylic acid becomes a propionic acid. Reference is made to EP Publication No. 0,441,548-A1, hereby incorporated by reference.

Suitable unsaturated acid materials thereof which are useful functional compounds, include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and lower alkyl (e.g. $C_1$ to $C_4$ alkyl) acid esters of the foregoing, e.g. methyl maleate, ethyl fumarate, methyl fumarate, etc. Particularly preferred are the unsaturated dicarboxylic acids and their derivatives, especially maleic acid, fumaric acid and maleic anhydride.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unfunctionalized polymer. The mono- or dicarboxylic acid functionalized polymer, non-functionalized polymer, and any other polymeric by-products, e.g. chlorinated polyolefin, (also included within "unfunctionalized" polymer) are collectively referred to herein as "product residue" or "product mixture". The unfunctionalized polymer is typically not removed from the reaction mixture (because such removal is difficult and would be commercially infeasible) and the product mixture, stripped of any monounsaturated carboxylic reactant can be used in further derivatization reactions with, for example, amine, alcohol, metal salt and the like as described hereinafter to make dispersant.

The functionality (F) of the polymer can be based upon (i) a determination of the saponification number (SAP) of the reaction mixture using potassium hydroxide and (ii) the number average molecular weight of the polymer charged ($M_n$).

For example, for the case where maleic anhydride is the monounsaturated carboxylic reactant, the saponification number (SAP) is the number of mg pure potassium hydroxide which are consumed in the total saponification of 1 g of material investigated and in the neutralization of any free acid.

In the hydrolysis and subsequent neutralization of succinic anhydride groups (SA) two moles of KOH (molecular weight 56.1; two moles=112,200 mg) are consumed per mole anhydride groups.

The molecular weight of the polymer (p) is $$M_n(p)+(98*x)$$

wherein Mn is the number average molecular weight of the unfunctionalized starting polymer charged to the functionalization reaction mixture, 98 is the molecular weight of maleic anhydride and x is the degree of succination:

$$x = \frac{\text{moles } SA \text{ groups}}{\text{mole } (p)}$$

Depending on the degree of succination, the consumption of mg KOH per mole of functionalized polymer is 2×mole KOH or $$112200x$$

Thus, the saponification number of functionalized polymer is $$SAP = \frac{112200\ (x)}{M_n(p)+98\ (x)}$$

Therefrom one obtains:

$$x = \frac{SAP * M_n(p)}{112200-(SAP*98)}$$

However, since there are two functional groups (i.e., carboxyl groups) per succinic group and absent derivatizing linkage considerations, the functionality (F) is determined from the equation:

$$F = \frac{(y)(SAP)*M_n(p)}{112200-(SAP*98)} \qquad (VI)$$

wherein y is the number 2.

It will be observed that the $M_n$ in the formula defining (F) is the number average molecular weight of the polymer changed to the functionalization reaction mixture. The use of the starting polymer as a basis for determining the $M_n$ in the formula (VI) is based on the assumptions (1) that the $M_n$ of the starting polymer does not undergo a significant change (e.g., not greater than about ±5% change during functionalization and (2) that functionalization does not occur preferentially within one or more molecular weight regions in the polymer molecular weight distribution to any significant degree (e.g., the MWD of the starting polymer is within ±5% of the MWD of only the functionalized polymer). Therefore, under these assumptions the $M_n$ of the starting and functionalized polymer are assumed to be sufficiently similar to employ, as a matter of convenience, the $M_n$ of the starting polymer in Formula VI.

To the extent that the above assumptions. are incorrect, the functionality determined by Formula VI will be incorrect and it will be necessary to determine the $M_n$ of functionalized polymer and either derive a statistically valid correction factor for the starting polymer Mn which reflects the deviations from the above assumptions or employ the functionalized polymer $M_n$ directly in Formula VI.

Moreover, as would be obvious to one skilled in the art, when the polymer is functionalized with a monocarboxylic acid group, y in Formula VI will be 1.

Alternatively, functionality (F*) for polymer functionalized with maleic anhydride (and absent derivatizing end use considerations) is determined by the following equation:

$$F^* = \frac{\frac{SAP}{AI} * M_n(p)(y)}{112,200 - \frac{SAP}{AI} * 98}$$

wherein AI, SAP and $M_n(p)$ and (y) are as described above.

The polymer of the present invention can be functionalized with the monounsaturated carboxylic reactant by a variety of methods. Such methods include halogen assisted "ene" reactions and free radical grafting reactions.

Halogen Assisted Polymer Functionalization

For halogen assisted polymer functionalization, the polymer can be first halogenated, (e.g. chlorinated or brominated) to about 1 to 8 wt. %, preferably 3 to 7 wt. % chlorine, or bromine, based on the weight of polymer, by passing the chlorine or bromine through the polymer at a temperature of 60° C. to 250° C., preferably 110° C. to 160° C., e.g. 120° C. to 140° C., for about 0.5 to 10, preferably 1 to 7 hours. The halogenated polymer may then be reacted with sufficient monounsaturated carboxylic reactant at 100° C. to 250° C., usually about 180° C. to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435 and in U.K. 1,440,219.

The polymers of this invention, which are charged to the alkylation reaction zone (zone where the unsaturated acid reacts with polymer), can be charged alone or together with (e.g., in admixture with) polyalkenes, derived from alkenes having from 1 to 20 carbon atoms (pentene, octene, decene, dodecene, tetradodecene and the like) and homopolymers of $C_3$ to $C_{10}$, e.g. $C_2$ to $C_5$ monoolefins, and other copolymers of $C_2$ to $C_{10}$, e.g. $C_2$ to $C_5$ monoolefins, said additional polymer having a number average molecular weight of at least about 900, and preferably a molecular weight distribution of less than about 4.0, preferably less than about 3.0 (e.g., from 1.2 to 2.8). Preferred such additional olefin polymers comprise a major molar amount of $C_2$ to $C_{10}$, e.g.

$C_2$ to $C_5$ monoolefin. Such olefins include ethylene, propylene, butylene, isobutylene, pentene, octene-1, styrene, etc. Exemplary of the additionally charged homopolymers are polypropylene and polyisobutylene olefins and the like as well as interpolymers of two or more of such olefins such as copolymers of: ethylene and propylene (prepared by conventional methods, ethylenepropylene copolymers which are substantially saturated, wherein less than about 10 wt. % of the polymer chains contain ethylenic unsaturation). The additional such olefin polymers charged to the alkylation reaction will usually have number average molecular weights of at least about 900 and in embodiments for use as dispersants, more generally within the range of about 1,300 to about 5,000, more usually between about 1,500 to about 4,000. Particularly useful such additional olefin polymers have number average molecular weights within the range of about 1,500 and about 3,000 with approximately one double bond per chain. A useful additional polymer can be polyisobutylene. Preferred are mixtures of such polyisobutylene with ethylene-propylene copolymers wherein at least 30 wt. % of the copolymer chains contain terminal vinylidene monounsaturation.

The polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° C. to 100° C. and a pressure of from about 0.1 to 0.9 atmospheres and a time of from about 0.5 to 20 hours (e.g., 2 to 8 hours) will be sufficient. The polymer and monounsaturated carboxylic reactant and halogen (e.g., chlorine gas), where employed, are contacted for a time and under conditions effective to form the desired functionalized polymer. Generally, the polymer and monounsaturated carboxylic reactant will be contacted in an unsaturated carboxylic reactant to polymer mole ratio usually from about 0.7:1 to 4:1, and preferably from about 1:1 to 2:1, at an elevated temperature, generally from about 120° C. to 260° C., preferably from about 160° C. to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polymer will normally react with the monounsaturated carboxylic acid reactant. Upon carrying out a thermal reaction without the use of halogen or a catalyst, only about 50 to 75 wt. % of the polymer will react. Chlorination helps increase the reactivity.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The functionalized polymer thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefinic polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

"ENE" Acid Functionalized Polymer

The polymer and the aforedescribed monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Functionalized polymer can be prepared using a thermal "ene" type reactor or by chlorination as disclosed in EP Application No. 91300843.9 (=Published Application No. 441,548) hereby incorporated by reference.

Free Radical Grafted Acid Functionalized

An ethylenically unsaturated carboxylic acid or derivative thereof may be grafted onto saturated or unsaturated polymer backbone in solution or in solid form using a radical initiator. It is carried out at an elevated temperature in the range of about 100° C. to 250° C., preferably 120° C. to 190° C. and more preferably at 150° C. to 180° C. Suitable unsaturated acids include those described above.

The free radical initiators which may be used are peroxides, hydroperoxides, and azo compounds and preferably those which have a boiling point greater than about 100° C. and decompose thermally within the grafting temperature range to provide free radicals. Representative of these free radical initiators are azobutyronitrile and 2,5-dimethyl-hex-3-yne-2,5 bis-tertiary-butyl peroxide. The initiator is used in an Mount of between about 0.005% and about 1% by weight based on the weight of the reaction mixture. The grafting is preferably carried out in an inert atmosphere, such as under nitrogen blanketing. The resulting functionalized polymer is characterized by having carboxylic acid moieties or derivatives randomly distributed within its structure.

Free radical grafting is particularly suited for functionalizing intermediate molecular weight polymers pursuant to preparing multifunctional viscosity index improvers, wherein mechanical or thermal shearing techniques (e.g., mastication) are often employed. This functionalization technique nonetheless can be employed to functionalize polymer intended to make dispersants, but the functionality typically will be limited, and/or derivatization and/or post-treatment is typically controlled to avoid gellation of the dispersant as described in commonly assigned U.S. Ser. No. 992,516 filed Dec. 17, 1992 (Docket No. PT-964), titled Gel Free Ethylene Interpolymer Derived Dispersant Additive Useful in Oleaginous Compositions, and U.S. Ser. No. 991,837, filed Dec. 17, 1992, titled Gel-Free α-Olefin Derived Dispersant Additive Useful in Oleaginous Compositions (Docket No. PT-967) the disclosure of which are herein incorporated by reference.

Hydroxy Aromatic Compounds

A further suitable functionalization technique involves the reaction of hydroxy aromatic functional compounds with the polymer.

Hydroxy aromatic compounds useful in the preparation of the functionalized polymer of this invention include those compounds having the formula:

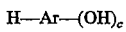

wherein Ar represents

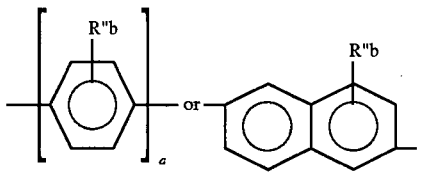

wherein a is 1 or 2, R" is a halogen radical such as the bromide or chloride radical, b is an integer from 0 to 2, and c is an integer from 1 to 2. Illustrative of such Ar groups are phenylene, biphenylene, naphthylene and the like.

The polymer, i.e. EB copolymer, having at least one olefinic unsaturation and hydroxy aromatic compound is contacted in the presence of a catalytically effective amount of at least one acidic alkylation catalyst under conditions effective to alkylate the aromatic group of the hydroxy aromatic compound. The alkylation catalyst is conventional and can, with the polymer, comprise inorganic acids such as $H_3PO_4$, $H_2SO_4$, HF, $BF_3$, HF-$BF_3$ and the like. The acid catalyst can also comprise an acidic ion exchange resin having acidic groups adsorbed or absorbed thereon, such as Amberlyst 15 resin (Rohm & Haas Co.), and the like. Also useful as catalysts are preformed complexes (or complexes formed in situ) of the foregoing with $C_2$ to $C_{10}$ ethers, $C_1$ to $C_{10}$ alcohols, $C_2$ to $C_{10}$ ketones, phenols and the like, such as $BF_3$ complexed with dimethyl ether, diethyl ether, phenol, and the like.

The hydroxy aromatic compound and polymer will be generally contacted in a ratio of from about 0.1 to 10, preferably from about 1 to 7, more preferably from about 2 to 5 moles of the aromatic compound per mole of the polymer. The selected acid catalyst can be employed in widely varying concentrations. Generally, when the acid catalyst comprises an inorganic catalyst, the acid catalyst will be charged to provide at least about 0.001, preferably from about 0.01 to 0.5, more preferably from about 0.1 to 0.3 moles of catalyst per mole of hydroxy aromatic compound charged to the alkylation reaction zone. Use of greater than 1 mole of the inorganic catalyst per mole of hydroxy aromatic compound is not generally required. When the acid catalyst comprises a supported catalyst, such as an acidic ion exchange resin, the reactants can be contacted with the ion exchange resin employing any conventional solid-liquid contacting techniques, such as by passing the reactants through the resin (e.g., in a catalyst bed or through a membrane impregnated or otherwise containing the resin catalyst) and the upper limit on the moles of catalyst employed per mole of hydroxy aromatic compound is not critical.

The temperature for alkylation can also vary widely, and will usually range from about 20° C. to 250° C., preferably from about 30° C. to 150° C., more preferably from about 50° C. to 80° C.

The alkylation reaction time can vary and will generally be from about 1 to 5 hours, although longer or shorter times can also be employed. The alkylation process can be practiced in a batchwise, continuous or semicontinuous manner. Preferably, the acid catalyst is neutralized and/or removed prior to contacting the alkylation product mixture with a nucleophilic reagent (e.g., polyamine) and aldehyde reactant. The neutralization can be accomplished by contacting the crude alkylation product with gaseous ammonia or other basically reacting compound (e.g., aqueous NaOH, KOH, and the like), followed by filtration to remove any precipitated neutralized catalyst solids. Alkylation processes of the above types are known and are described, for example, in U.S. Pat. Nos. 3,539,633 and 3,649,229, the disclosures of which are hereby incorporated by reference.

Oxidation

Oxidation of the polymer represents another suitable technique applicable to the polymers of the present invention. This technique can be further categorized as including air oxidation (e.g. oxidation with oxygen or oxygen-containing gas), ozonolysis, and hydroperoxidation.

As a result of oxidation, the ethylene and butene units at the terminal and intermediate of the polymer chain are randomly oxidized and thus have at least one oxygen containing functional group.

Examples of the oxygen containing functional group include carboxyl, oxycarboxyl (ester bond), formyl, carbonyl and hydroxyl groups. The functionality (F*) of the oxidized polymer will be as described generally hereinabove.

More specifically, the polymer of the present invention having unsaturation, typically terminal unsaturation, can be functionalized by an air oxidation process such as those recited in U.S. Pat. Nos. 4,925,579 and 4,943,658, both hereby incorporated by reference.

A useful process comprises contacting the polymer, preferably in the liquid state, with molecular oxygen, ozone or a mixture thereof at a temperature of from 100° C. to 250° C., typically from 120° C. to 190° C. to oxidize the polymer until an oxygen content in the range of from 0.1 to 20% by weight is reached or until an acid value having a range of from 0.1 to 50 or saponification value in the range of 0.1 to 100 are reached. Pressures are typically up to 600 bar, and preferably 50 to 300 bar. The polymer oxidized at this extent is effective in formulating dispersants and viscosity modifiers.

The oxidatively modified polymer of the present invention can be prepared by oxidizing the above recited polymers with a gas containing molecular oxygen and/or ozone, optionally in an inert hydrocarbon medium. The molecular oxygen-containing gas used for oxidation includes oxygen gas, air and gaseous mixtures of molecular oxygen diluted with an inert gas such as nitrogen, argon and carbon dioxide to a proper concentration. The ozone-containing gases include ozone, gaseous mixtures of ozone and oxygen or air, and gaseous mixtures of ozone or ozone plus oxygen or air diluted with an inert gas such as nitrogen, argon and carbon dioxide to a proper concentration. The gas containing molecular oxygen and ozone may be any mixtures of the foregoing.

The inert hydrocarbon medium which may be used in oxidative reaction include, for example, pentane, hexane, heptane, octane, decane, dodecane, kerosine, gas oil, benzene, toluene, xylene and the like.

Oxidation of the polymer is generally carried out in the absence of a catalyst, but may be carried out in the presence of a radical initiator or an oxidative catalyst. Examples of the radical initiator include organic peroxides such as benzoyl peroxide, di-tert-butyl peroxide, tert-butyl hydroperoxide, dicumyl peroxide, and 2,5-dimethyl-2,5-di(peroxybenzoate)-hexyne-3. Examples of the oxidative catalyst include inorganic compounds such as cobalt acetate, manganese chloride, copper, nickel oxide, manganese dioxide, and cobalt naphthenate.

Oxidation of the polymer is effected at a temperature in the range of from 100° C. to 250° C., preferably from 120° C. to 230° C., more preferably from 130° C. to 200° C. The time taken for the oxidation reaction ranges from 10 minutes to 20 hours, preferably from 30 minutes to 10 hours. The oxidation may be carried out either in atmospheric pressure or in applied pressure. The reaction mixture obtained at the end of oxidative reaction may be worked up by a conventional technique obtaining the oxidatively modified copolymer of the present invention.

U.S. Pat. No. 4,076,738; EP Publication No. 0389722 and WO90/09371 relate to ozonolysis. A useful method of ozonolysis is to introduce a stream comprising one to 10% by weight of ozone in a carrier gas. The ozone concentration in the gas is not critical and any practical concentration can be used. The carrier gas can be nitrogen, air or oxygen and is preferably air or oxygen. Useful ozonation temperatures are from about −80° C. to 60° C. and preferably −10° C. to 30° C.

The polymer of the present invention, can also be functionalized by hydroperoxidation in accordance with the method of U.S. Pat. No. 4,925,579. Hydroperoxidation can be carried out in solvents relatively inert to the reaction conditions. Solvents such as toluene, xylene, or mineral neutral oils can be used. Preferred solvents are benzene, chlorobenzene, t-butyl-benzene and the like. Free radical initiators are used which can be peroxides, hydroperoxides and azo compounds, which may be used alone or as mixtures thereof, include, for example, cumene hydroperoxide, dicumyl peroxide, benzoyl peroxide, azo-bis (isobutyronitrile), tertiary butyl hydroperoxide, and the like. Preferably, the free radical initiator is cumene hydroperoxide, dicumyl peroxide, and mixtures thereof. These free radical initiators have been conventionally employed in effecting hydroperoxidation of polymers and copolymers.

The more vigorous the oxidation conditions and the longer the length of time maintaining such conditions, the greater the number of carboxyl groups introduced into the starting material. It is sufficient, however, that on an average at least one carboxyl is introduced into each molecule of the starting material.

The product produced by the hydroperoxidation reaction is an oil-soluble product of lower molecular weight than the starting material. The molecular weight depends upon the extent and conditions employed during the oxidation reaction. Ultimately, the intermediate hydroperoxidized polymers are converted by further oxidation reactions to fragmented or degraded polymer materials having a viscosity average molecular weight of from about one-half to about one-tenth of the molecular weight of the original material. The functionality (F*) of the carboxylated polymers is in the range of from 1 to 15 as generally described above depending on the end use.

Hydroformylation

The polymer of the present invention can be functionalized by hydroformylation by methods of the type disclosed in U.S. Pat. Nos. 4,832,702; 4,859,210 and GB Patent No. 1,049,291, all hereby incorporated by reference.

The process of hydroformylation can be carried out using a conventional rhodium or cobalt catalyst at from 80° C. to 200° C., preferably 120° C. to 190° C. and under a $CO/H_2$ pressure of up to 600, preferably 50 to 300 bar. The reaction can be conducted in two stages. The first stage is conducted at a low temperature, e.g., 100° C. to 150° C., and the second stage at a high temperature, e.g., 160° C. to 200° C. The oxygen-containing polymer resulting from the hydroformylation process are formed by addition of carbon monoxide and hydrogen to a double bond. Reactive double bonds are predominantly converted to aldehydes and ketones. Isomerization can cause a mixture of aldehydes to be obtained.

Epoxidation

The polymers of the present invention can be functionalized by epoxidation as disclosed in U.S. Pat. No. 4,981,605, Japanese Application JP H01-t32,605, PCT WO90/10022 and EP 461,744, all hereby incorporated by reference.

In accordance with the method disclosed in Japanese Application S62-289292 (=Published Application No. H01-132,605), hydrogen peroxide or organic peroxides are allowed to react with the polymer. In particular, the polymer is mixed with an acid, preferably an organic acid, such as formic or acetic acid plus hydrogen peroxide. It is preferred that a buffer in the form of sodium hydrogen phosphate, sodium carbonate or sodium bicarbonate be present. The amount of organic acid per mole of hydrogen peroxide is typically from 2 to 50 moles and preferably 5 to 25 moles. The reaction temperature is typically from 0° C. to 60° C. and preferably 10° C. to 50° C., the reaction time of typically from 0.5 to 20 hours, preferably 1 to 10 hours. The amount of hydrogen peroxide added typically will be 1 to 10, preferably 2 to 5 moles per mole of unsaturated bond of polymer, and the amount of added organic acid typically will be 10 to 100, and preferably 20 to 50 moles. The amount of buffer per mole of organic acid typically will be 0.05 to 0.5, preferably 0.1 to 0.3 moles. The reaction temperature typically will be 0° C. to 100° C., preferably 20° C. to 80° C., and the time required typically will be 1 to 30 and preferably to 20 hours. The polymer concentration typically will be 5 to 400, preferably 10 to 300 g per liter.

Where an organic peroxide is used it typically will be from 1 to 10, preferably 1 to 5 moles per mole of unsaturated bond of the polymer. The compound of preference is organic per carbonate. The reaction temperature typically will be 0° C. to 100° C., preferably 10° C. to 80° C. and the reaction time typically will be 0.1 to 10, preferably 0.5 to 5 hours. The polymer concentration should be 5 to 400 g per liter and preferably 10 to 300 g per liter.

The solvent used in the preparation of liquid epoxidated EB copolymer can be an aromatic hydrocarbon such as benzene, toluene or xylene or an ether such as ethyl ether, tetrahydrofuran or dioxane. This method is also disclosed in U.S. Pat. No. 4,981,605.

The functionalized polymer produced by epoxidation contains epoxy groups formed at the carbon-carbon unsaturation bond. Preferably the polymer is terminally unsaturated.

Koch Functionalized Polymer

Yet another method to functionalize the polymer of the present invention is by a Koch-type reaction as disclosed in commonly assigned copending U.S. Ser. No. 992,403, filed Dec. 18, 1992, (Docket No. PT-941), and entitled *Functionalization of Polymers Based on Koch Chemistry and Derivatives Thereof*, herein incorporated by reference.

The polymer of the present invention having unsaturation, preferably terminal unsaturation, can be reacted via the Koch mechanism to be functionalized with an acid or an ester. The polymer is contacted with carbon monoxide or a suitable carbon monoxide source such as carbon monoxide gas or formic acid, in the presence of an acidic catalyst. The catalyst preferably has a Hammett Scale Value acidity (Ho) of less than −7 in order to be sufficiently active, particularly to form neo structures. Preferably the Hammett acidity of the catalyst is in the range of from −8 to −11.5. Useful catalysts include $H_2SO_4$, $BF_3$, and HF. The catalyst causes a carbenium ion to form at the point of unsaturation. The carbon monoxide reacts with the carbenium ion forming an acylium ion. Water or a hydroxy-containing compound or a thiol containing compound can be added to react with the acylium cation to form a carboxylic acid or a carboxylic ester/or a thiol ester. Preferably, the hydroxy-containing compound or water is added in combination with the catalyst as a catalyst complex. Preferred catalyst complexes include ($BF_3.H_2O$) and ($BF_3$. substituted phenols) with a most preferred catalyst complex being $BF_3$.2,4 dichlorophenyl.

In accordance with the Koch process carboxyl groups, including carboxylic acid or carboxylic esters, can be formed at moderate temperatures and pressures at the point of unsaturation of the polymer of the present invention. The polymer is heated to a desired temperature range which is typically between $-20°$ C. to $200°$ C. and preferably from $0°$ C. to $80°$ C. The pressure in the reactor can be maintained based on the carbon monoxide source, with pressures ranging up to 5,000 psig with a preferred range of from 500 to 3,000 psig.

Other functionalized polymers include those suitable for use as intermediates in making ash-producing detergents as described hereinbelow including sulfurized alkylphenols, alkyl sulfonic acids, alkyl salicylates, alkyl naphthanates wherein the alkyl group is derived from the polymer of the present invention.

The functionalized polymers of the present invention may be used as an additive agent for oleaginous compositions such as fuels and lubricating oils as discussed hereinafter.

Derivatized Polymers

As indicated above, a functionalized polymer is one which is chemically modified primarily to enhance its ability to participate in a wider variety of chemical reactions than would otherwise be possible with the unfunctionalized polymer.

In contrast, a derivatized polymer is one which has been chemically modified to perform one or more functions in a significantly improved way relative to the unfunctionalized polymer and/or the functionalized polymer. Representative of such functions, are dispersancy and/or viscosity modification in lubricating oil compositions.

Typically, derivatization is achieved by chemical modification of the functionalized polymer.

More specifically, the functionalized polymer can be derivatized by reaction with at least one derivatizing compound to form derivatized polymers. The derivatizing compound typically contains at least one reactive derivatizing group. The reactive derivatizing group is typically selected to render it capable of reacting with the functional groups of the functionalized polymers by the various reactions described below. Representative of such reactions are nucleophilic substitution, Mannich Base condensation, transesterification, salt formations, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline or salt groups derived from reactive metal or reactive metal compounds.

Thus, the derivatized polymers can include the reaction product of the above recited functionalized polymer with a nucleophilic reactant which include amines, alcohols, amino-alcohols and mixtures thereof to form oil soluble salts, amides, imides, oxazoline, reactive metal compounds and esters of mono- and dicarboxylic acids, esters or anhydrides.

Suitable properties sought to be imparted to the derivatized polymer include especially dispersancy, but also multifunctional viscosity modification, antioxidancy, friction modification, antiwear, antirust, seal swell, and the like.

Ash-Producing Dispersants

The ash-producing detergents which can be made using the functionalized polymers of the present invention are exemplified by oil-soluble neutral and basic salts of alkali or alkaline earth metals with alkyl phenols, alkyl sulfonic acids, carboxylic acids, or organic phosphorus acids characterized by at least one direct carbon-to-phosphorus linkage such as those prepared from the functionalized olefin polymer of the present invention (e.g., functionalized polymer having a molecular weight of 1,500) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The alkyl groups of the above acids or compounds constitute the polymer of the present invention.

The term "basic salt" is used to designate metal salts wherein the metal is present in stoichiometrically larger amounts than the derivatized polymer. The commonly employed methods for preparing the basic salts involve heating a mineral oil solution of the acid with a stoichiometric excess of a metal neutralizing agent such as metal oxide, hydroxide, carbonate, bicarbonate, or sulfide at a temperature of about $50°$ C. and filtering the resulting mass. The use of a "promoter" in the neutralization step to aid the incorporation of a large excess of metal likewise is known. Examples of compounds useful as the promoter include phenolic substance such as phenol, napthol, alkylphenol, thiophenol, sulfurized alkylphenol, and condensation products of formaldehyde with a phenolic substance; alcohols such as methanol, 2-propanol, octyl alcohol, cellosolve, ethylene glycol, stearyl alcohol, and cyclohexyl alcohol; and amines such as aniline, phenylenediamine, phenyl-beta-napthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as $60°$ C. to $200°$ C. This class of materials is discussed further hereinbelow in connection with detergents and metal rust inhibitors.

Preferred ash-producing detergents which can be derived from the functionalized polymers of the present invention include the metal salts of alkyl sulfonic acids, alkyl phenols, sulfurized alkyl phenols, alkyl salicylates, alkyl naphthenates and other oil soluble mono- and dicarboxylic acids. Highly basic (viz, overbased) metal salts, such as highly basic alkaline earth metal alkyl sulfonates (especially Ca and Mg salts) are frequently used as detergents. They are usually produced by heating a mixture comprising an oil-soluble alkyl sulfonate or alkaryl sulfonic acid, with an excess of alkaline earth metal compound above that required for complete neutralization of any sulfonic acid present, and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation with the polymers of the present invention may be carried out in the presence of a catalyst, the polymer alkylating agents.

The alkaline earth metal compounds which may be used in neutralizing these acids to provide the compounding metal salts include the oxides and hydroxides, alkoxides, carbonates, carboxylate, sulfide, hydrosulfide, nitrate, borates and ethers of magnesium, calcium, and barium. Examples are calcium oxide, calcium hydroxide magnesium acetate and magnesium borate. As noted, the alkaline earth metal compound is used in excess of that required to complete neutralization of the alkaryl sulfonic acids. Generally, the amount ranges from about 100 to about 220%, although it is preferred to use at least 125% of the stoichiometric amount of metal required for complete neutralization.

Various other preparations of basic alkaline earth metal sulfonates are known, such as those described in U.S. Pat. Nos. 3,150,088 and 3,150,089, wherein overbasing is accomplished by hydrolysis of an alkoxide-carbonate complex with the alkaryl sulfonate in a hydrocarbon solvent/diluent oil.

Ashless Dispersants

The derivatized polymer compositions of the present invention, can be used as ashless dispersants in lubricant and fuel compositions. Ashless dispersants are referred to as being ashless despite the fact that, depending on their constitution, the dispersants may, upon combustion, yield a non-volatile material such as boric oxide or phosphorus pentoxide. The compounds useful as ashless dispersants generally are characterized by a "polar" group attached to a relatively high molecular weight hydrocarbon chain supplied by the polymer of the present invention. The "polar" group generally contains one or more of the elements nitrogen, oxygen and phosphorus. The solubilizing chains are generally higher in molecular weight than those employed with the metallic based dispersants, but in some instances they may be quite similar.

Various types of ashless dispersants can be made by derivatizing the polymer of the present invention and are suitable for use in the lubricant compositions. The following are illustrative:

1. Reaction products of functionalized polymer of the present invention derivatized with nucleophilic reagents such as amine compounds, e.g. nitrogen-containing compounds, organic hydroxy compounds such as phenols and alcohols, and/or basic inorganic materials.

More specifically, nitrogen- or ester-containing ashless dispersants comprise members selected from the group consisting of oil-soluble salts, amides, imides, oxazolines and esters, or mixtures thereof, of the polymer of the present invention, functionalized with mono- and dicarboxylic acids or anhydride or ester derivatives thereof, said polymer having dispersant range molecular weights as defined hereinabove.

At least one functionalized polymer is mixed with at least one of amine, alcohol, including polyol, aminoalcohol, etc., to form the dispersant additives. One class of particularly preferred dispersants includes those derived from the polymer of the present invention functionalized mono- or dicarboxylic acid material, e.g. succinic anhydride, and reacted with (i) a hydroxy compound, e.g. pentaerythritol, (ii) a polyoxyalkylene polyamine, e.g. polyoxypropylene diamine, and/or (iii) a polyalkylene polyamine, e.g., polyethylene diamine or tetraethylene pentamine referred to herein as TEPA. Another preferred dispersant class includes those derived from functionalized polymer reacted with (i) a polyalkylene polyamine, e.g. tetraethylene pentamine, and/or (ii) a polyhydric alcohol or polyhydroxy-substituted aliphatic primary amine, e.g., pentaerythritol or trismethylolaminomethane.

2. Reaction products of the polymer of the present invention functionalized with an aromatic hydroxy group and derivatized with aldehydes (especially formaldehyde) and amines (especially polyalkylene polyamines), through the Mannich reaction, which may be characterized as "Mannich dispersants".

3. Reaction products of the polymer of the present invention which have been functionalized by reaction with halogen and then derivatized by reaction with amines (e.g. direct amination), preferably polyalkylene polyamines. These may be characterized as "amine dispersants" and examples thereof are described, for example, in U.S. Pat. Nos. 3,275,554; 3,438,757; 3,454,555; 3,565,804; 3,755,433; 3,822,209 and 5,084,197, the disclosures of which are herein incorporated by reference.

Derivatized Polymer From Amine Compounds

Useful amine compounds for derivatizing functionalized polymers comprise at least one amine and can comprise one or more additional amines or other reactive or polar groups. Where the functional group is a carboxylic acid, ester or derivative thereof, it reacts with the amine to form an amide. Where the functional group is an epoxy it reacts with the amine to form an amino alcohol. Where the functional group is a halide the amine reacts to displace the halide. Where the functional group is a carbonyl group it reacts with the amine to form an imine.

Amine compounds useful as nucleophilic reactants for reaction with the functionalized polymer of the present invention include those disclosed in U.S. Pat. Nos. 3,445,441, 5,017,299 and 5,102,566, all hereby incorporated by reference. Preferred amine compounds include mono- and (preferably) polyamines, of about 2 to 60, preferably 2 to 40 (e.g. 3 to 20), total carbon atoms of about 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups, are particularly useful. Preferred amines are aliphatic saturated amines, including those of the general formulas:.

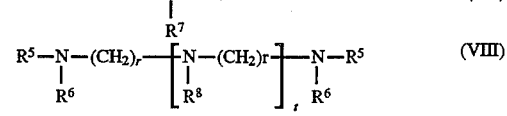

wherein $R^5$, $R^6$, $R^7$ and $R^8$ are independently selected from the group consisting of hydrogen; $C_1$ to $C_{25}$ straight or branched chain alkyl radicals; $C_1$ to $C_{12}$ alkoxy; $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein $R^8$ can additionally comprise a moiety of the formula:

wherein $R^6$ is as defined above, and wherein r and r' can be the same or a different number of from 2 to 6, preferably 2 to 4; and t and t' can be the same or different and are numbers of from 0 to 10, preferably 2 to 7, and most preferably about 3 to 7. Preferably that the sum of t and t' is not greater than 15. To assure a facile reaction, it is preferred that $R^5$, $R^6$, $R^7$, $R^8$, r, r', t and t' be selected in a manner sufficient to provide the compounds of Formulae (VII) and (VIII) with typically at least 1 primary or secondary amine group, preferably at least 2 primary or secondary amine groups. This can be achieved by selecting at least 1 of said $R^5$, $R^6$, $R^7$ and $R^8$ groups to be hydrogen or by letting t in Formula 6 be at least 1 when $R^8$ is H or when the Formula (IX) moiety possesses a secondary amino group. The most preferred amine of the above formulas are represented by Formula (VIII) and contain at least 2 primary amine groups and at least 1, and preferably at least 3, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene)triamine; N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof. Monoamines include methyl ethyl amine, methyl octadecyl amines, anilines, diethylol amine, dipropyl amine, etc.

Other useful amine compounds include: alicyclic diamines such as 1,4-di(aminomethyl) cyclohexane, and heterocyclic nitrogen compounds such as imidazolines, and N-aminoalkyl piperazines of the general formula (X):

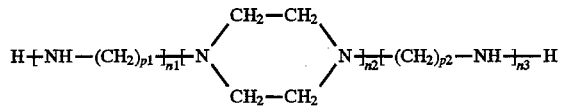

wherein $P_1$ and $P_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula:

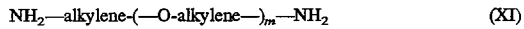

where m has a value of about 3 to 70 and preferably 10 to 35; and the formula:

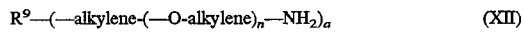

where n has a value of about 1 to 40 with the provision that the sum of all the n values is from about 3 to about 70 and preferably from about 6 to about 35, and $R^9$ is a polyvalent saturated hydrocarbon radical of up to 10 carbon atoms wherein the number of substituents on the $R^9$ group is represented by the value of "a", which is a number of from 3 to 6. The alkylene groups in either formula (XI) or (XII) may be straight or branched chains containing about 2 to 7, and preferably about 2 to 4 carbon atoms.

The polyoxyalkylene polyamines of formulas (XI) or (XII) above, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403, etc.

Other suitable amines include the bis(paraamino cyclohexyl)methane oligomers disclosed in U.S. Ser. No. 547,930, filed Jul. 3, 1990, the disclosure of which is herein incorporated by reference.

A particularly useful class of amines are the polyamido and related amines disclosed in U.S. Pat. Nos. 4,857,217; 4,963,275 and 4,956,107, the disclosures of which are herein incorporated by reference, which comprise reaction products of a polyamine and an alpha, beta unsaturated compound of the formula:

wherein X is sulfur or oxygen, Y is —$OR^{13}$, $SR^{13}$, or —$NR^{13}(R^{14})$, and $R^{10}$, $R^{11}$, $R^{12}$, $R^{13}$ and $R^{14}$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with, for example, the carbonyl group (—C(O)—) of the acrylate-type compound of formula (XIII), or with the thiocarbonyl group (—C(S)—) of the thioacrylate-type compound of formula (XIII).

When $R^{10}$, $R^{11}$, $R^{12}$, $R^{13}$ or $R^{14}$ in Formula (XIII) are hydrocarbyl, these groups can comprise alkyl, cycloakyl, aryl, alkaryl, aralkyl or heterocyclic, which can be any component of the reaction mixture under conditions selected for preparation of the amido-amine. Such I, Br), —SH and alkylthio. When one or more of through $R^{14}$ are alkyl, such alkyl groups can be straight or branched chain, and will generally contain from 1 to 10, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^{10}$ through $R^{14}$ are aryl, the aryl group will generally contain from 6 to 10 carbon atoms (e.g., phenyl, naphthyl).

When one or more of $R^{10}$ through $R^{14}$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^{10}$ through $R^{14}$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^{10}$ through $R^{14}$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^{10}$ through $R^{14}$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

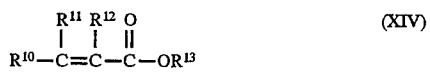 (XIV)

wherein $R^{10}$, $R^{11}$, $R^{12}$ and $R^{13}$ are the same or different and are hydrogen or substituted or unsubstituted hydrocarbyl as defined above. Examples of such alpha, beta-ethylenically unsaturated carboxylate compounds of formula (XIV) are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl-2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate and the like.

The alpha, beta ethylenically unsaturated carboxylate thioester compounds employed herein have the following formula:

 (XV)

wherein $R^{10}$, $R^{11}$, $R^{12}$ and $R^{13}$ are the same or different and are hydrogen or substituted or unsubstituted hydrocarbyl as defined above. Examples of such alpha, beta-ethylenically unsaturated carboxylate thioesters of formula (XV) are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate and the like.

The alpha, beta-ethylenically unsaturated carboxyamide compounds employed herein have the following formula:

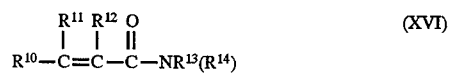 (XVI)

wherein $R^{10}$, $R^{11}$, $R^{12}$, $R^{13}$ and $R^{14}$ are the same or different and are hydrogen or substituted or unsubstituted hydrocarbyl as defined above. Examples of alpha, beta-ethylenically unsaturated carboxyamides of Formula (XVI) are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl=2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

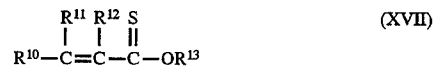 (XVII)

wherein $R^{10}$, $R^{11}$, $R^{12}$, and $R^{13}$ are the same or different and are hydrogen or substituted or unsubstituted hydrocarbyl as defined above. Examples of alpha, beta-ethylenically unsaturated thiocarboxylate compounds of formula (XVII) are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate and the like.

The alpha, beta ethylenically unsaturated dithioic acid and acid ester compounds employed herein have the following formula:

 (XVIII)

wherein $R^{10}$, $R^{11}$, $R^{12}$ and $R^{13}$, are the same or different and are hydrogen or substituted or unsubstituted hydrocarbyl as defined above. Examples of alpha, beta-ethylenically unsaturated dithioic acids and acid esters of formula (16) are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclo- hexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate and the like.

The alpha, beta ethylenically unsaturated thiocarboxyamide compounds employed herein have the following formula:

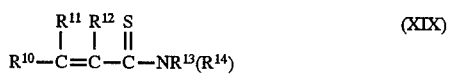 (XIX)

wherein $R^{10}$, $R^{11}$, $R^{12}$, $R^{13}$ and $R^{14}$ are the same or different and are hydrogen or substituted or unsubstituted hydrocarbyl as defined above. Examples of alpha, beta-ethylenically unsaturated thiocarboxyamides of formula (XIX) are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^{12}$ is hydrogen or a $C_1$ to $C_4$ alkyl group, such as methyl, and $R^{13}$ is hydrogen or a $C_1$ to $C_4$ alkyl group, capable of being removed so as to form an amido group, for example, methyl, ethyl, propyl, isopropyl, butyl, sec-butyl, tert-butyl, aryl, heXyl, etc. In the preferred embodiments these compounds are acrylic and methacrylic esters such as methyl or ethyl acrylate, methyl or ethyl met eta-unsaturate the selected alpha, beta-unsaturated compound comprises a compound of formula (XIII) wherein X is oxygen, the resulting reaction product with the polyamine contains at least one amido linkage (—C(O)N<) and such materials are herein termed "amido-amines". Similarly, when the selected alpha, beta unsaturated compound of Formula (XIII) comprises a compound wherein X is sulfur, the resulting reaction product with the polyamine contains thioamide linkage (—C(S)N<) and these materials are herein termed "thioamido-amines". For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula (XIII) tends to yield an amido-amine which is more crosslinked than that obtained where substantially equimolar amounts of reactants are employed. Where, for economic or other reasons, a cross-linked amido-amine using excess amine is desired, generally a molar excess of the ethylenically unsaturated reactant of about at least 10%, such as 10 to 300%, or greater, for example, 25 to 200%, is employed. For more efficient cross-linking an excess of carboxylated material should preferably be used since a cleaner reaction ensues. For example, a molar excess of about 10 to 100% or greater such as 10 to 50%, but preferably an excess of 30 to 50%, of the carboxylated material. Larger excess can be employed if desired.

In summary, without considering other factors, equimolar amounts of reactants tend to produce a more linear amido-amine whereas excess of the formula (XIII) reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula:

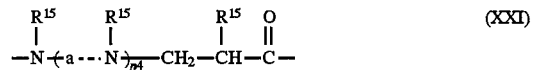

wherein the $R^{15}$'s, which may be the same or different, are hydrogen or a substituent group, such as a hydrocarbon group, for example, alkyl, alkenyl, alkynyl, aryl, etc., and A is a moiety of the polyamine which, for example, may be aryl, cycloalkyl, alkyl, etc., and n4 is an integer such as 1 to 10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines are not cross-linked to any substantial degree, and more preferably are substantially linear.

Preferably, the polyamine reactant contains at least one primary amine, and more preferably from 2 to 4 primary amines, group per molecule, and the polyamine and the unsaturated reactant of formula (XIII) are contacted in an amount of from about 1 to 10, more preferably from about 2 to 6, and most preferably from about 3 to 5, equivalents of primary amine in the polyamine reactant per mole of the unsaturated reactant of formula (III).

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80° C. to 90° C., for a suitable period of time, such as a few hours. Where an acrylic-type ester is employed, the progress of the reaction can be judged by the removal of the alcohol in forming the amide.

During the early part of the reaction, alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula (XIII) liberates the corresponding $HNR^{13}$ ($R^{14}$ (e.g., $H_2S$ when $R^{13}$ is hydrogen) as a by-product, and of compound (e.g., ammonia when $R^{13}$ and $R^{14}$ are each hydrogen) as a by-product.

The reaction time to form an amido-amine material can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed. Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

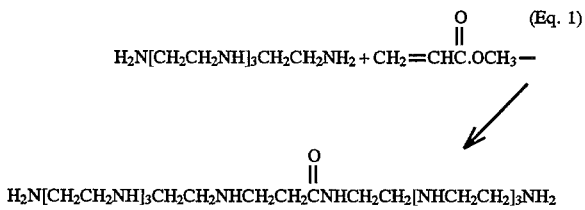

Tris(hydroxymethyl) amino methane (THAM) can be reacted with the aforesaid functionalized polymers to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

Derivatization Polymer From Alcohols

The functionalized polymers, particularly acid functionalized polymers, of the present invention can be reacted with alcohols, e.g. to form esters. The alcohols may be aliphatic compounds such as monohydric and polyhydric alcohols or aromatic compounds such as phenols and naphthols.

The aromatic hydroxy compounds from which the esters may be derived are illustrated by the following specific examples: phenol, beta-naphthol, alpha-naphthol, cresol, resorcinol, catechol, p,p'di-hydroxybiphenyl, 2-chlorophenol, 2,4-dibutylphenol, propene tetramer-substituted phenol, didodecylphenol, 4,4'-methylene-bis-phenol, alpha-decyl-beta-naphthol, polyisobutene (molecular weight of 1000)-substituted phenol, the condensation product of heptylphenol with 0.5 mole of formaldehyde, the condensation product of octyl-phenol with acetone, di(hydroxyphenyl)-oxide, di(hydroxyphenyl) sulfide, di(hydroxyphenyl)disulfide, and 4-cyclohexylphenol. Phenol and alkylated phenols having up to three alkyl substituents are preferred.

The alcohols from which the esters may be derived preferably contain up to about 40 aliphatic carbon atoms. They may be monohydric alcohols such as methanols, ethanol, isooctanol, dodecanol, cyclohexanol, cyclopentanol, behenyl alcohol, hexatriacontanol, neopentyl alcohol, isobutyl alcohol, benzyl alcohol, beta-phenyl-ethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secpentyl alcohol, tertbutyl alcohol, 5-bromo-dodecanol, nitro-octadecanol and dioleate of glycerol. The polyhydric alcohols preferably contain from 2 to about 10 hydroxy radicals. They are illustrated by, for example, ethylene glycol, diethylene glycol, triethylene glycol, tetraethylene glycol, dipropylene glycol, tripropylene glycol, dibutylene glycol, tributylene glycol, and other alkylene glycols in which the alkylene radical contains from 2 to about 8 carbon atoms. Other useful polyhydric alcohols include glycerol, monooleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, penacol, erythritol, arabitol, sorbitol, mannitol, 1,2-cyclo-hexanediol, and xylene glycol. Carbohydrates such as sugars, starches, cellulose, etc., likewise may yield the esters of this invention. The carbohydrates may be exemplified by a glucose, fructose, sucrose, rhamnose, mannose, glyceraldehyde, and galactose. Heterocyclic polyols, such as described in U.S. Pat. No. 4,797,219, the disclosure of which is herein incorporated by reference, may be employed. Such polyols include tetrahydro-3,3,5,5-tetrakischydroxymethyl)-4-pyranol also known as anhydroenneaheptitol(AEH).

A useful class of polyhydric alcohols are those having at least three hydroxy radicals, some of which have been esterified with a monocarboxylic acid having from about 8 to about 30 carbon atoms, such as octanoic acid, oleic acid, stearic acid, linoleic acid, dodecanoic acid, or tall oil acid. Examples of such partially esterified polyhydric alcohols are the monooleate of sorbitol, distearate of sorbitol, monooleate of glycerol, monostearate of glycerol, di-dodecanoate of erythritol.

The esters may also be derived from unsaturated alcohols such as allyl alcohol, cinnamyl alcohol, propargyl alcohol, 1-cyclohexene-3-ol, an oleyl alcohol. Still another class of the alcohols capable of yielding the esters of this invention comprise the ether-alcohols and amino-alcohols including, for example, the oxyalkylene-, oxyarylene-, aminoalkylene-, and amino-arylene-substituted alcohols having one or more oxyalkylene, amino-alkylene or amino-arylene oxyarylene radicals. They are exemplified by Cellosolve, carbitol, phenoxyethanol, heptylphenyl-(oxypropylene)6-H, octyl(oxyethylene)30-H, phenyl-(oxyoctylene)2-H, mono (heptylphenyl-oxypropylene)-substituted glycerol, poly (styrene oxide), aminoethanol, 3-amino ethyl-pentanol, di(hydroxyethyl) amine, p-amino-phenol, tri (hydroxypropyl)amine, N-hydroxyethyl ethylene diamine, N,N,N',N'-tetrahydroxy-trimethylene diamine, and the like. For the most part, the ether-alcohols having up to about 150 oxyalkylene radicals in which the alkylene radical contains from 1 to about 8 carbon atoms are preferred.

The esters may be diesters, e.g., of succinic acids or acidic esters, i.e., partially esterified polyhydric alcohols or phenols, i.e., esters having free alcoholic or phenolic hydroxyl radicals. Mixtures of the above-illustrated esters likewise are contemplated within the scope of the invention.

The esters may be prepared by one of several methods. The method which is preferred because of convenience and superior properties of the esters it produces, involves the reaction of a suitable alcohol or phenol with the acid or anhydride (i.e., functionalized polymer succinic anhydride). The esterification is usually carried out at a temperature above about 100° C., preferably between 150° C. and 300° C.

The water formed as a by-product is removed by distillation as the esterification proceeds. A solvent may be used in the esterification to facilitate mixing and temperature control. It also facilitates the removal of water from the reaction mixture. The useful solvents include xylene, toluene, diphenyl ether, chlorobenzene, and mineral oil.

A modification of the above process involving dicarboxylic acid involves the replacement of, for example, succinic anhydride with the corresponding succinic acid as a functionalized compound. However, succinic acids readily undergo dehydration at temperatures above about 100° C. and are thus converted to their anhydrides which are then esterified by the reaction with the alcohol reactant. In this regard, succinic acids appear to be the substantial equivalents of their anhydrides in the process.

The relative proportions of the acid functionalized polymer (e.g., succinic acid functionalized polymer) and the hydroxy reactant which are to be used depend to a large measure upon the type of the product desired, the functionality of the functionalized polymer, and the number of hydroxyl groups present in the molecule of the hydroxy reactant. For instance, the formation of a half ester of a succinic acid, i.e., one in which only one of the two acid radicals is esterified, involves the use of one mole of a monohydric alcohol for each mole of the succinic functional group, whereas the formation of a diester of a succinic acid involves the use of two moles of the alcohol for each mole of the acid functional group. On the other hand, one mole of a hexahydric alcohol may combine with as many as six moles of a di-acid to form an ester in which each of the six hydroxyl radicals of the alcohol is esterified with one of the two acid radicals of the succinic acid. Thus, the maximum proportion of functional groups to be esterified with a polyhydric alcohol is determined by the number of hydroxyl groups present in the molecule of the hydroxy reactant. Esters obtained by the reaction of stoichiometric amounts of the acid reactant and hydroxy reactant are preferred.

In some instances, it is advantageous to carry out the esterification in the presence of a catalyst such as sulfuric acid, pyridine hydrochloride, hydrochloric acid, benzenesulfonic acid, p-toluenesulfonic acid, phosphoric acid, or any other known esterification catalyst. The amount of the catalyst in the reaction may be as little as 0.01% (by weight of the reaction mixture), more often from about 0.1% to about 5%.

Ester derivatives likewise may be obtained by the reaction of a acid functionalized polymer with epoxide or a mixture of an epoxide and water. Such reaction is similar to one involving the acid or anhydride with a glycol. For instance, the product may be prepared by the reaction of functionalized polymer with alkylene oxide to yield half-esters, monoesters or diesters.

Epoxides which are commonly available for use in such reaction include, for example, ethylene oxide, propylene oxide, styrene oxide, 1,2-butylene oxide, 2,3-butylene oxide, epichlorohydrin, cyclohexene oxide, 1,2-octylene oxide, epoxidized soya bean oil, methyl ester of 9,10-epoxystearic acid, and butadiene monoepoxide. Preferred epoxides are the alkylene oxides in which the alkylene radical has from 2 to about 8 carbon atoms; or the epoxidized fatty acid esters in which the fatty acid radical has up to about 30 carbon atoms and the ester radical is derived from a lower alcohol having up to about 8 carbon atoms.

In lieu of the acid functionalized polymer, a polymer functionalized with lactone acid or an acid halide may be used in the processes illustrated above for preparing the ester derivatives of this invention. Such acid halides may be acid dibromides, acid dichlorides, acid monochlorides, and acid monobromides.

In view of the above, the derivative compositions produced by reacting functionalized polymer with alcohols are esters including both acidic esters and neutral esters. Acidic esters are those in which less than all of the functional groups in functionalized polymer are esterified, and hence possess at least one free functional group. Obviously, acid esters are easily prepared by using an amount of alcohol insufficient to esterify all of the functional groups in the functionalized polymer.

The functionalized, e.g., acid functionalized, polymers of this invention are reacted with the alcohols according to conventional esterification techniques. This normally involves heating the functionalized polymer with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed.

Many issued patents disclose procedures for reacting high molecular weight carboxylic acids with alcohols to produce acidic esters and neutral esters. These same techniques are applicable to preparing esters from the functionalized polymer of this invention and the alcohols described above. All that is required is that the acylating reagents of this invention are substituted for the high molecular weight carboxylic acid acylating agents discussed in these patents, usually on an equivalent weight basis. The following U.S. Patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,428 and 3,755,169.

Derivatized Polymer From Mannich Base Condensation

The hydroxy aromatic functionalized polymer aldehyde/amino condensates useful as ashless dispersants in the compositions of this invention include those generally referred to as Mannich condensates. Generally they are made by reacting simultaneously or sequentially at least one active hydrogen compound such as a hydrocarbon-substituted phenol (e.g., hydroxy aromatic functionalized polymer of the present invention), having at least one hydrogen atom bonded to an aromatic carbon, with at least one aldehyde or aldehyde-producing material (typically formaldehyde precursor) and at least one amino or polyamino compound having at least one NH group. Preferred phenolic compounds include the hydroxy aromatic functionalized polymer recited above. Useful amine compounds can be selected from those recited above. The amine compounds include primary or secondary monoamines having hydrocarbon substituents of 1 to 30 carbon atoms or hydroxyl-substituted hydrocarbon substituents of 1 to about 30 carbon atoms. Another type of typical amine compound are the polyamines described during the discussion of the acylated nitrogen-containing compounds. The materials described in the following patents are illustrative of Mannich dispersants: U.S. Pat. Nos. 3,413,347; 3,697,574; 3,725,277; 3,725,480; 3,726,882; 4,454,059 and 5,102,566.

The following U.S. patents contain extensive descriptions of Mannich condensates which can be used in making the compositions of this invention:

| U.S. Pat. Nos. | | |
| --- | --- | --- |
| 2,459,112 | 3,413,347 | 3,558,743 |
| 2,962,442 | 3,442,808 | 3,586,629 |
| 2,984,550 | 3,448,047 | 3,591,598 |
| 3,036,003 | 3,454,497 | 3,600,372 |
| 3,166,516 | 3,459,661 | 3,634,515 |
| 3,236,770 | 3,461,172 | 3,649,229 |
| 3,355,270 | 3,493,520 | 3,697,574 |
| 3,368,972 | 3,539,633 | 5,017,299 |

Condensates made from sulfur-containing reactants also can be used in the compositions of the present invention. Such sulfur-containing condensates are described in U.S. Pat. Nos. 3,368,972; 3,649,229; 3,600,372; 3,649,659 and 3,741,896. These patents also disclose sulfur-containing Mannich condensates.

The Aldehyde Material Used in Mannich Condensations

The aldehyde reactants will generally comprise formaldehyde or paraformaldehyde, although it will be understood that other aldehyde group-containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: $R^{16}CHO$, wherein $R^{16}$ is H or aliphatic hydrocarbon radicals having from 1 to 4 carbon atoms.

Mannich Base Condensation Derivatives

The Mannich Base condensate dispersants are prepared by condensing at least one of the above-described hydroxy/aromatic functionalized polymers with an amine, which can include amines as described, in the presence of an aldehyde. The reactants are contacted for a time and under conditions sufficient to form the desired dispersant product.

The process employed in the condensation reaction can be any of those disclosed in U.S. Pat. Nos. 3,634,515; 3,649,229; 3,442,808; 3,798,165; 3,798,247 and 3,539,633, the disclosures of which are hereby incorporated by reference in their entirety.

The amount of the reactants employed is not critical and can vary over a wide range. It is, however, preferred to react the hydroxy aromatic functionalized polymer, aldehyde reactant and amine compound in the respective molar ratios of about 1:(1 to 4):(0.1 to 10). An excess of aldehyde reactant may be used. More specifically, condensates can be prepared by reacting about one molar portion of phenolic polymer with about 1 to about 2 molar portions of aldehyde and about 1 to about 5 equivalent portions of amino compound (an equivalent of amino compound is its molecular weight divided by the number of =NH groups present). The conditions under which such condensation reactions are carried out are well known to those skilled in the art as evidenced by the above-noted patents. Therefore, these patents are also incorporated by reference for their disclosures relating to reaction conditions.

The reactions are exothermic, but it is desirable to heat the reaction to a temperature of above about 150° C., preferably in the range of from about 150° C. to 200° C. This additional heating drives the reaction to completion and removes water from the resultant condensation reaction product.

The condensation reaction can be illustrated by the following reactions employing an alkylene polyamine and formaldehyde:

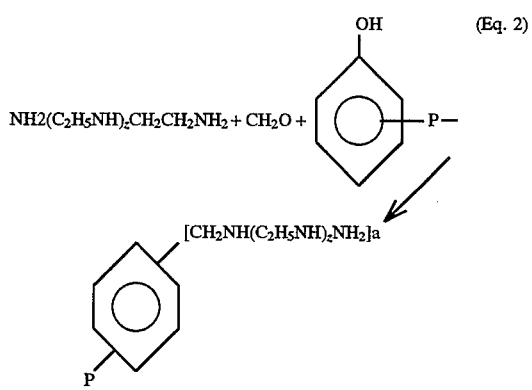
(Eq. 2)

wherein "z" is an integer of from 1 to 10, "a" is an integer of 1 or 2 and P is the polymer as described above, and

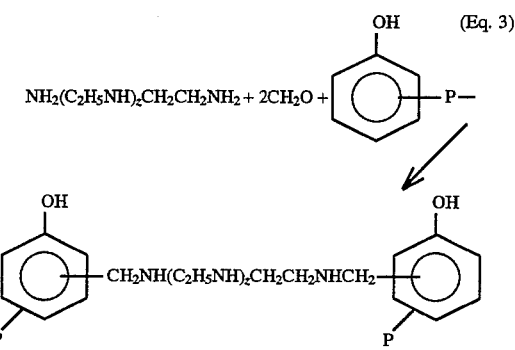
(Eq. 3)

wherein "z", and P are as defined above.

A useful group of Mannich Base ashless dispersants are those formed by condensing phenol functionalized polymer with formaldehyde and polyethylene amines, e.g., tetraethylene pentamine, pentaethylene hexamine, polyoxyethylene and polyoxypropylene amines, e.g., polyoxypropylene diamine and combinations thereof. One particularly preferred dispersant comprises a condensation of (A) phenol functionalized polymer, (B) formaldehyde, (C) a polyoxyalkylene polyamine, e.g., polyoxypropylene diamine, and (D) a polyalkylene polyamine, e.g. polyethylene diamine and tetraethylene pentamine, using about 2 to about 8 moles each of (B) and about 1 to about 4 moles of (C) or (D) per mole of (A).

A useful class of nitrogen-containing condensation products for use in the present invention are those made by a "2-step process" as disclosed in U.S. Pat. No. 4,273,891, incorporated herein by reference. Briefly, these nitrogen-containing condensates are made by (1) reacting at least phenol functionalized polymer of the present invention with a lower aliphatic $C_1$ to $C_7$ aldehyde or reversible polymer thereof in the presence of an alkaline reagent, such as an alkali metal hydroxide, at a temperature up to about 150° C.; (2) substantially neutralizing the intermediate reaction mixture thus formed; and (3) reacting the neutralized intermediate with at least one compound which contains an amino group having at least one —NH— group. These 2-step condensates can be made from (a) phenol functionalized polymer and (b) formaldehyde, or reversible polymer thereof, (e.g., trioxane, paraformaldehyde) or functional equivalent thereof, (e.g., methylol) and (c) an alkylene polyamine such as ethylene polyamines having between 2 and 10 nitrogen atoms.

Derivatized Polymer From Reactive Metals/Metal Compounds

Useful reactive metals or reactive metal compounds are those which will form metal salts or metal-containing complexes with the functionalized polymer. Metal complexes are typically achieved by reacting the functionalized polymers with amines and/or alcohols as discussed above and also with complex forming reactants either during or subsequent to amination.

Reactive metal compounds for use in the formation of complexes with the reaction products of functionalized polymer and amines include those disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence. Specific examples of the complex-forming metal compounds useful as the metal reactant are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite; cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroacetate, cadmium fumarate, cadmium nitrate, cadmium dihydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the functionalized polymer of this invention with the amines as described above by substituting, or on an equivalent basis, the functionalized polymer of this invention with the high molecular weight carboxylic acid functionalized polymer disclosed in U.S. Pat. No. 3,306,908.

U.S. Pat. No. Re. 26,433 discloses metals useful in preparing salts from acid functionalized polymer and/or an amine derivatized polymer as described hereinabove. Metal salts are prepared, according to this patent, from alkali metals, alkaline earth metals, zinc, cadmium, lead, cobalt and nickel. Examples of a reactive metal compound suitable for use are sodium oxide, sodium hydroxide, sodium carbonate, sodium methylate, sodium propylate, sodium pentylate, sodium phenoxide, potassium oxide, potassium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium carbonate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride, lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Pat. No. Re. 26,433 is expressly incorporated herein by reference for its disclosure of useful reactive metal compounds as, and processes for, utilizing these compounds in the formation of salts. Again, in applying the teachings of this patent to the present invention, it is only necessary to substitute the functionalized polymer of this invention on an equivalent weight basis for the high molecular weight carboxylic acylating agents disclosed in this reissue patent.

U.S. Pat. No. 3,271,310 discloses the preparation of metal salt of high molecular weight carboxylic acid material, in particular alkenyl succinic acids which can be adapted to make the present functionalized polymer. The metal salts disclosed therein are acid salts, neutral salts, and basic salts. Among the illustrative reactive metal compounds used to prepare the acidic, neutral and basic salts of the acid functionalized polymer are those disclosed in U.S. Pat. No. 3,271,310 including lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentllate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds suitable for forming salts of the functionalized polymer of this invention as well as illustrative processes for preparing salts of these reagents. As will be apparent, the processes of U.S. Pat. No. 3,271,310 are applicable to this invention merely by substituting on an equivalent weight basis, the functionalized polymer of this invention for the high molecular weight carboxylic acids of the patent.

Derivatization Reactant Ratios

From the foregoing description, it is apparent that the appropriate functionalized polymer of this invention can be reacted with any individual derivatizing compound such as amine, alcohol, reactive metal, reactive metal compound or any combination of two or more of any of these; that is, for example, one or more amines, one or more alcohols, one or more reactive metals or reactive metal compounds, or a mixture of any of these. The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metal compounds, or one or more components from each of the amines, alcohols, and reactive metals or reactive metal compounds. Furthermore, the appropriate functionalized polymer of this invention can be reacted with the amines, alcohols, reactive metals, reactive metal compounds, or mixtures thereof, as described above, simultaneously (concurrently) or sequentially in any order of reaction.

In any of the foregoing derivatizing reactions involving the use of the functionalized polymer of this invention, substantially inert organic liquid diluents may be used to facilitate mixing, temperature control, and handling of the reaction mixture. Suitable diluents include aliphatic, cycloaliphatic, and aromatic hydrocarbons as well as the corresponding halogenated hydrocarbons, particularly chlorinated hydrocarbons. These diluents are exemplified by benzene, toluene, xylene, chlorobenzenes, hexane, heptane, cyclohexane, or mixtures of these. Mineral oils particularly low viscosity mineral oils are very good diluents. Other organic solvents can also be employed such as ethers, sulfoxide, sulfones, and the like. Where one or more of the reactants themselves are liquid at the reaction temperature, the reactant itself functions as a diluent and it may be convenient sometimes to employ an excess amount of the reactant to serve this purpose.

The following discussion is intended to explain and illustrate what is meant by the term "equivalent" with respect to various classes of reactants as the term is used herein. As will be shown a "derivatizing ratio" is defined as the molar equivalent ratios of the functionalized polymer to derivatizing compound.

The number of equivalents which characterize the functionalized polymer of the invention depends upon the number of functional groups present within the structure thereof as expressed by its functionality (F*).

Thus, a functionalized polymer having a functionality (F*) of 3 has an average of three equivalents per mole. Alternatively, 6,000 $M_n$ polymer functionalized with mono acid to a functionality of 3 possesses an equivalent weight of 2000 per mole.

A nitrogen-containing derivatizing compound such as an amine reactant, is regarded as having a number of equivalents per mole corresponding to the average number of reactive amine groups, i.e., primary or secondary amine groups, per molecule. Thus, ammonia has one equivalent per mole; urea, hydrazine, ethylenediamine, and piperazine have two equivalents per mole; and tetraethylene pentamine has five equivalents per mole. Mixtures of nitrogen-containing reactants such as mixtures of alkylene polyamines are regarded as having an equivalent weight equal to the weight of the mixture divided by the number of reactive nitrogen atoms present. For example, 1,000 parts of a polyethylene polyamine mixture containing 37 percent by weight nitrogen has an equivalent weight of about 38.

In like manner, hydroxyaromatic compounds and alcohols have equivalent weights equal to their molecular weights divided by the number of functional —OH groups per molecule. Or, from another viewpoint, they possess a number of equivalents per mole equal to the number of —OH groups. Thus, pentaerythritol has four equivalents per mole and an equivalent weight of 34. Phenol has one equivalent per mole so that its equivalent weight equals its molecular weight.

Metal reactants have an equivalent weight equal to their molecular weight divided by the product of the number of metal atoms per molecule of reactant times the valence of the metal. Since most of the metal reactants have only one metal per atom per molecule, the equivalent weight of the metal reactant is normally the molecular weight divided by the valence of the metal. Stated differently, a metal reactant normally has a number of equivalents per mole equal to the valence of the metal. For example, calcium hydroxide, zinc chloride, and barium oxide have two equivalents per mole; sodium hydroxide and lithium hydroxide have one equivalent per mole.

From what has been said hereinabove, it will be apparent to those skilled in the art that the reaction products produced by reacting functionalized polymer of this invention with derivatizing compounds such as alcohols, nitrogen-containing reactants, metal reactants, and the like will, in fact, be mixtures of various reaction products. This is especially apparent in view of the fact that the functionalized polymers themselves can be mixtures of materials. For example, if acid functionalized polymer is reacted with a polyol, the esterification product can contain esters wherein only one hydroxyl group has been esterified, esters wherein two or more of the hydroxy groups have been esterified by the same or different functionalized polymer, esters where all of the carboxyl groups of an acid functionalized polymer have been esterified, esters where less than all of the carboxyl groups of functionalized polymer have been esterified, and the like. However, for purposes of the present invention it is not necessary to know the specific structure of each derivatized component of the reaction mixtures produced, since it is not necessary to isolate these components in order to use them as additives, e.g., in lubricants and fuels.

While the functionalized polymers themselves possess some dispersant characteristics and can be used as dispersant additives in lubricants and fuels, best results are achieved when at least about 30, preferably, at least about 50, most preferably 100% of the functional groups are derivatized. Furthermore, it is not necessary that all the functional groups of the functionalized polymer be derivatized to the same product or even the same type of product. Thus, functionalized polymer may be first reacted with one or more alcohols to convert a portion of the acid functional groups to ester groups and thereafter this ester product can be reacted with one or more amines and/or one or more metal reactants to convert all or a portion of the remaining carboxyl functions to a derivatized amine groups such as amides, imides, amidines, amine salt groups, and the like or metal salt groups.

In view of the above, the "derivatization ratio" can vary considerably, depending, e.g., on the reactants and type of bonds sought to be formed. Thus, while any derivatization ratio effective to impart the desired properties to the derivatized polymer can be employed, it is contemplated that such effective ratios will range typically from about 0.05:1 to about 4:1, preferably 0.5:1 to about 2.0:1 (e.g. 0.6:1 to about 1.5:1) and most preferably 0.7:1 to about 1:1 (e.g. 0.8:1 to 0.9:1). As can be seen from the above ratios it is preferred to employ an excess of derivatizing compound particularly where the unreacted excess thereof can be easily stripped from the reaction mixture.

Post Treatment

Another aspect of this invention involves the post treatment of derivatized polymer. The processes for post-treating derivatized polymer are analogous to the post-treating processes used with respect to conventional dispersants and conventional multi-functional viscosity improvers of the prior art. Accordingly, the same reaction conditions, ratio of reactants and the like can be used. Reference is made to U.S. Pat. No. 5,017,199.

Accordingly, derivatized polymer can be post-treated with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos. 3,036,003; 3,200,107; 3,254,025; 3,278,550; 3,281,428; 3,282,955; 3,366,569; 3,373,111; 3,442,808; 3,455,832; 3,493,520; 3,513,093; 3,539,633; 3,579,450; 3,600,372; 3,639,242; 3,649,659; 3,703,536 and 3,708,522 which are herein incorporated by reference.

The amine derivatized polymers of the present invention as described above can be post-treated, particularly for use as dispersants and viscosity index improvers by contacting said polymers with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the amine derivatized polymers can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Borated derivatized polymer useful as dispersants can contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)3$), is believed to attach to the derivatized polymer as amine salts, e.g., the metaborate salt of said amine derivatized polymers.

Treating is readily carried out by adding from about 0.05 to 4, e.g. 1 to 3 wt. % (based on the weight of said derivatized polymer) of said boron compound, preferably boric acid which is most usually added as a slurry to said nitrogen compound and heating with stirring at from about 135° C. to 190° C., e.g. 140° C. to 170° C., for from 1 to 5 hours followed by nitrogen stripping at said temperature ranges.

Since post-treating processes involving the use of these post-treating reagents is known insofar as application to high molecular weight nitrogen-containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Patent No. 1,085,903; UK Patent No. 1,162,436; U.S. Pat. No. 3,558,743. Particularly preferred for post-treating is the process disclosed in commonly assigned U.S. Ser. No. 992,413, filed Dec. 17, 1992 entitled Improved Low Sediment Process for Forming Borated Dispersant, Docket No. PT-849.

The derivatized polymers of the present invention can also be treated with polymerizable lactones (such as epsilon-caprolactone) to form dispersant adducts having the moiety —[C(O)($C_2$)$_z$O]$_m$H, wherein z is a number of from 4 to 8 (e.g., 5 to 7) and m has an average value of from about 0 to 100 (e.g., 0.2 to 20). The derivatized polymers of this invention, particularly for use as a dispersant, can be post-treated with a $C_5$ to $C_9$ lactone, e.g., epsilon-caprolactone, by heating a mixture of the polymers and lactone in a reaction vessel in the absence of a solvent at a temperature of about 50° C. to about 00° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a nitrogen containing polymer (i.e., dispersant) in a 1:1 mole ratio of lactone to dispersant material. In practice, the ratio of lactone to polymer may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance the nitrogen containing polymer as a dispersant, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic-based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials of this invention and epsiloncaprolactone are those adducts illustrated by the following equation:

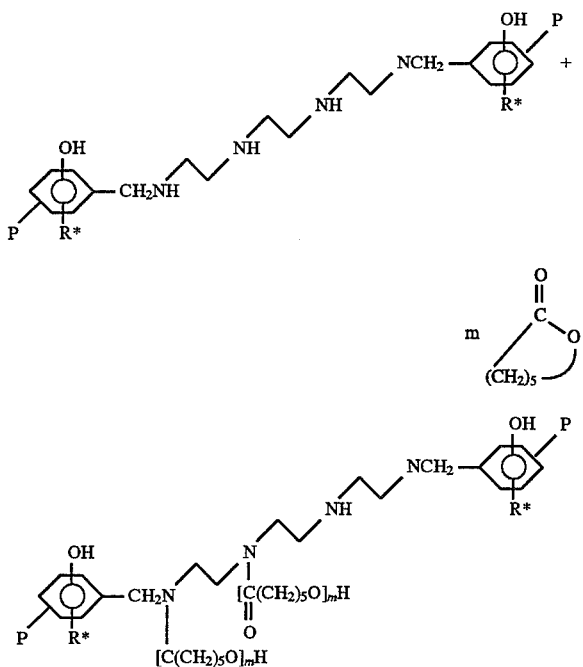

wherein m and P are as defined above. R* can be H, a hydrocarbon of 1 to 18 carbons, or a halogen. The reactions of such lactones with dispersant materials containing nitrogen or ester groups is more completely described in U.S. Pat. Nos. 4,906,394; 4,866,141; 4,866,135; 4,866,140; 4,866,142; 4,866,139 and 4,963,275, the disclosure of each of which is hereby incorporated by reference in its entirety.

Lubricating Compositions

The above discussions. relate to a variety of materials including the polymer per se, functionalized polymer, the derivatized polymer, and post-treated derivatized polymer.

The polymer per se may be used as a synthetic base oil. The functionalized polymer, in addition to acting as intermediates for dispersant manufacture, can be used as a molding release agent, molding agent, metal working lubricant, point thickener and the like.

The primary utility for all the above-described material, from polymer all the way through post-treated derivatized polymer, is as an additive for oleaginous compositions. For ease of discussion the above-mentioned materials are collectively and individually referred to herein as additives when used in the context of an oleaginous composition containing such "additives"

Accordingly, the additives of the present invention may be used by incorporation and dissolution into an oleaginous material such as fuels and lubricating oils. When the additives of this invention are used in normally liquid petroleum fuels such as middle distillates boiling from about 65° C. to 430° C., including kerosene, diesel fuels, home heating fuel oil, jet fuels, etc., a concentration of the additives in the fuel in the range of typically from about 0.001 to about 0.5, and preferably 0.005 to about 0.15 wt. %, based on the total weight of the composition, will usually be employed. Useful compositions and additives are disclosed in U.S. Pat. No. 5,102,566, hereby incorporated by reference.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

The additives of the present invention, particularly those adapted for use as dispersants, can be incorporated into a lubricating oil in any convenient way. Thus, they can be added directly to the oil by dispersing or dissolving the same in the oil at the desired level of concentrations of the additive. Such blending into the additional lube oil can occur at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (AI) basis) from about 10 to about 80 wt. %, typically about 20 to about 60 wt. %, and preferably from about 40 to about 50 wt. %, additive, and typically from about 40 to 80 wt. %, preferably from about 40 to 60 wt. %, base oil, i.e., hydrocarbon oil based on the concentrate weight. The lubricating oil basestock for the additive typically is adapted to perform a selected function by the incorporation of additional additives therein to form lubricating oil compositions (i.e., formulations).

Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additives of the present invention and formulations containing them would usually be employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof. Useful oils are described in U.S. Pat. Nos. 5,017,299 and 5,084,197.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.) poly(hexenes), poly(1-octenes), poly(1-decenes), etc. and mixtures thereof; alkylbenzenes (e.g., dodecyl-benzenes, tetradecylbenzenes, dinonylbenzenes, di-(2-ethylhexyl)-benzenes, etc.); polyphenyls (e.g., biphenyls, terphenyls, alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methylpoly isopropylene glycol ether having an average molecular weight of 1000, diphenyl ether of polyethylene glycol having a molecular weight of 500 to 1,000, diethyl ether of polypropylene glycol having a molecular weight of 1,000 to 1,500; and mono- and polycarboxylic esters thereof, for example, the acetic acid esters, mixed $C_3$ to $C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate didecyl phthalate, dieicosyl sebacate, the 2-ethylhexyl diester of linoleic acid dimer, and the complex ester formed by reacting 1 mole of sebacic acid with 2 moles of tetraethylene glycol and 2 moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy) disiloxane, poly(methyl)siloxanes and poly(methylphenyl) siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Additional Formulation Components

As indicated above, the additives of the present invention may be mixed with other types of additives selected to perform at least one desired function. Typical of such formations are detergent/inhibitor, viscosity modification, wear inhibitor, oxidation inhibitor, corrosion inhibitor, friction modifier, foam inhibitor, rust inhibitor, demulsifier, lube oil flow improvers, and seal swell control. Each class of such additional additives is discussed in more detail below.

Detergent/Inhibitor

Metal-containing detergents which can also act as rust inhibitors hence the term "detergent/inhibitor" or simply "DI", include the metal salts of sulphonic acids, alkyl phenols, sulphurized alkyl phenols, alkyl salicylates, naphthenates, and other oil soluble mono- and dicarboxylic acids as well as metal-containing complexes thereof. Usually these metal-containing detergent/inhibitors are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Metal detergent/inhibitors are generally basic (viz, overbased) alkali or alkaline earth metal salts (or mixtures thereof, e.g. mixtures of Ca and Mg salts) of one or more organic sulfonic acid (generally a petroleum sulfonic acid or a synthetically prepared alkaryl sulfonic acid), petroleum naphthenic acids, alkyl benzene sulfonic acids, alkyl phenols, alkylene-bis-phenols, oil soluble fatty acids and the like, such as are described in U.S. Pat. Nos. 2,501,731; 2,616,904; 2,616,905; 2,616,906; 2,616,911; 2,616,924; 2,616,925; 2,617,049; 2,777,874; 3,027,325; 3,256,186; 3,282,835; 3,384,585; 3,373,108; 3,350,308; 3,365,396; 3,342,733; 3,320,162; 3,312,618; 3,318,809 and 3,562,159, the disclosures of which are herein incorporated by reference. Among the petroleum sulfonates, the most useful products are those prepared by the sulfonation of suitable petroleum fractions with subsequent removal of acid sludge and purification. Synthetic alkaryl sulfonic acids are usually prepared from alkylated benzenes such as the Friedel-Crafts reaction product of benzene and a polymer such as tetrapropylene, $C_{18}$ to $C_{24}$ hydrocarbon polymer, etc. Suitable acids may also be obtained by sulfonation of alkylated derivatives of such compounds as diphenylene oxide thianthrene, phenolthioxine, diphenylene sulfide, phenothiazine, diphenyl oxide, diphenyl sulfide, diphenylamine, cyclohexane, decahydro naphthalene and the like.

The terms "basic salt" and "overbased salt" are used to designate metal salts wherein the metal is present in stoichiometrically larger amounts than the acid radical.

As used in this discussion, the term "complex" refers to basic metal salts which contain metal in an amount in excess of that present in a neutral or normal metal salt. The "base number" of a complex is the number of milligrams of KOH to which one gram of the complex is equivalent as measured by titration.

The commonly employed methods for preparing the basic salts involve heating a mineral oil solution of the normal metal salt of the acid with a metal neutralizing agent. The use of a "promoter" in the neutralization step to aid the incorporation of a large excess of metal is known and is preferred for the preparation of such compositions.

Examples of compounds useful as the promoter include phenolic substances such as phenol, naphthol, alkyl phenols, thiophenol, sulfurized alkyl phenols, and condensation products of formaldehyde with a phenolic substance; alcohols such as methanol, 2-propanol, octanol, cellosolve, carbitol, ethylene glycol, stearyl alcohol and cyclohexanol; and amines such as aniline, phenylene diamine, phenothiazine, phenol beta-naphthylamine and dodecylamine.

The alkali and alkaline earth metal compounds which may be used in neutralizing these acids to provide the metal salts include the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

An example of a convenient process for the preparation of the metal-containing complexes employs an oil-soluble sulfonic acid, such as a synthetically prepared didodecylbenzene sulfonic acid, which is mixed with an excess of lime (e.g., 10 equivalents per equivalent of the acid) and a promoter such as methanol, heptylphenol, or mixture thereof, and a solvent such as mineral oil, at 50° C. to 150° C. and the process mass is then carbonated until a homogeneous mass is obtained. Complexes of sulfonic acids, carboxylic acids, and mixtures thereof are obtainable by processes such as are described in U.S. Pat. No. 3,312,618. Another example is the preparation of a magnesium sulfonate normal magnesium salt thereof, an excess of magnesium oxide, water, and preferably also an alcohol such as methanol.

The carboxylic acids useful for preparing sulfonate carboxylate complexes, and carboxylate complexes, i.e., those obtainable from processes such as the above wherein a mixture of sulfonic acid and carboxylic acid or a carboxylic acid alone is used in lieu of the sulfonic acid, are oil-soluble acids and include primarily fatty acids which have at least about 12 aliphatic carbon atoms and not more than about 24 aliphatic carbon atoms. Examples of these acids include: palmitic, stearic, myristic, oleic, linoleic, dodecanoic, behenic, etc. Cyclic carboxylic acids may also be employed. These include aromatic and cycloaliphatic acids. The aromatic acids are those containing a benzenoid structure (i.e., benzene, naphthalene, etc.) and an oil-solubilizing radical or radicals having a total of at least about 15 to 18 carbon atoms, preferably from about 15 to about 200 carbon atoms. Examples of the aromatic acids include: stearyl-benzoic acid, phenyl stearic acid, mono- or polywax-substituted benzoic or naphthoic acids wherein the wax group consists of at least about 18 carbon atoms, cetyl hydroxybenzoic acids, etc. The cycloaliphatic acids contemplated have at least about 12, usually up to about 30 carbon atoms. Examples of such acids are petroleum naphthenic acids, cetyl cyclohexane carboxylic acids, dilauryl decahydro naphthalene carboxylic acids, dioctyl cyclopentane carboxylic acids, etc. The thiocarboxylic acid analogs of the above acids, wherein one or both of the oxygen atoms of the carboxyl group are replaced by sulfur, are also contemplated.

The ratio of the sulfonic acid to the carboxylic acid in mixtures is typically at least 1:1 (on a chemical equivalent basis) and is usually less than 5:1, preferably from 1:1 to 2:1.

Usually, the basic composition obtained according to the above-described method is treated with carbon dioxide until its total base number (TBN) is less than about 50, as determined by ASTM procedure D-2896. In many instances, it is advantageous to form the basic product by adding a Ca or Mg base portionwise and carbonating after the addition of each portion. Products with very high metal ratios (10 or above) can be obtained by this method. As used herein, the term "metal ratio" refers to the ratio of total equivalents of alkaline earth metal in the sulfonate complex to equivalents of sulfonic acid anion therein. For example, a normal sulfonate has a metal ratio of 1.0 and a calcium sulfonate complex containing twice as much calcium as the normal salt has a metal ratio of 2.0. The overbased metal detergent compositions usually have metal ratios of at least about 1.1, for example, from about 1.1 to about 30, with metal ratios of from about 2 to 20 being preferred.

Neutral metal sulfonates are frequently used as rust inhibitors. Polyvalent metal alkyl salicylate, naphthenate and phenate materials are known additives for lubricating oil compositions to improve their high temperature performance and to counteract deposition of carbonaceous matter on pistons (U.S. Pat. No. 2,744,069). They can be methylene bridged or sulfur bridged.

The sulfurized metal phenates represent a preferred class of phenates and can be considered the "metal salt of a phenol sulfide" which thus refers to a metal salt whether neutral or basic. They can be typified by the general formula:

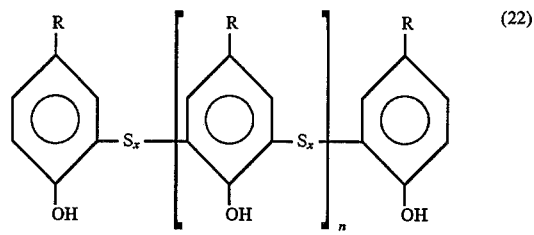

(22)

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14 wt. %, preferably about 4 to about 12 wt. % sulfur based on the weight of sulfurized alkyl phenol.

The sulfurized alkyl phenol may also be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate, has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing detergents although beneficial in other respects can increase the tendency of the lubricating oil to oxidize. This is especially true of the highly basic sulphonates.

The magnesium and/or calcium is generally present as basic or neutral detergents such as the sulphonates and phenates.

Viscosity Modifiers

A viscosity index (VI) improver, also referred to as viscosity modifier, is typically employed in multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may include derivatized polymers recited above which include various properties or functions, including dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers which can be used are viscosity improvers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example, by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g., see U.S. Pat. Nos. 4,089,794; 4,160,739 and 4,137,185; or copolymers of ethylene and propylene reacted or grafted with nitrogen compounds such as shown in U.S. Pat. Nos. 4,068,056; 4,068,058; 4,146,489 and 4,149,984.

Useful hydrocarbon polymers include ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene or ethylene and butene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1,4,4-dimethyl-1-pentene, and 6-methylheptene-1, etc., and mixtures thereof.

Terpolymers, tetrapolymers, etc., of ethylene, said $C_3$ to $C_{28}$ alpha-olefin, and a non-conjugated diolefin or mixtures of such diolefins may also be used. The amount of the non-conjugated diolefin generally ranges from about 0.5 to 20 mole %, preferably from about 1 to about 7 mole %, based on the total amount of ethylene and alpha-olefin present.

The polyester VI improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$ to $C_{20}$ aliphatic or aromatic olefin per mole of unsaturated ester, or per mole of unsaturated acid or anhydride followed by esterification. For example, copolymers or styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the VI improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like. N-vinyl lactams are also suitable, e.g. N-vinyl pyrrolidones or N-vinyl piperidones. The vinyl pyrrolidones are preferred and are exemplified by N-vinyl pyrrolidone, N-(1-methylvinyl)pyrrolidone, N-vinyl-5-methyl pyrrolidone, N-vinyl-3, 3-dimethylpyrrolidone, N-vinyl-5-ethyl pyrrolidone, etc.

Such nitrogen- and ester-containing polymeric viscosity index improver dispersants are generally employed in concentrations of from about 0.05 to 10 wt. % in the fully formulated oil, and preferably from about 0.1 to 5 wt. %, and more preferably from about 0.5 to 3 wt. % can reduce (e.g., to about 0.5 wt. %) the amount of the ashless dispersant employed to provide the required dispersancy to the oil formulation.

Antiwear Agents

Antiwear agents, as their name implies, reduce wear of moving metallic parts. Representative of conventional antiwear agents which may be used include, for example, the zinc dialkyl dithiophosphates, and the zinc diaryl dithiophosphates.

Suitable phosphates include dihydrocarbyl dithiophosphates, wherein the hydrocarbyl groups contain an average of at least 3 carbon atoms. Particularly useful are metal salts of at least one dihydrocarbyl dithiophosphoric acid wherein the hydrocarbyl groups contain an average of at least 3 carbon atoms. The acids from which the dihydrocarbyl dithiophosphates can be derived can be illustrated by acids of the formula:

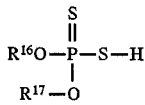

wherein $R^{16}$ and $R^{17}$ are the same or different and are alkyl, cycloalkyl, aralkyl, alkaryl or substituted substantially hydrocarbon radical derivatives of any of the above groups, and wherein the $R^{16}$ and $R^{17}$ groups in the acid each have, on average, at least 3 carbon atoms.

By "substantially hydrocarbon" is meant radicals containing substituent groups (e.g., 1 to 4 substituent groups per radical moiety) such as ether, ester, nitro or halogen which do not materially affect the hydrocarbon character of the radical.

Specific examples of suitable $R^{16}$ and $R^{17}$ radicals include isopropyl, isobutyl, n-butyl, sec-butyl, n-hexyl, heptyl, 2-ethylhexyl, diisobutyl, isooctyl, decyl, dodecyl, tetradecyl, hexadecyl, octadecyl, butylphenyl,o,p-depentylphenyl, octylphenyl, polyisobutene-(molecular weight 350)-substituted phenyl, tetrapropylene-substituted phenyl, beta-octylbutylnaphthyl, cyclopentyl, cyclohexyl, phenyl, chlorophenyl, o-dichlorophenyl, bromophenyl, naphthenyl, 2-methylcyclohexyl, benzyl, chlorobenzyl, chloropentyl, dichlorophenyl, nitrophenyl, dichlorodecyl and xenyl radicals. Alkyl radicals having about 3 to 30 carbon atoms, and aryl radicals having about 6 to 30 carbon atoms, are preferred. Particularly preferred $R^{16}$ and $R^{17}$ radicals are alkyl of 4 to 18 carbons.

The phosphorodithioic acids are readily obtainable by the reaction of phosphorus pentasulfide and an alcohol or phenol. The reaction involves mixing, at a temperature of about 20° C. to 200° C., 4 moles of the alcohol or phenol with one mole of phosphorus pentasulfide. Hydrogen sulfide is liberated as the reaction takes place. Mixtures of alcohols, phenols or both can be employed, e.g., mixtures of $C_3$ to $C_{30}$ alkanols, $C_6$ to $C_{30}$ aromatic alcohols, etc.

The metals useful to make the phosphate salts include Group I metals, Group II metals, aluminum, lead, tin, molybdenum, manganese, cobalt and nickel. Zinc is the preferred metal. Examples of metal compounds which may be reacted with the acid include lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide and nickel carbonate.

In some instances, the incorporation of certain ingredients, particularly carboxylic acids or metal carboxylates such as small amounts of the metal acetate or acetic acid used in conjunction with the metal reactant will facilitate the reaction and result in an improved product. For example, the use of up to about 5% of zinc acetate in combination with the required amount of zinc oxide facilitates the formation of a zinc phosphorodithioate.

The preparation of metal phosphorodithioates is well known in the art and is described in a large number of issued patents, including U.S. Pat. Nos. 3,293,181; 3,397,145; 3,396,109 and 3,442,804, the disclosures of which are hereby incorporated by reference insofar as the preparation of metal salts of organic phosphorodithioic acids useful in this invention are described.

Also useful as antiwear additives are amine derivatives of dithiophosphoric acid compounds, such as are described in U.S. Pat. No. 3,637,499, the disclosure of which is hereby incorporated by reference in its entirety.

The zinc salts are most commonly used as antiwear additives in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved antiwear properties, and primary for thermal stability. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates are oil soluble salts of dihydrocarbyl esters of dithiophosphoric acids and may be represented by the following formula:

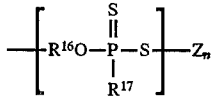

wherein $R^{16}$ and $R^{17}$ are as described in connection with the previous formula.

Suitable antiwear agents also comprise the phosphorous- and sulfur-containing product mixtures described in U.S. Application Ser. No. 210,831 filed on Jun. 24, 1988 by Ryer and Gutierrez and the continuation-in-part thereof: U.S. Ser. No. 370,315, filed Jun. 22, 1989, the disclosures thereof are incorporated herein by reference.

In a preferred embodiment of the phosphorous- and sulfur-containing product mixtures disclosed in said commonly assigned applications, the following three components, namely: (1) organic phosphite ester, (2) hydrocarbyl thioalkanol, and (3) heterodialkanol are reacted in admixture, preferably in simultaneous admixture.

Preferred hydrocarbyl thioalkanol reactants include $C_8$ to $C_{18}$ thioethanols. The preferred heterodialkanols are thiodialkanols. Representative thiodialkanols include 2,2'-thiodiethanol; 3,3'-thiodipropanol; thio-bis ethoxy-ethanol; thiobisisopropoxyisopropanol; and mixtures thereof.

Oxidation Inhibitors

Oxidation inhibitors reduce the tendency of mineral oils to deteriorate in service, which deterioration can be evidenced by the products of oxidation such as sludge and varnish-like deposits on the metal surfaces and by viscosity growth.

Useful antioxidant materials include oil soluble phenolic compounds, oil soluble sulfurized organic compounds, oil soluble amine antioxidants, oil soluble organo borates, oil soluble organo phosphites, oil soluble organophosphates, oil soluble organo dithiophosphates and mixtures thereof. Preferably such antioxidants are metal-free (that is, free of metals which are capable of generating sulfated ash), and therefore are most preferably ashless (having a sulfated ash value of not greater than 1 wt. % SASH, as determined by ASTMD874).

Illustrative of oil soluble phenolic compounds are alkylated monophenols, alkylated hydroquinones, hydroxylated thiodiphenyl ethers, alkylidenebis phenols, benzyl compounds, acylaminophenols, and esters and amides of hindered phenol-substituted alkanoic acids.

Examples of Phenolic Antioxidants

1. Alkylated monophenols 2,6-di-tert-butyl-4-methylphenol; 2,6-di-tert-butylphenol; 2-tert-butyl-4,6 dimethylphenol; 2,6-di-tertbutyl-4-ethylphenol; 2,6-ditert-butyl-4-ethylphenol; 2,6-di-tert-butyl-4-n-butylphenol; 2,6-di-tertbutyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; o-tert-butylphenol.

2. Alkylated hydroquinones 2,6-di-tert-butyl-4-methoxyphenol; 2,5-di-tertbutyl-hydroquinone; 2,5-di-tert-amylhydroquinone; 2,6-di-phenyl-4-octadecyloxyphenol.

3. Hydroxylated thiodiphenyl ethers 2,2'-thiobis(6-tert-butyl-4-methyl-phenol); 2,2'-thiobis(4-octylphenol); 4,4'-thiobis(6-tert-butyl-3-methylphenol); 4,4'-thiobis(6-tert-butyl-2-methylphenol).

4. Alkylidenebisphenols 2,2'-methylenebis(6-tert-butyl-4-methylphenol); 2,2'-methylenebis(6-tert-butyl-4-ethylphenol); 2,2'-methylenebis[4-methyl-6-(alpha-methylcyclohexyl)-phenol); 2,2'-methylenebis(4-methyl-6-cyclohexylphenol); 2,2'-methylenebis(6-nonyl-4-methylphenol); 2,2'-methylenebis(4,6-di-tert-butyl-phenol); 2,2'-methylidenebis(4,6-di-tert-butylphenol); 2,2'-ethylidenebis(6-tert-butyl-4-isobutylphenol); 2,2'-methylenebis[6-alpha-methylbenzyl)-4-nonylphenol]; 2,2'-methylenebis[6-(alpha, alpha-dimethylbenzyl)-4-nonylphenol]; 4,4'-methylenebis(2,6-di-tert-butylphenol); 4,4'-methylenebis(6-tert-butyl-2-methylphenol); 1,1-bis-(5-tert-butyl-4-hydroxy-2-methylphenyl)butane; 2,6-di(3-tert-butyl-5-methyl-2-hydroxybenzyl)-4-methylphenol; 1,1,3-tris(5-tert-butyl-4-hydroxy-2-methylphenyl)-3-n-dodecylmercaptobutane; ethylene glycol bis[3,3-bis(3'-tert-butyl-4'-hydroxylphenyl)butyrate]; di(3-tert-butyl-4-hydroxy-5-methylphenyl)dicyclopentadiene; di[2-(3'-tert-butyl-2'-hydroxy-5'-methylbenzyl)-6-tertbutyl-4-methylphenyl]terephthalate.

5. Benzyl compounds 1,3,5-tris(3,5-di-tert-butyl-4-hydroxybenzyl)-2,4,6-trimethyl-benzene; di(3,5-di-tert-butyl-4-hydroxybenzyl)sulfide; 3,5-di-tert-butyl-4-hydroxybenzylmercaptoacetic acid isooctyl ester; bis(4-tert-butyl-3-hydroxy-2,6-dimethyl-benzyl)dithioterephthalate; 1,3,5-tris(3,5-di-tertbutyl-4-hydroxy-benzyl)isocyanurate1, 3,5-tris(4-tertbutyl-3-hydroxy-2,6-dimethylbenzyl) isocyanurate; 3,5-di-tert-butyl-4-hydroxybenzylphosphonic acid dioctadecyl ester 3,5-di-tert-butyl-4-hydroxybenzylphosphonic acid mono-ethyl ester calcium salt.

6. Acylaminophenols 4-hydroxylauric acid anilide; 4-hydroxystearic acid anilide; 2,4-bis-octylmercapto-6-(3,5-di-tert-butyl-4-hydroxyaniline)-s-triazine; N-(3,5-di-tert-butyl-4-hydroxyphenyl)carbamic acid octyl ester.

7. Esters of beta-(3,5-di-tert-butyl-4-hydroxyphenyl) propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris(hydroxy-ethyl)isocyanurate; and di(hydroxyethyl)oxalic acid diamide.

8. Esters of beta-(5-tert-butyl-4-hydroxy-3-methylphenyl)propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris(hydroxyethyl) isocyanurate; and di(hydroxyethyl)oxalic acid diamide.

9. Amides of beta -(3,5-di-tert-butyl-4-hydroxyphenyl) propionic acid, e.g., N,N'-di(3,5-di-tert- butyl-4-hydroxyphenyl-pro-prionyl)hexamethylenediamine; N,N'-di(3,5-di-tert-butyl-4-hydroxyphenylpropionyl) trimethylenediamine; N,N'-di-(3,5-di-tert-butyl-4-hydroxyphenylpropionyl)hydrazine.

Oil soluble sulfurized organic compounds include those represented by the formula:

$$R^{18}S_{x_4}R^{19}$$

wherein S represents sulfur, $x_4$ is a whole number having a value of from 1 to about 10, and $R^{18}$ and $R^{19}$ may be the same or different organic groups. The organic groups may be hydrocarbon groups or substituted hydrocarbon groups containing alkyl, aryl, aralkyl, alkaryl, alkanoate, thiazole, imidazole, phosphorothionate, beta-ketoalkyl groups, etc. The substantially hydrocarbon groups may contain other substituents such as halogen, amino, hydroxyl, mercapto, alkoxy, aryloxy, thio, nitro, sulfonic acid, carboxylic acid, carboxylic acid ester, etc.

Specific examples of types of sulfurized compositions which are useful. Oxidation inhibitors include aromatic, alkyl or alkenyl sulfides and polysulfides, sulfurized olefins, sulfurized carboxylic acid esters, sulfurized ester olefins, sulfurized oil, and mixtures thereof. The preparation of such oil-soluble sulfurized compositions is described in the art, and U.S. Pat. No. 4,612,129 is incorporated herein by reference in its entirety for its disclosure of such preparations; including the type and amount of reactants and catalysts (or promoters), temperatures and other process conditions, and product purification and recovery techniques (e.g., decoloring, filtering, and other solids and impurity removal steps). The sulfurized organic compounds may be aromatic and alkyl sulfides such as dibenzyl sulfide, dixylyl sulfide, dicetylsulfide, diparaffin wax sulfide and polysulfide, cracked wax oleum sulfides, etc.

Examples of dialkenyl sulfides are described in U.S. Pat. No. 2,446,072. Examples of sulfides of this type include 6,6'-dithiobis(5-methyl-4-nonene), 2-butenyl monosulfide and disulfide, and 2-methyl-2-butenyl monosulfide and disulfide.

Representative sulfurized olefins include sulfurized olefins prepared by the reaction of an olefin (preferably containing 3 to 6 carbon atoms) or a lower molecular weight polyolefin derived therefrom, with a sulfur-containing compound such as sulfur, sulfur monochloride and/or sulfur dichloride, hydrogen sulfide, etc. Isobutene, propylene and their dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

The sulfurized organic compounds may be sulfurized oils which may be prepared by treating natural or synthetic oils including mineral oils, lard oil, carboxylic acid esters derived from aliphatic alcohols and fatty acids or aliphatic carboxylic acids (e.g., myristyl oleate and oleyl oleate) sperm whale oil and synthetic sperm whale oil substitutes and synthetic unsaturated esters or glycerides.

The sulfurized fatty acid esters can be prepared by reacting sulfur, sulfur monochloride, and/or sulfur dichloride with an unsaturated fatty ester at elevated temperatures. Typical esters include $C_1$ to $C_{20}$ alkyl esters of $C_8$ to $C_{24}$ unsaturated fatty acids such as palmitoleic, oleic, ricinoleic, petroselic, vaccenic, linoleic, linolenic, oleostearic, licanic, etc. Sulfurized fatty acid esters prepared from mixed unsaturated fatty acid esters such as are obtained from animal fats and vegetable oils such as tall oil, linseed oil, olive oil, castor oil, peanut oil, rape oil, fish oil, sperm oil, etc. also are useful. Specific examples of the fatty esters which can be sulfurized include lauryl talate, methyl oleate, ethyl oleate, lauryl oleate, cetyl oleate, cetyl linoleate, lauryl ricinoleate, oleolinoleate, oleostearate, and alkyl glycerides.

Another class of organic sulfur-containing compounds includes sulfurized aliphatic esters of an olefinic monodicarboxylic acid. For example, aliphatic alcohols of from 1 to 30 carbon atoms can be used to esterify monocarboxylic acids such as acrylic acid, methacrylic acid, 2,4-pentadienic acid, etc. or fumaric acid, maleic acid, muconic acid, etc. Sulfurization of these esters is conducted with elemental sulfur, sulfur monochloride and/or sulfur dichloride.

Another class of sulfurized organic compounds include diester sulfides. Typical diesters include the butyl, amyl, hexyl, heptyl, octyl, nonyl, decyl, tridecyl, myristyl, pentadecyl, cetyl, heptadecyl, stearyl, lauryl, andeicosyl; diesters of thiodialkanoic acids such as propionic, butanoic, pentanoic and hexanoic acids. Of the diester sulfides, a specific example is dilauryl3,3'-thiodipropionate.

Other suitable sulfurized organic compound antioxidants include those derived from a particular type of cyclic or bicyclic olefin which is a Diels-Alder adduct of at least one dienophile with at least one aliphatic conjugated diene. The sulfurized Diels-Alder adducts can be prepared by reacting various sulfurizing agents with the Diels-Alder adducts as described more fully below. Typically, the sulfurizing agent is sulfur.

The Diels-Alder adducts are a well-known, art-recognized class of compounds prepared by the diene synthesis of Diels-Alder reaction. A summary of the prior art relating to this class of compounds is found in the Russian monograph, "Dienovyl Sintes", Izdatelstwo Akademii Nauk SSSR, 1963 by A. S. Onischenko. (Translated into the English language by L. Mandel as A. S. Onischenko, "Diene Synthesis", New York, Daniel Davey and Co., Inc., 1964). This monograph and references cited therein are incorporated by reference into the present specification.

Still further sulfurized organic compounds include at least one sulfurized terpene compound or a composition prepared by sulfurizing a mixture comprising at least one terpene and at least one other olefinic compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occurring oxygen-containing derivatives. Mixtures of these various compounds generally will be utilized, especially when natural products such as pine oil and turpentine are used. Pine oil, for example, which is obtained by destructive distillation of waste pinewood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other monoterpene hydrocarbons. The specific ratios and amounts of the various components in a given pine oil will depend upon the particular source and the degree of purification. A group of pine oil-derived products are available commercially from Hercules Incorporated. The pine oil products generally known as terpene alcohols available from Hercules Incorporated are particularly useful in the preparation of this class of sulfurized products. Examples of such products include alpha-Terpineol containing about 95 to 97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60 to 65 wt. % of alpha-terpineol and 15 to 20% beta-terpineol, and 18 to 20% of other tertiary terpene alcohols. Other mixtures and grades of useful pine oil products also are available from Hercules under such designations as Yarmor 302, Herco pine oil, Yamor 302W, Yarmor F and Yarmor 60.

The above terpene compounds may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur dioxide with hydrogen sulfide. Also, the sulfurization of various terpene compounds has been described in the prior art. For example, the sulfurization of pine oil is described in U.S. Pat. No. 2,012,446.

The other olefinic compound which may be combined with the terpene compound and sulfurized may be any of several olefinic compounds such as those described earlier.

The other olefin used in combination with the terpene also may be an unsaturated fatty acid, an unsaturated fatty acid ester, mixtures thereof, or mixtures thereof with the olefins described above. The term "fatty acid" as used herein refers to acids which may be obtained by hydrolysis of naturally occurring vegetable or animal fats or oils. These fatty acids usually contain from 16 to 20 carbon atoms and are mixtures of saturated and unsaturated fatty acids. The unsaturated fatty acids generally contained in the naturally occurring vegetable or animal fats and oils may contain one or more double bonds and such acids include palmitoleic acid, oleic acid, linoleic acid, linolenic acid, and erucic acid. The unsaturated fatty acids may comprise mixtures of acids such as those obtained from naturally occurring animal and vegetable oils such as lard oil, tall oil, peanut oil, soybean oil, cottonseed oil, sunflower seed oil, or wheat germ oil. Tall oil is a mixture of rosin acids, mainly abietic acid, and unsaturated fatty acids, mainly oleic and linoleic acids. Tall oil is a by-product of the sulfate process for the manufacture of wood pulp.

The most particularly preferred unsaturated fatty acid esters are the fatty oils, that is, naturally occurring esters of glycerol with the fatty acids described above, and synthetic esters of similar structure. Examples of naturally occurring fats and oils containing unsaturation include animal fats such as Neat's foot oil, lard oil, depot fat, beef tallow, etc. Examples of naturally occurring vegetable oils include cottonseed oil, corn oil, poppyseed oil, safflower oil, sesame oil, soybean oil, sunflower seed oil and wheat germ oil.

The fatty acid esters which are useful also may be prepared from aliphatic olefinic acids of the type described above such as oleic acid, linoleic acid, linolenic acid, and behenic acid by reaction with alcohols and polyols. Examples of aliphatic alcohols which may be reacted with the above-identified acids include monohydric alcohols such as methanol, ethanol, n-propanol, isopropanol, the butanols, etc.; and polyhydric alcohols including ethylene glycol, propylene glycol, trimethylene glycol, neopentyl glycol, glycerol, etc.

The sulfurized derivatives of the other olefin compounds can be prepared by methods known in the art utilizing sulfurizing reagents such as sulfur, sulfur halides or mixtures of sulfur or sulfur dioxide with hydrogen sulfide.

Exemplary of amine antioxidants are phenyl-substituted and phenylene-substituted amines, N-nitro phenylhydroxylamine, isoindoline compounds, phosphinodithioic acid-vinyl carboxylate adducts, phosphorodithioate ester-aldehyde reaction products, phosphorodithioate-alkylene oxide reaction products, silyl esters of terephthalic acid, bis-1,3-alkylamino-2-propanol, anthranilamide compounds, anthranilic acid esters, alpha-methyl styrenated aromatic amines, aromatic amines and substituted benzophenones, aminoguanidines, peroxide-treated phenothiazine, N-substituted phenothiazines and triazines, 3-tertiary alkyl-substituted phenothiazines, alkylated diphenyl-amines, 4-alkylphenyl-1-alkyl-2-naphthylamines, di-benzazepine compounds, fluorinated aromatic amines, alkylated polyhydroxy benzenoid compounds, substituted indans, dimethyl octadecylphosphonate-arylimino di-alkanol copolymers and substituted benzo-diazoborole.

Examples of Amine Antioxidants

N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-diphenyl-p-phenylenediamine; N,N'-di-(naphthyl-2)-p-phenylenediamine; N-isopropyl-N'-phenyl-p-phenylenediamine; N-(1,3-dimethylbutyl)-N'-phenyl-n-phenylenediamine; N-(1-methylheptyl)-N'-phenyl-p-phenylenediamine; N-cyclohexyl-N'-phenyl-p-phenylenediamine; 4-(p-toluenesulfonamido) diphenylamine; N,N'-dimethyl-N,N'-di-sec-butyl-p-phenylenediamine diphenylamine; 4-isopropoxydiphenylamine; N-phenyl-1-naphthylamine; N-phenyl-2-naphthylamine; octylated diphenylamine; 4-n-butylaminophenol; 4-butyrylaminophenol; 4-nonanoylaminophenol; 4-dodecanoylaminophenol; 4-octadecanoylaminophenol; di-(4-methoxyphenyl)amine; di-tert-butyl-4-dimethylaminomethylphenol; 2,4'-diaminodiphenylmethane; 4,4'-diaminophenylmethane; N,N,N',N'-tetramethyl-4,4'-diaminodiphenylmethane; 1,2-di [(2-methylphenyl)amino]ethane; 1,2-di(phenylamino) propane; (o-tolyl)biguanide; di[4-(1',3'-dimethylbutyl) phenyl]amine; tert-octylated N-phenyl-1-napthylamino; and mixture of mono- and dialkylated tert-butyl-tert-octyldiphenylamines.

Oil soluble organo-borate, phosphate and phosphite antioxidants include alkyl- and aryl- (and mixed alkyl, aryl) substituted borates, alkyl- and aryl- (and mixed alkyl, aryl) substituted phosphates, alkyl- and aryl- (and mixed alkyl, aryl) substituted phosphites, and alkyl- and aryl- (and mixed alkyl, aryl) substituted dithiophosphates such as O,O,S-trialkyl dithiophosphates, O,O,S-triaryldithiophosphates and dithiophosphates having mixed substitution by alkyl and aryl groups, phosphorothionyl sulfide, phosphorus-containing silane, polyphenylene sulfide, amine salts of phosphinic acid and quinone phosphates.

A preferred class of antioxidants includes the sulfurized alkyl-substituted hydroxyaromatic compounds. Sulfurized alkyl-substituted hydroxyaromatic compounds and the methods of preparing them are known in the art and are disclosed, for example, in the following U.S. Patents (which are incorporated by reference herein): U.S. Pat. Nos. 2,139, 766; 2,198,828; 2,230,542; 2,836,565; 3,285,854; 3,538, 166; 3,844,956; 3,951,830 and 4,115,287.

In general, the sulfurized alkyl-substituted hydroxyaromatic compounds may be prepared by reacting an alkyl-substituted hydroxyaromatic compound with a sulfurizing agent such as elemental sulfur, a sulfur halide (e.g., sulfur-monochloride or sulfur dichloride), a mixture of hydrogen sulfide and sulfur dioxide, or the like. The preferred sulfurizing agents are sulfur and the sulfur halides, and especially the sulfur chlorides, with sulfur dichloride ($SCl_2$) being especially preferred.

The alkyl-substituted hydroxyaromatic compounds which are sulfurized to produce antioxidant are generally compounds containing at least one hydroxy group (e.g., from 1 to 3 hydroxy groups) and at least one alkyl radical (e.g., from 1 to 3 alkyl radicals) attached to the same aromatic ring. The alkyl radical ordinarily contains about 3 to 100, and preferably about 6 to 20, carbon atoms. The alkyl-substituted hydroxy aromatic compound may contain more than one hydroxy group as exemplified by alkyl resorcinols, hydroquinones and catechols, or it may contain more than one alkyl radical; but normally it contains only one of each. Compounds in which the alkyl and hydroxy groups are ortho, meta and para to each other, and mixtures of such compounds, are within the scope of the invention. Illustrative alkyl-substituted hydroxyaromatic compounds are n-propylphenol, isopropylphenol, n-butylphenol, t-butylphenol, hexylphenol, heptylphenol, octylphenol, nonylphenol, n-dodecylphenol, (propenetetramer)-substituted phenol, octadecylphenol, eicosylphenol, polybutene (molecular weight about 1000)-substituted phenol, n-dodecylresorcinol and 2,4-di-t-butylphenol, and the alkyl-substituted catechols corresponding to the foregoing. Also included are methylene-bridged alkyl-substituted hydroxyaromatic compounds of the type which may be prepared by the reaction of an alkyl-substituted hydroxyaromatic compound with formaldehyde or a formaldehyde-yielding reagent such as trioxane or paraformaldehyde.

The sulfurized alkyl-substituted hydroxy-aromatic compound is typically prepared by reacting the alkyl-substituted hydroxyaromatic compound with the sulfurizing agent at a temperature within the range of about 100° C. to 250° C. The reaction may take place in a substantially inert diluent such as toluene, xylene, petroleum naphtha, mineral oil, Cellosolve or the like. If the sulfurizing agent is a sulfur halide, and especially if no diluent is used, it is frequently preferred to remove acidic materials such as hydrogen halides by vacuum stripping the reaction mixture or blowing it with an inert gas such as nitrogen. If the sulfurizing agent is sulfur, it is frequently advantageous to blow the sulfurized product with an inert gas such as nitrogen or air so as to remove sulfur oxides and the like.

Also useful herein are antioxidants disclosed in the following U.S. Patents, the disclosures of which are herein incorporated by reference in their entirety: U.S. Pat. Nos. 3,451,166; 3,458,495; 3,470,099; 3,511,780; 3,687,848; 3,770,854; 3,850,822; 3,876,733; 3,929,654; 4,115,287; 4,136,041; 4,153,562; 4,367,152 and 4,737,301.

The most preferred antioxidants include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithiophosphates wherein copper may be substituted for zinc in the compounds and reactions described above although 1 mole of cuprous or cupric oxide may be reacted with 1 or 2 moles of the dithiophosphoric acid, respectively. Alternatively, the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compound antioxidants are copper ($Cu^I$ and/or $Cu^{II}$) salts of alkenyl carboxylic acids or anhydrides such as succinic acids or anhydrides. The salts themselves may be basic, neutral or acidic. They may be formed by reacting (a) any of the functionalized polymers which are useful as dispersants section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts are Cu salts of poly-n-butene succinic anhydride (hereinafter referred to as Cu-PNBSA) polyisobutenyl succinic anhydride (hereinafter referred to as Cu-PIBSA), and Cu salts of poly-n-butene or polyisobutenyl succinic acid. Preferably, the selected metal employed is its divalent form, e.g., $Cu^{+2}$ The preferred substrates are polyalkenyl carboxylic acids in which the alkenyl group has a molecular weight greater than about 700. The alkenyl group desirably has a Mn from about 900 to 1,500, and up to 5,000. These materials can be dissolved in a solvent, such as a mineral oil, and heated in the presence of a water solution (or slurry) of the metal bearing material. Heating may take place between 70° C. and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-PNB, Cu-oleate, or mixtures thereof) will be generally employed in an amount of from about 50 to 500 ppm by weight of the metal, in the final lubricating or fuel composition.

The copper antioxidants are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) ppm of added copper based on the weight of the lubricating oil composition. Of course, the preferred amount may depend, amongst other factors, on the quality of the basestock lubricating oil.

Corrosion Inhibitors

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 65° C. to 315° C. Neutralization of the phosphosulfurized hydrocarbon may be effected in the manner taught in U.S. Pat. No. 2,969,324.

Other suitable corrosion inhibitors include copper corrosion inhibitors comprising hydrocarbyl-thio-distributed derivatives of 1,3,4-thiadiazole, e.g., $C_2$ to $C_{30}$; alkyl, aryl, cycloalkyl, aralkyl and alkaryl-mono-, di-, tri-, tetra- or thio-substituted derivatives thereof.

Representative examples of such materials included 2,5-bis(octylthio)-1,3,4-thiadiazole; 2,5-bis(octyldithio)-1,3,4-thiadiazole; 2,5-bis(octyltrithio)-1,3,4-thiadiazole; 2,5-bis (octyltetrithio)-1,3,4-thiadiazole; 2,5-bis(nonylthio)-1,3,4-thiadiazole; 2,5-bis(dodecyldithio)-1,3,4-thiadiazole; 2-dodecyldithio-5-phenyldithio-1,3,4-thiadiazole; 2,5-bis (cyclohexyl dithio)-1,3,4-thiadiazole; and mixtures thereof.

Preferred copper corrosion inhibitors are the derivative of -1,3,4-thiadiazoles such as those described in U.S. Pat. Nos. 2,719,125, 2,719,126 and 3,087,932; especially preferred is the compound 2,5-bis(t-octyldithio)-1,3,4-thiadiazole commercially available as Amoco 150, and 2,5-bis(t-nonyldithio)-1,3,4-thiadiazole, commercially available as Amoco 158.

The preparation of such materials is further described in U.S. Pat. Nos. 2,719,125, 2,719,126, 3,087,932 and 4,410,436, the disclosures of which are hereby incorporated by reference.

Corrosion inhibitors also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126 and 3,087,932; especially preferred is the compound 2,5 bis(t-octadithio)-1,3,4-thiadiazole, commercially available as Amoco 150. Other similar materials also suitable are described in U.S. Pat. Nos. 3,821,236; 3,904,537; 4,097,387; 4,107,059; 4,136,043; 4,188,299 and 4,193,882.

Other suitable corrosion inhibitors are the thio and polythio sulphenamides of thiadiazoles such as those described in U.K. Patent Specification 1,560,830. These compounds can be included in the lubricating composition in an amount from 0.01 to 10, preferably 0.1 to 5.0 wt. % based on the weight of the composition.

Friction Modifiers

Friction modifiers serve to impart the proper friction characteristics to lubricating oil compositions such as automatic transmission fluids. Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxy alkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. Preferred friction modifiers are include hydroxy amines, as disclosed in U.S. Pat. No. 5,078,893 and the thioether hydroxyamines as disclosed in U.S. Ser. No. 211,428 filed Jun. 24, 1988; glycerol mono and dioleates; succinate esters, or metal salts thereof, of hydrocarbyl substituted succinic acids or anhydrides and thiobis alkanols such as described in U.S. Pat. No. 4,344,853 and amide friction modifiers such as the reaction product of isostearic acid and tetraethylene pentamine as disclosed in U.S. Ser. No. 425,939, filed Oct. 24, 1989 (our file PTF-048), all of which are herein incorporated by reference.

Anti-Foamants

Foam control can be provided by an antifoamant of the polysiloxane type, e.g. silicone oil and polydimethyl siloxane.

Rust Inhibitors

Organic, oil-soluble compounds useful as rust inhibitors comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in oleaginous compositions usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl or alkenyl group contains up to about 20 carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Typically, the ethylene oxide units will comprise from about 10 to about 40%, preferably from about 10 to about 15% by weight of the molecule. Number average molecular weight of the polyol is from about 2,500 to 4,500. The polyols having a molecule weight of about 4,000 with about 10% attributable to ethylene oxide units are particularly good.

Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Also useful rust inhibitors are alkoxylated fatty amines, amides, alcohols and the like, including such alkoxylated fatty acid derivatives treated with $C_9$ to $C_{16}$ alkyl-substituted phenols (such as the mono- and diheptyl, octyl, nonyl, decyl, undecyl, dodecyl and tridecyl phenols), as described in U.S. Pat. No. 3,849,501, which is also hereby incorporated by reference in its entirety.

Demulsifiers

Suitable demulsifiers include the esters disclosed in U.S. Patent Nos. 3,098,827 and 2,674,619 herein incorporated by reference.

Lube Oil Flow Improvers

Lubricating oil flow improvers (LOFI) include all those additives which modify the size, number, and growth of wax crystals in lube oils or fuels in such a way as to impart improved low temperature handling, pumpability, and/or vehicle operability as measured by such tests as pour point and mini rotary viscometry (MRV). The majority of flow improvers are or contain either the backbone or sidechain type of polymers earlier described in the section entitled "Background Of The Invention." As noted there, representative of the sidechain LOFI's are dialkyl fumarate-vinyl acetate copolymers. Dialkyl fumarate-vinyl acetate copolymers useful as LOFI's are described in U.S. Pat. No. 4,839,074, the disclosure of which is incorporated herein by reference.

Seal Swell Agents

Seal swellants include mineral oils of the type that provoke swelling of engine seals, including aliphatic alcohols of 8 to 13 carbon atoms such as tridecyl alcohol, with a preferred seal swellant being characterized as an oil-soluble, saturated, aliphatic or aromatic hydrocarbon ester of from 10 to 60 carbon atoms and 2 to 4 linkages, e.g., dihexyl phthalate, as are described in U.S. Pat. No. 3,974,081.

Some of the above numerous additives can provide a multiplicity of effects e.g., a dispersant oxidation inhibitor. This approach is well known and need not be further elaborated herein.

Compositions, when containing these additives, typically are blended into the base oil in amounts which are effective to provide their normal attendant function. Representative effective amounts of such additives are illustrated as follows:

| Compositions | (Broad) Wt % | (Preferred) Wt % |
| --- | --- | --- |
| V.I. Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (AI) content of the additive, and/or upon the total weight of any additive-package, or formulation which will be the sum of the AI weight of each additive plus the weight of total oil or diluent.

The invention is further illustrated by the following examples which are not to be considered as limitative of its scope.

EXAMPLE 1

Preparation of Ethylene-1-Butene Copolymer

In a continuous polymerization, ethylene gas was continuously injected into a liquid stream composed of 40 weight percent 1-butene and 60 weight percent isobutane at a rate sufficient to provide 8.5 weight percent ethylene content, based upon the total weight of monomer. The reactant stream containing ethylene, 1-butene, and isobutane was continuously fed into a 568-liter, stirred boiling reactor equipped with a water jacket for temperature control at a rate of about 370 kg per hour, wherein the vapor formed in the reactor is condensed in an overhead reflux condenser and returned to the reactor. A catalyst solution was prepared by dissolution of solid 1,1-dimethylsilyl-bridged bis(4,5,6,7-tetrahydroindenyl)zirconium dichloride into a 10 weight percent solution of methylalumoxane in toluene, such that the Al:Zr molar ratio in the solution was 500:1. The catalyst solution was continuously pumped into the boiling reactor at a rate sufficient to provide a molar Zr concentration of $0.25 \times 10^{-5}$. The temperature of the reactor was maintained at 160° F., and the reactor pressure was maintained at 170–175 psig (ca. 13 bar). The reactor contents were continuously stirred at a rate of 300 rpm. The reactor residence time was 1 hour.

The product stream was continuously fed from the boiling reactor to a quench drum, where it was contacted with an aqueous solution of 350 ppm $NH_4OH$. The unreacted monomer, solvent, and quench water were removed from the product by nitrogen stripping. The polymer product was then filtered to remove the catalyst residue.

The yield of ethylene-1-butene copolymer was about 70 kg per hour. The ethylene content of the copolymer was 22.8 weight percent, as determined by proton NMR. According to an analysis by proton NMR, 69.6% of the polymer chains in the polymer were found to have terminal ethylvinylidene unsaturation, and 0% were found to have terminal vinyl unsaturation. The polymer had a $M_n$ of 4,666 and MWD of 2.3, as determined by gel permeation chromatography using a calibration curve for a polydisperse EB copolymer with 20 wt.% ethylene content.

EXAMPLE 2

Preparation of Ethylene-1-Butene Copolymer

The polymerization was performed as in Example 1, except that the reactor temperature and pressure were 175° F. and 225 psig (ca. 16.5 bar) respectively. In addition, the reactant stream consisted of a liquid stream composed of 38.5 weight percent 1-butene and 61.5 weight percent isobutane into which ethylene gas was injected at a rate sufficient to provide 19 weight percent ethylene content, based upon the total weight of monomer. The reactant stream was fed into the reactor at a rate of 403 kg per hour.

The yield of ethylene-1-butene copolymer was 98 kg per hour. The polymer had 38.9 weight percent ethylene content, 66.3% terminal ethylvinylidene unsaturation, and 0% terminal vinyl unsaturation. The $M_n$ and MWD Of the polymer were 4,325 and MWD of 2.34 respectively, as determined by GPC using the calibration curve for a polydisperse EB copolymer of 40 wt. % ethylene content.

EXAMPLE 3 preparation of Ethylene-1-Butene Copolymer

In a continuous polymerization, ethylene gas was continuously injected into a liquid stream composed of 55.7 weight percent 1-butene and 44.3 weight percent n-butane at a rate sufficient to provide 12.9 weight percent ethylene content, based upon the total weight of monomer. The reactant stream containing ethylene, 1-butene, and n-butane was continuously fed at a temperature of about 75° C. into the bottom of a stirred 1500 ml Monel autoclave reactor at a rate of about 1.92 kg per hour. A catalyst stock solution was prepared by dissolution of solid 1,1-dimethylsilyl-bridged bis(4,5,6,7-tetrahydroindenyl)zirconium dichloride in toluene, followed by addition of the dissolved catalyst to a 10 weight percent solution of methylalumoxane in toluene, such that the Al:Zr molar ratio in the stock solution was 1000:1. The stock catalyst solution was continuously pumped into the reactor at a rate sufficient to provide a molar Zr concentration of $0.36 \times 10^{-5}$. The reactor contents were continuously stirred at a rate of 1500 rpm. The temperature and pressure of the reactor were respectively maintained at 90° C. and about 260 psig (ca. 19 bar). The reactor residence time was 30 minutes.

The product stream was continuously removed from the top of the reactor, quenched by contact with a 10 weight percent caustic solution, and then scrubbed by contact with water to remove traces of the caustic. Both the quenching step and the scrubbing step also served to remove some of the ash. Unreacted monomer, solvent, and water were then removed from the product polymer by flashing.

The yield of ethylene-1-butene copolymer was about 0.70 kg per hour. As determined by proton NMR, the ethylene content was 16.9 weight percent, and 63% and 0% of the polymer chains in the polymer were respectively found to have terminal ethylvinylidene and terminal vinyl unsaturation. The polymer had a $M_n$ of 2,797 and MWD of 2.15, as determined by gel permeation chromatography using a polydisperse EB copolymer with 20 wt.% ethylene as the calibration standard.

COMPARATIVE EXAMPLE 1

Preparation of Ethylene-1-Butene Copolymer

The polymerization was performed as in Example 1, except that the reactor temperature and pressure were 205° F. and 320 psig (ca. 23 bar) respectively. In addition, the reactant stream consisted of a liquid stream composed of 40 weight percent 1-butene and 60 weight percent isobutane into which ethylene, gas was injected at a rate sufficient to provide 27 weight percent ethylene content, based upon the total weight of monomer. The reactant stream was fed into the reactor at a rate of 422 kg per hour.

The yield of ethylene-1-butene copolymer was 106 kg per hour. The polymer had a $M_n$ of 8,027, MWD of 2.74, 55.1 weight percent ethylene content, 50.3% terminal ethylvinylidene unsaturation, and 4.3% terminal vinyl unsaturation.

COMPARATIVE EXAMPLE 2

Preparation of Ethylene-1-Butene Copolymer

In a continuous polymerization, separate streams of fresh ethylene gas and fresh 1-butene gas flowing at the respective rates of 4.3 and 8 kg per hour were continuously mixed together, and the mixture compressed to 1550 bar and chilled to 30° C. The chilled mixture of ethylene and 1-butene gas was then fed to the top of a 3000 ml, jacketed, staged, steel autoclave reactor. A catalyst stock solution was prepared by dissolution of solid bis-(methylcylopentadienyl)zirconium dichloride into a 10 weight percent solution of methylalumoxane in toluene, such that the final Al:Zr molar ratio in the stock solution was 250:1. The catalyst stock solution was continuously pumped into the reactor at a rate of 650 ml per hour. The reactor contents were continuously stirred with an agitator operating at 1900 rpm. The temperature and pressure in the reactor were respectively maintained at 125° C. and about 1330 bar. The reactor residence time was about 1 minute.

The product stream exiting the bottom of the reactor was a mixture of polymer product, unreacted monomer, and catalyst fragments and by-products. After deactivation of the catalyst, unreacted monomer was separated from the polymer product in a high-pressure separator operated at 195° C. and a reduced pressure of 63 bar, and the unreacted monomer was recycled back to the reactor. The polymer product was then transferred to a low pressure separator, operated at 1.1 bar and 180° C., for further separation and removal of residual unreacted monomer in the product stream.

The yield of ethylene-1-butene copolymer was about 6 kg per hour. As determined by proton NMR, the ethylene content was 55 weight percent, and 68% of the polymer chains in the polymer were found to have terminal ethylvinylidene unsaturation. The polymer had a $M_n$ of 2,000 and MWD of 3.6, as determined by gel permeation chromatography, using a polydisperse EB copolymer with 60 wt. % ethylene content as the calibration standard.

POLYMER PROPERTIES

Properties of each of the EB copolymers prepared in Examples 1–3 and Comparative Examples 1–2 were measured in accordance with the following procedures. As an additional comparison, certain of the properties were also determined by these procedures for an isotactic poly(1-butene) with $M_n$ of 1165 (hereinafter Comparative Example 3).

Scattering Factor $S_f$ by Light Scattering 0.5g of the EB copolymer was added to 9.5g of S150NL mineral oil (5 wt % EB copolymer solution), mixed for approximately 16 hours at room temperature, heated and occasionally shaken in an oven at 80°–85° C. for several hours, and then filtered at 80°–85° C. About a 5 ml portion of the hot, filtered solution was then immediately quenched by placement in the sample chamber of a Brookhaven light scattering goniometer which contains an index matching bath at a temperature of 20° C.

Light from a Spectra-Physics model 124B He-Ne laser (wavelength=632.8 nm) was directed onto the sample, and the scattered light intensity at a forward scattering angle of 45° was recorded in units of photon counts per second using a Brookhaven BI2000 correlator, where the intensity level was recorded every ten seconds for 60 minutes following the quench.

The results of these procedures for each of the Examples and Comparative Examples are collected together in Table I following. In addition, FIG. 3-A presents a plot of the scattered light intensity as a function of the time following the quench for the EB copolymer product prepared in Example 1. As shown in FIG. 3-A, average scattered intensity did not change as a function of time after the quench for the duration of the test. $S_f$ was, therefore, zero. FIG. 3-B shows a plot of the scattered light intensity as a function of the time following the quench for the solution prepared from Comparative Example 2. As shown in FIG. 3-B, $I_o$ and $I_{eq}$ were respectively 700 and 7000 counts per second, resulting in an $S_f$ value greater than zero.

TABLE I

| Example | $I_o$ (photon counts/sec) | $I_{eq}$ (photon counts/sec) | $S_f$ |
|---|---|---|---|
| 1 | 300 | 300 | 0 |
| 2 | 300 | 300 | 0 |
| 3 | 700 | 700 | 0 |
| Comp 1 | 300 | 480 | 0.6 |
| Comp 2 | 700 | 7000 | 9 |
| Comp 3 | 300 | 300 | 0 |

*Comparative Example 3 is an isotactic poly(1-butene) with $M_n$ of 1165.

Ethylene Sequence Length (ESL) by C-13 NMR 1 g of the EB copolymer product was dissolved in 4 g of $CDCl_3$, which also contained 40 mg of chromium acetylacetonate as a paramagnetic relaxation agent. The solution so prepared was then used as a sample for measuring the C-13 NMR spectrum. The C-13 NMR spectrum was recorded on a JEOL GSX400 NMR spectrometer at 100 MHz. The following instrument conditions were employed: sample temperature, 30° C.; pulse flip angle, 90°; pulse repetition delay, 3 seconds; number of acquisitions per spectrum, 8,000; and sweep width, 40,000 Hz. Proton decoupling was employed during acquisition, but not during recycle delay. Based upon an analysis of the spectrum that included the contributions of the terminal groups in the polymer chains, the triad concentrations $X_{EEE}$, $X_{BEE+EEB}$, and $X_{BEB}$ were obtained, based upon which ESL was calculated. The results of these procedures for each of Examples 1-3 and Comparative Examples 1-2 are given in Table II following.

TABLE II

| Example | $X_{EEE}$ | $X_{BEE+EEB}$ | $X_{BEB}$ | ESL |
|---|---|---|---|---|
| 1 | 0.051 | 0.138 | 0.148 | 1.55 |
| 2 | 0.164 | 0.268 | 0.123 | 2.16 |
| 3 | 0.052 | 0.144 | 0.160 | 1.54 |
| Comp 1 | 0.342 | 0.300 | 0.070 | 3.24 |
| Comp 2 | 0.298 | 0.312 | 0.091 | 2.84 |

Pour Point

A blend was prepared containing 2 weight percent of EB copolymer product, 0.2 weight percent of a dialkyl fumarate-vinyl acetate copolymer lube oil flow improver sold commercially by Exxon Chemical Company, and a balance of S150NL mineral oil. The pour point of the blend was then measured according to ASTM Method No. D97. Table III presents the results of the pour point measurements for each of Examples 1-3 and Comparative Examples 1-3.

The pour points of twenty additional EB copolymer products, prepared in accordance with the general methods described in the section entitled "Preparation of the Ethylene-1-Butene Copolymer," were measured via the procedure described in the last paragraph. Table IV presents the pour point data for each of these copolymers, along with their ethylene contents in weight percent and their number average molecular weights. The pour points for these polymers are reported in order of increasing ethylene content as sample numbers 1-3, 5-9, 11-18, 20, and 22-24. Table IV also includes, for comparative purposes, the same data for the EB copolymers of Examples 1 and 2, corresponding respectively to sample nos. 4 and 10, and Comparative Examples 1 and 2, corresponding respectively to sample nos. 21 and 19.

FIG. 2 provides a graphical representation of the data in Table IV. FIG. 2 plots pour point as a function of ethylene content, wherein the pour point of each copolymer in the plot is marked by a circle whose diameter is proportional to the $M_n$ of the copolymer. The number associated with each circle is the sample number of the copolymer in Table IV.

Summary of Properties

Table III below summarizes some of the key property values determined as described above for Examples 1-3 and Comparative Examples 1-3. The Table includes the ethylene content in weight percent, the number average molecular weight, the ESL value, $S_f$ value, and pour point.

TABLE III

| EB Polymer of Example | Ethylene Content (wt. %) | $M_n$ | ESL | $S_f$ | Pour Point (°C.)* |
|---|---|---|---|---|---|
| 1 | 22.8 | 4666 | 1.55 | 0 | −30 |
| 2 | 38.9 | 4325 | 2.16 | 0 | −36 |
| 3 | 16.9 | 2797 | 1.54 | 0 | −30 |
| Comp 1 | 55.1 | 8027 | 3.24 | 0.6 | −18 |
| Comp 2 | 55 | 2000 | 2.84 | 9 | −33 |
| Comp 3 | 0 | 1165 | — | 0 | −27 |

*The respective pour points of S150NL mineral oil neat and a blend of S150NL with 0.2 wt. % of LOFI were −18° C. and −30 C., determined by ASTM Method No. D97.

As shown in Table III, Examples 1-3 all have $S_f$ values of zero (i.e., an absence of aggregation), satisfactory pour points of −30° C., and ESL values <2.50. This data describes EB copolymers which, under the conditions specified in the Examples supra, have insufficient ethylenic crystallinity to act as sites for either copolymer aggregation in a quenched mineral oil solution or to adversely affect the pour point of the oil by participation in the crystalline wax network that forms as the mineral oil is cooled. At the opposite extreme is Comparative Example 1, which has $S_f$ greater than zero, an unsatisfactory pour point of −18° C., and a relatively high ESL value of 3.24. This data describes an EB copolymer which has substantial ethylenic crystallinity, such that the copolymer both aggregates after solution quenching and adversely affects pour point by contributing to the formation of the wax crystal network in the cooling oil. Occupying an intermediate position is Comparative Example 2, which has $S_f$ greater than zero, a satisfactory pour point of −33° C., and an intermediate ESL value of 2.84. This data characterizes an EB copolymer with sufficient ethylenic crystallinity to aggregate after quenching, but which is insufficient to contribute to the wax crystalline network in a manner which adversely affects pour point.

The data in Table III further demonstrates that the isotactic poly(1-butene) of Comparative Example 3 has a tendency not to aggregate, (i.e., $S_f$ of zero) and has a relatively minor effect on pour point. This indicates that, relative to ethylenic crystallinity, isotactic crystallinity due to relatively long 1-butene sequences in EB copolymer chains plays little or no role in copolymer aggregation or pour point behavior.

TABLE IV

| Sample No. | Mn | Ethylene Content (wt. %) | Pour Point (°C.) |
|---|---|---|---|
| 1 | 1,627 | 15 | −36 |
| 2 | 2,797 | 17,13 | −36 |
| 3 | 1,962 | 22 | −33 |

TABLE IV-continued

| Sample No. | Mn | Ethylene Content (wt. %) | Pour Point (°C.) |
|---|---|---|---|
| 4 | 4,666 | 22.8 | −30 |
| 5 | 2,595 | 27 | −33 |
| 6 | 1,932 | 28 | −33 |
| 7 | 3,731 | 33 | −33 |
| 8 | 2,742 | 35 | −36 |
| 9 | 3,049 | 36 | −33 |
| 10 | 4,325 | 38.9 | −36 |
| 11 | 3,571 | 40 | −36 |
| 12 | 6,655 | 41 | −33 |
| 13 | 7,204 | 41,35 | −36 |
| 14 | 6,192 | 45 | −36 |
| 15 | 3,370 | 50 | −18 |
| 16 | 2,844 | 51,46 | −36 |
| 17 | 10,254 | 51 | −18 |
| 18 | 4,353 | 53 | −24 |
| 19 | 2,000 | 55 | −33 |
| 20 | 11,869 | 55,54 | −18 |
| 21 | 8,027 | 55.1 | −18 |
| 22 | 12,432 | 61 | −18 |
| 23 | 3,152 | 61 | −18 |
| 24 | 3,062 | 62,64 | −21 |

EXAMPLES 4–6

Preparation of Succinic Anhydride Functionalized EB Copolymer (EBSA)

In separate runs, each of the EB copolymers prepared in Examples 1–3 and pulverized maleic anhydride is charged at a ratio of 1.6 moles of maleic anhydride to one mole of EB copolymer under dry nitrogen and at atmospheric pressure to a 100 ml pressure reactor equipped with a stirrer and a thermocouple and heated by means of an electric heating mantle. The reaction mixture is heated to 70° C., after which the reactor is gently purged by bubbling dry nitrogen through the liquid reaction mixture for 15 minutes. The purging is then terminated and the reactor sealed. The reactor temperature is then raised to a temperature of 220° C. and is maintained at that temperature for 6 hours while stirring. The reaction is then terminated by cooling the reaction mixture to about 60° C., after which the liquid mixture is transferred to a glass beaker. Unreacted maleic anhydride is stripped off by passing dry nitrogen gas through the liquid at 140° C. The liquid product so prepared in each run is expected to contain EBSA and unreacted EB copolymer and to have little or no observable sediment. The product is also expected to have an AI value of at least about 65 to 75, a value of F between about 1.10 and 1.25.

EXAMPLES 5–7

Preparation of EBSA-Polyamine Dispersants

In separate runs, dispersant materials are prepared utilizing liquid EBSA products as prepared in Examples 4–6. The succinic acid anhydride substituted polymers are dissolved in an equal amount by weight of S150NL mineral oil. To the polymer solution is added tetraethylene pentamine (TEPA), and the mixture is heated to 140° C. under nitrogen while stirring for about 2 to 4 hours. The molar ratio of total polymer to polyamine in terms of succinic acid equivalents to TEPA charged is 2 to 1.

EXAMPLE 8

Preparation of a Mannich Base Dispersant Additive

Alkylation of the Phenol

About 50 grams of the EB copolymer prepared in Example 1 is dissolved in 100 ml of chlorobenzene and added to a solution containing about 10 gram of phenol in 300 ml of chlorobenzene. While stirring at room temperature under nitrogen, 0.5 g of $BF_3$ gas is bubbled into the charged solution, and the reaction mixture is stirred while the temperature is increased to 50° C. for about one hour. The reaction mixture is then neutralized with gaseous ammonia until a neutral pH is obtained. The solution is filtered and the filtrate is heated to 150° C. to distill off the solvent and excess phenol. About 90% or more of the EB copolymer is expected to alkylate with the phenol to form EB copolymer substituted phenol.

Mannich Base Condensation

To a 500 ml round-bottomed reaction flask is charged 25 grams of S150NL lubricating oil in which is dissolved 25 grams of EB substituted phenol as just prepared. 0.61 g of 1,6-hexanediamine and 0.35 g of formaldehyde are then added to the flask at 30° C. under nitrogen. The mixture is heated to 115° C. and kept at that temperature for 1 hour, after which the temperature of the reaction mixture is raised to 130° C. and maintained at that temperature for 45 minutes, all the while sweeping the reaction flask with dry nitrogen gas. The stripped reaction mixture is then cooled to room temperature, diluted with 100 ml of heptane, and filtered. The filtrate is then stripped at 130° C. with dry nitrogen gas to remove heptane.

EXAMPLE 9

Oxidized EB Copolymer

A 1500-ml glass reactor equipped with gas inlet and outlet tubes, a thermometer, and a stirrer is charged with 800 grams of EB copolymer as prepared in Example 3. The temperature is raised to 200° C. while stirring the copolymer. Dry air is bubbled through the copolymer via the inlet tube for 6 hours, all the while maintaining the temperature at 200° C. At the end of 6 hours, the air flow is terminated, and nitrogen is bubbled through the copolymer while cooling the reactor to room temperature.

EXAMPLE 10

Preparation of a Nitrogen-Containing Dispersant from Oxidized EB Copolymer

A nitrogen-containing dispersant material is prepared utilizing oxidized EB copolymer product as prepared in Example 9. The oxidized EB copolymer is dissolved in an equal amount by weight of S150NL mineral oil. To the polymer solution is added tetraethylene pentamine (TEPA), and the mixture is heated to 140° C. under nitrogen while stirring for about 2 to 4 hours. The molar ratio of total polymer to polyamine in terms of equivalents of carboxyl groups in the oxidized EB copolymer to TEPA charged is 2 to 1.

What is claimed is:

1. Ethylene-1-butene copolymer functionalized with at least one member selected from the group consisting of $C_3$ to $C_{10}$ mono-unsaturated monocarboxylic acid producing moieties and $c_4$ to $c_{10}$ mono-unsaturated dicarboxylic acid producing moieties, wherein the copolymer before functionalization comprises from 1 to about 50 weight percent ethylene derived units and from about 99 to about 50 weight percent 1-butene derived units, based on total copolymer weight before substitution, and has a number average molecular weight between about 1,500 and 7,500, ethylvinylidene groups terminating at least about 30 percent of all copolymer chains, and an $S_f$ value of about zero.

2. Lubricating oil dispersant additive comprising the reaction product of:

(a) ethylene-1-butene copolymer functionalized with at least one member selected from the group consisting of $C_3$ to $C_{10}$ mono-unsaturated monocarboxylic acid producing moieties and $C_4$ to $C_{10}$ mono-unsaturated dicarboxylic acid producing moieties, wherein the copolymer before functionalization comprises from 1 to about 50 weight percent ethylene derived units and from about 99 to about 50 weight percent 1-butene derived units, based on total copolymer weight before substitution, and has a number average molecular weight between about 1,500 and 7,500, ethylvinylidene groups terminating at least about 30 percent of all copolymer chains, and an $S_f$ value of about zero; and (b) at least one nucleophilic reagent selected from the group consisting of amines, alcohols, metal reactants, and mixtures thereof.

3. A concentrate containing from about 11 to 80 weight percent of the lubricating oil dispersant additive of claims 1 and 2 and from about 40 to 80 weight percent of base oil.

4. A lubricating oil composition containing from about 0.1 to 10 weight percent of the lubricating oil dispersant additive of claims 1 and 2.

* * * * *